US012350669B2

(12) United States Patent
Muller et al.

(10) Patent No.: US 12,350,669 B2
(45) Date of Patent: Jul. 8, 2025

(54) DUAL-DEPTH THERMOPLASTIC MICROFLUIDIC DEVICE AND RELATED SYSTEMS AND METHODS

(71) Applicant: BioFluidica, Inc., San Diego, CA (US)

(72) Inventors: Rolf Muller, Del Mar, CA (US); Mateusz Hupert, Lawrence, KS (US)

(73) Assignee: BioFluidica, Inc., Lawrence, KS (US)

( * ) Notice: Subject to any disclaimer, the term of this patent is extended or adjusted under 35 U.S.C. 154(b) by 0 days.

(21) Appl. No.: 18/542,574

(22) Filed: Dec. 15, 2023

(65) Prior Publication Data

US 2024/0351034 A1 Oct. 24, 2024

Related U.S. Application Data

(63) Continuation of application No. 18/079,860, filed on Dec. 12, 2022, now Pat. No. 11,865,541, which is a continuation of application No. PCT/US2021/037297, filed on Jun. 14, 2021.

(60) Provisional application No. 63/038,492, filed on Jun. 12, 2020.

(51) Int. Cl.
*B01L 3/00* (2006.01)
*B01L 3/02* (2006.01)

(52) U.S. Cl.
CPC ......... *B01L 3/502753* (2013.01); *B01L 3/021* (2013.01); *B01L 3/502715* (2013.01); *B01L 2200/027* (2013.01); *B01L 2200/0647* (2013.01); *B01L 2200/12* (2013.01); *B01L 2300/0816* (2013.01); *B01L 2300/12* (2013.01); *B01L 2400/0487* (2013.01); *B01L 2400/086* (2013.01)

(58) Field of Classification Search
CPC ............... B01L 3/502753; B01L 3/021; B01L 3/502715; B01L 2200/027; B01L 2200/0647; B01L 2200/12; B01L 2300/0816; B01L 2300/12; B01L 2400/0487; B01L 2400/086
See application file for complete search history.

(56) References Cited

U.S. PATENT DOCUMENTS 6,193,471 B1 2/2001 Paul
6,685,668 B1 2/2004 Cho et al.
6,869,571 B2 3/2005 Ingenhoven et al.
(Continued)

FOREIGN PATENT DOCUMENTS

CN 105899954 A 8/2016
CN 105950469 A 9/2016
(Continued)

OTHER PUBLICATIONS

International Search Report for Application No. PCT/US2021/037297 dated Oct. 7, 2021, 6 pages.
(Continued)

*Primary Examiner* — Brian J. Sines
(74) *Attorney, Agent, or Firm* — Julia A. Kim; In Vivo Patent Law

(57) ABSTRACT

The presently disclosed subject matter provides dual-depth thermoplastic microfluidic devices, related kits, microfluidic systems comprising the dual-depth thermoplastic microfluidic device, methods of isolating nucleic acid analytes from a liquid sample, and methods of isolating extracellular vesicles from a liquid sample.

32 Claims, 38 Drawing Sheets

Specification includes a Sequence Listing.

(56) References Cited

U.S. PATENT DOCUMENTS

| | | | |
|---|---|---|---|
| 6,915,679 B2 | 7/2005 | Chien et al. | |
| 7,858,040 B2 | 12/2010 | Okun et al. | |
| 8,287,820 B2 | 10/2012 | Williams et al. | |
| 8,394,645 B2 | 3/2013 | Beebe et al. | |
| 8,425,840 B2 | 4/2013 | Hosokawa et al. | |
| 8,470,246 B2 | 6/2013 | Rich | |
| 8,557,570 B2 | 10/2013 | Sahoo et al. | |
| 9,081,001 B2 | 7/2015 | Cook et al. | |
| 9,339,815 B2 | 5/2016 | Kim et al. | |
| 9,375,531 B1 | 6/2016 | Lee et al. | |
| 9,500,664 B2 | 11/2016 | Ness et al. | |
| 9,592,501 B2 | 3/2017 | Jarvius et al. | |
| 10,393,726 B2 | 8/2019 | Soper et al. | |
| 11,865,541 B2 * | 1/2024 | Muller | B01L 3/502761 |
| 2002/0100714 A1 | 8/2002 | Staats | |
| 2003/0236489 A1 | 12/2003 | Jacobson et al. | |
| 2004/0265171 A1 * | 12/2004 | Pugia | B01L 3/502746 436/180 |
| 2006/0193730 A1 | 8/2006 | Rosenstein et al. | |
| 2006/0257290 A1 | 11/2006 | Shimizu | |
| 2007/0054293 A1 | 3/2007 | Liu et al. | |
| 2008/0131323 A1 | 6/2008 | Kuczenski et al. | |
| 2009/0014360 A1 | 1/2009 | Toner et al. | |
| 2009/0074637 A1 | 3/2009 | Murphy et al. | |
| 2009/0229979 A1 | 9/2009 | Champagne | |
| 2010/0291584 A1 | 11/2010 | Tseng et al. | |
| 2012/0100521 A1 | 4/2012 | Soper et al. | |
| 2012/0128538 A1 | 5/2012 | Miller et al. | |
| 2012/0244043 A1 | 9/2012 | Leblanc et al. | |
| 2013/0078733 A1 | 3/2013 | Holmes et al. | |
| 2014/0030811 A1 | 1/2014 | Cao et al. | |
| 2014/0238122 A1 | 8/2014 | Mostowfi et al. | |
| 2015/0251181 A1 | 9/2015 | Saito | |
| 2016/0289669 A1 | 10/2016 | Fan et al. | |
| 2016/0339431 A1 | 11/2016 | Shmilovich et al. | |
| 2017/0043340 A1 | 2/2017 | West et al. | |
| 2018/0272356 A1 | 9/2018 | Valerio | |
| 2019/0219578 A1 * | 7/2019 | Mitsuhashi | G01N 33/553 |
| 2020/0023351 A1 | 1/2020 | Muller et al. | |

FOREIGN PATENT DOCUMENTS

| | | | |
|---|---|---|---|
| EP | 1206966 | A1 | 5/2002 |
| EP | 1712285 | A1 | 10/2006 |
| JP | 2011512125 | A | 4/2011 |
| JP | 2013524171 | A | 6/2013 |
| JP | 2015166707 | A | 9/2015 |
| WO | 2009069656 | A1 | 6/2009 |
| WO | 2012056369 | A1 | 5/2012 |
| WO | 2016024941 | A1 | 2/2016 |
| WO | 2016118915 | A1 | 7/2016 |
| WO | 2016201163 | A1 | 12/2016 |
| WO | WO 2018/200652 | A1 | 11/2018 |

OTHER PUBLICATIONS

Written Opinion for Application No. PCT/US2021/037297 dated Oct. 7, 2021, 6 pages.

Adamski, Mateusz, et al., "CD15+ Granulocyte and CD8+ T Lymphocyte Based Gene Expression Clusters for Ischemic Stroke Detection", Medical Research Archives, vol. 5, Issue 11, Nov. 2017, 13 pages.

Ashcroft, B.A., et al., "Determination of the Size Distribution of Blood Microparticles Directly in Plasma Using Atomic Force Microscopy and Microfluidics", Biomed Microdevices, Issue 14, Mar. 6, 2012, pp. 641-649.

Bell, George I., "Models for the Specific Adhesion of Cells to Cells", Science, vol. 200, Issue 4342, May 12, 1978, pp. 618-627.

Boenisch, Thomas, "Handbook, Immunochemical Staining Methods", DAKO Corporation, 2001, 67 pages.

Chalela, Julio A., M.D., et al., "Magnetic Resonance Imaging and Computed Tomography in Emergency Assessment of Patients with Suspected Acute Stroke: A Prospective Comparison", The Lancet, vol. 369, Jan. 27, 2007, pp. 293-298.

Chang, Kai-Chien, et al., "The Forward Rate of Binding of Surface-Tethered Reactants: Effect of Relative Motion Between Two Surfaces", Biophysical Journal, vol. 76, Mar. 1999, pp. 1280-1292.

Chen, Chihchen, et al., "Microfluidic Isolation and Transcriptome Analysis of Serum Microvesicles", Lab Chip, vol. 10, Issue 4, Feb. 21, 2010, pp. 505-511.

Chen, Claire C., et al., "Elucidation of Exosome Migration Across the Blood-Brain Barrier Model in Vitro", Cellular and Molecular Bioengineering, vol. 9, Issue 4, Dec. 2016, pp. 50-529.

Cho, Siwoo, et al., "Isolation of Extracellular Vesicle from Blood Plasma Using Electrophoretic Migration Through Porous Membrane", Sensors and Actuators: B Chemical, Issue 233, Oct. 5, 2016, pp. 289-297.

Contreras-Naranjo, Jose C., et al., "Microfluidics for Exosome Isolation and Analysis: Enabling Liquid Biopsy for Personalized Medicine", Lab Chip, Issue 17, Aug. 10, 2017, pp. 3558-3577.

Davies, Ryan T., et al., "Microfluidic Filtration System to Isolate Extracellular Vesicles from Blood", Lab on a Chip, Issue 12, Nov. 13, 2012, pp. 5202-5210.

Deun, Van J., et al., "EV-Track: Transparent Reporting and Centralizing Knowledge in Extracellular Vesicle Research", Nature Methods, vol. 14, No. 3, Mar. 2017, pp. 228-232.

Dreyer, Rachel, PhD, et al., "Most Important Outcomes Research Papers on Stroke and Transient Ischemic Attack", Circulation: Cardiovascular Quality and Outcomes, vol. 7, Issue 1, Jan. 2014, pp. 191-204.

Eitan, Erez, et al., Extracellular Vesicle-Depleted Fetal Bovine and Human Sera Have Reduced Capacity to Support Cell Growth, Journal of Extracellular Vesicles, Issue 4, Mar. 26, 2015, 10 pages.

Fang, Shimeng, et al., "Clinical Application of a Microfluidic Chip for Immunocapture and Quantification of Circulating Exosomes to Assist Breast Cancer Diagnosis and Molecular Classification", PLOS ONE, vol. 12, Issue 4, Apr. 3, 2017.

Fonarow, Gregg C., et al., "Door-to-Needle Times for Tissue Plasminogen Activator Administration and Clinical Outcomes in Acute Ischemic Stroke Before and After a Quality Improvement Initiative", JAMA, vol. 311, Issue 16, Apr. 23/30, 2014, pp. 1632-1640.

Geis-Asteggiante, Lucia, et al., "Differential Content of Proteins, mRNAs, and miRNAs Suggests that MDSC and Their Exosomes May Mediate Distinct Immune Suppressive Functions", Journal of Proteome Research, vol. 17, Issue 1, Jan. 5, 2018, pp. 486-498.

Greenberg, James M., et al., "Immunophenotypic and Cytogenetic Analysis of Molt-3 and Molt-4: Human T-Lymphoid Cell Lines with Rearrangement of Chromosome 7", Blood, vol. 72, No. 5, Nov. 1988, pp. 1755-1760.

He, Mei, et al., "Integrated Immunoisolation and Protein Analysis of Circulating Exosomes Using Microfluidic Technology", Lab Chip, vol. 14, Issue 19, Oct. 7, 2014, pp. 3773-3780.

Hsu, Hsien-Yeh, et al., "Lipopolysaccharide-Mediated Reactive Oxygen Species and Signal Transduction in the Regulation of Interleukin-1 Gene Expression", The Journal of Biological Chemistry, vol. 277, No. 25, Jun. 21, 2022, pp. 22131-22139.

Huang, Tao, et al, "Current Progresses of Exosomes as Cancer Diagnostic and Prognostic Biomarkers", International Journal of Biological Sciences, vol. 15, Issue 1, Jan. 6, 2019, 11 pages.

Im, Hyungsoon, et al., "Label-Free Detection and Molecular Profiling of Exosomes with a Nano-Plasmonic Sensor", Nature Biotechnology, vol. 32, Issue 5, May 2014, pp. 490-495.

Jackson, Joshua M., et al., "Materials and Microfluidics: Enabling the Efficient Isolation and Analysis of Circulating Tumour Cells", Chemical Society Reviews, vol. 46, Issue 14, Jul. 17, 2017, pp. 4245-4280.

Jackson, Joshua M., et al., "UV Activation of Polymeric High Aspect Ratio Microstructures: Ramifications in Antibody Surface Loading for Circulating Tumor Cell Selection", Lab Chip, vol. 14, Issue 1, Jan. 7, 2014, pp. 106-117.

Jauch, Edward C., et al., "Guidelines for the Early Management of Patients with Acute Ischemic Stroke", Stroke, vol. 44, Issue 3, Mar. 2013, pp. 870-947.

(56) References Cited

OTHER PUBLICATIONS

Ji, Qiuhong, et al., "Increased Brain-Specific MiR-9 and MiR-124 in the Serum Exosomes of Acute Ischemic Stroke Patients", PLoS ONE, vol. 11, Issue 9, Sep. 23, 2016, 14 pages.
Kalafut, Mary A., et al., "Detection of Early CT Signs of >1/3 Middle Cerebral Artery Infarctions", Stroke, vol. 31, Issue 7, Jul. 2000, pp. 1667-1671.
Kanwar, Shailender Singh, et al., "Microfluidic Device (ExoChip) for On-Chip Isolation, Quantification and Characterization of Circulating Exosomes", Lab Chip, vol. 14, Issue 11, Jun. 7, 2014, pp. 1891-1900.
Ko, Jina, et al., "Smartphone-Enabled Optofluidic Exosome Diagnostic for Concussion Recovery", Scientific Reports, Issue 6, Article No. 31215, Aug. 8, 2016, 12 pages.
Labat-Gest, Vivien, et al., "Photothrombotic Ischemia: A Minimally Invasive and Reproducible Photochemical Cortical esion Model for Mouse Stroke Studies", Journal of Visualized Experiments, Issue 76, Jun. 9, 2013, 6 pages.
Lee, Kyungheon, et al., "Acoustic Purification of Extracellular Microvesicles", ACS Nano, vol. 9, Issue 3, Mar. 24, 2015, pp. 2321-2327.
Liang, Li-Guo, et al., "An Integrated Double-Filtration Microfluidic Device for Isolation, Enrichment and Quantification of Urinary Extracellular Vesicles for Detection of Bladder Cancer", Scientific Reports, Issue 7, Article No. 46224, Apr. 24, 2017, 10 pages.
Liu, Chao, "Field-Free Isolation of Exosomes from Extracellular Vesicles by Microfluidic Viscoelastic Flows", ACES Nano, vol. 11, Issue 7, Jul. 5, 2017, pp. 6968-6976.
Nair, Soumya V., et al., "Enzymatic Cleavage of Uracil-Containing Single-Stranded DNA Linkers for the Efficient Release of Affinity-Selected Circulating Tumor Cells", Chemical Communications, Jan. 7, 2015, pp. 3266-3269.
Pahattuge, Thilanga N., et al., "Visible Photorelease of Liquid Biopsy Markers Following Microfluidic Affinity-Enrichment", Chemical Communications, vol. 56, Issue 29, Apr. 14, 2020, pp. 4098-4101.
Prat, Aleix, et al., "Characterization of Cell Lines Derived from Breast Cancers and Normal Mammary Tissues for the Study of the Intrinsic Molecular Subtypes", Breast Cancer Research and Treatment, Issue 142, Oct. 27, 2013, pp. 237-255.
Reátegui, Eduardo, et al., "Engineered Nanointerfaces for Microfluidic Isolation and Molecular Profiling of Tumor-Specific Extracellular Vesicles", Nature Communications, vol. 9, Issue 1, Jan. 12, 2018, 11 pages.
Rezeli, Melinda, et al., "Comparative Proteomic Analysis of Extracellular Vesicles Isolated by Acoustic Trapping or Differential Centrifugation", vol. 88, No. 17, Aug. 3, 2016, pp. 8577-8586.
Rider, Mark A., et al., "ExtraPEG: A Polyethylene Glycol-Based Method for Enrichment of Extracellular Vesicles", Scientific Reports, Issue 6, Article 23978, Apr. 12, 2016, 14 pages.
Rothermundt, Matthias, et al., "S100B in Brain Damage and Neurodegeneration", Microscopy Research and Technique, vol. 60, Issue 6, Apr. 2003, pp. 614-632.
Santana, Steven M., et al., "Microfluidic Isolation of Cancer-Cell-Derived Microvesicles from Hetergeneous Extracellular Shed Vesicle Populations", Biomedical Microdevices, vol. 16, Issue 6, Dec. 2014, pp. 869-877.
Selvaraj, Uma Maheswari, et al., "Long-Term T Cell Responses in the Brain After an Ischemic Stroke", Discovery Medicine, vol. 24, Issue 134, Dec. 2017, pp. 323-333.
Shao, Huilin, et al., "Chip-Based Analysis of Exosomal mRNA Mediating Drug Resistance in Glioblastoma", Nature Communications, May 11, 2015.
Shelke, Ganesh Vilas, et al, "Importance of Exosome Depletion Protocols to Eliminate Functional and RNA-Containing Extracellular Vesicles from Fetal Bovine Serum", Journal of Extracellular Vesicles, Issue 3, Sep. 30, 2014, 8 pages.
Soper, Steven A., et al., "Polymeric Micoelectromechanical", Analytical Chemistry, vol. 72, Oct. 1, 2000, pp. 642A-651A.
Tang, Yang, et al., "Gene Expression in Blood Changes Rapidly in Neutrophils and Monocytes After Ischemic Stroke in Humans: a Microarray Study", Journal of Cerebral Blood Flow & Metabolism, vol. 26, Issue 8, Aug. 2006, pp. 1089-1102.
Théry, Clotilde, et al., "Isolation and Characterization of Exosomes from Cell Culture Supernatants and Biological Fluids", Supplement 30, Unit 3.22, pp. 3.22.1-3.22.29.
Tough, David F., et al., "T Cell Stimulation in Vivo by Lipopolysaccharide (LPS)", Journal of Experimental Medicine, vol. 185, No. 12, Jun. 16, 1977, pp. 2089-2094.
Van Deun, Jan, "EV-Track: Transparent Reporting and Centralizing Knowledge in Extracellular Visicle Research", Nature Methods, vol. 14, No. 3, Mar. 2017, pp. 228-232.
Wang, Zongxing, et al., "Ciliated Micropillars for the Microfluidic-Based Isolation of Nanoscale Lipid Vesicles", Lab on a Chip, Issue 15, Aug. 7, 2013, pp. 2879-2882.
BlackHole Lab, "What are the Different Thermoplastic Polymers Used in Microfluidics", www.blackholelab-soft-lithography.com/different-thermoplastic-polymers-used-in-microfluidics, printed Nov. 26, 2019, 15 pages.
Brown, Virginia, "Development of an Extracellular Vesicle Microfluidic Affinity Purification (EV-MAP) in Vitro Assay for Breast Cancer," Thesis submitted to the graduate degree program in Bioengineering of the University of Kansas, Jul. 22, 2019, 161 pages.
Campos, Camila D., et al, "Microfluidic-Based Solid Phase Extraction of Cell Free DNA" Electronic Supplemental Information, Lab Chip, Issue 22, Nov. 6, 2018, 11 pages.
Campos, Camila D., et al, "Microfluidic-Based Solid Phase Extraction of Cell Free DNA", Lab Chip, Issue 22, Nov. 6, 2018, pp. 3459-3470.
Campos, Camila D.M., et al., "Molecular Profiling of Liquid Biopsy Samples for Precision Medicine", The Cancer Journal, vol. 24, Issue 2, Mar./Apr. 2018, pp. 93-103.
Dynamic Devices, "Liquid Handling Robotics", printed on Feb. 28, 2017, 8 pages.
Dynamic Devices, "VVP On-The-Fly Pipetting Correction," printed on Feb. 28, 2017, 3 pages.
Dynamic Devices, "VVP Real Time Transfer Validation," printed on Feb. 28, 2017, 3 pages.
Elveflow, "How to Choose the Right Microfluidic Flow Control System?", printed on Feb. 19, 2017, 17 pages.
Fiorini, Gina S., et al., "Disposable Microfluidic Devices: Fabrication, Function, and Application", BioTechniques, vol. 38, No. 3, Mar. 2005, pp. 329-446.
Gale, Bruce K., et al., "A Review of Current Methods in Microfluidic Device Fabrication and Future Commercialization Prospects", Inventions, No. 3: 60, Aug. 28, 2018, 25 pages.
Gao, Kexin, et al., "Ultra-Low-Cost Fabrication of Polymer-Based Microfluidic Devices with Diode Laser Ablation", Biomedical Microdevices 21, 83, Aug. 15, 2019.
Gencturk, Elif, et al., "Advances in Microfluidic Devices Made from Thermoplastics Used in Cell Biology and Analyses", Biomicrofluidics, No. 11(5), Oct. 24, 2017.
Hamilton Robotics, "Microlab STAR Line—Artificial Intelligence with Hamilton Robotics", 2013, 36 pages.
Hou, Han Wei, et al., "Microfluidic Devices for Blood Fractionation", Micromachines, No. 2(3), Dec. 2011, pp. 319-343.
Kamande, J.W., et al., "Modular Microsystem for the Isolation, Enumeration, and Phenotyping of Circulating Tumor Cells in Patients with Pancreatic Cancer", Analytical Chemistry, No. 85, Oct. 2013, pp. 9092-9100.
Kamande, J.W., et al., "Modular Microsystem for the Isolation, Enumeration, and Phenotyping of Circulating Tumor Cells in Patients with Pancreatic Cancer", Electronic Supplementary Information, Analytical Chemistry, No. 85, Oct. 2013, pp. 9092-9100.
Loiseau, Etienne, et al., "Microfluidic Study of Enhanced Deposition of Sickle Cells at Acute Corners", Biophysical Journal, vol. 108, Jun. 2015, pp. 2623-2632.
Mair, Dieudonne A., et al., "Injection Molded Microfluidic Chips Featuring Integrated Interconnects", Lab Chip, Issue 10, No. 6, Jul. 31, 2006, pp. 1346-2354.

(56) References Cited

OTHER PUBLICATIONS

Matellan, Carlos, et al., "Cost-Effective Rapid Prototyping and Assembly of Poly(methyl methacrylate) Microfluidic Devices", Scientific Reports, No. 8(1), May 3, 2018.
Nagrath, Sunitha, et al., "Isolation of Rare Circulating Tumour Cells in Cancer Patients by Microchip Technology", Nature, Dec. 20, 2007, pp. 1235-1239.
Nagrath, Sunitha, et al., "Isolation of Rare Circulating Tumour Cells in Cancer Patients by Microchip Technology", Supplementary Information, Nature, Dec. 20, 2007, pp. 1235-1239.
Ramirez, Marcel I., et al., "Technical Challenges of Working with Extracellular Vesicles", Nanoscale, No. 10, Issue 3, Jan. 21, 2018, pp. 881-906.
Rana, Ankit, et al., "Advancements in Microfluidic Technologies for Isolation and Early Detection of Circulating Cancer-Related Biomarkers", Analyst, Issue 13, May 23, 2018, pp. 2971-2991.
Sadeghi, Sahl, et al., "A Simple, Bubble-Free Cell Loading Technique for Culturing Mammalian Cells on Lab-on-a-Chip Devices", Royal Society of Chemistry, Feb. 28, 2017, 5 pages.
Tsao, Chia-Wen, et al., "Bonding of Thermoplastic Polymer Microfluidics", Microfluidics and Nanofluidics, No. 6, Nov. 13, 2008.
Turhan, Aslihan, et al., "Effect of Intraluminal Pillars on Particle Motion in Bifurcated Microchannels", In Vitro Cell Dev Biol Anim., No. 44(10), Sep. 20, 2008, pp. 426-433.
Xu, Zheyun, et al., "Microfluidic Technologies for cfDNA Isolation and Analysis", Micromachines, No. 10(10), Oct. 3, 2019.
Yanai, Takuma, "Hydrodynamic Microparticle Separation Mechanism Using Three-Dimensional Flow Profiles in Dual-Depth and Asymmetric Lattice-Shaped Microchannel Networks", Micromachines, No. 10(6), Jun. 25, 2019.
Wei, Zhiyun, et al., "Coding and Noncoding Landscape of Extracellular RNA Released by Human Glioma Stem Cells", Nature Communications, vol. 8, Article 1145, Oct. 26, 2017, 15 pages.
Willyard, Cassandra, "New Human Gene Tally Reignites Debate", Nature, vol. 558, Jun. 21, 2018, pp. 354-355.
Witek, Malgorzata A., et al., "Purification and Preconcentration of Genomic DNA from Whole Cell Lysates Using Photoactivated Polycarbonate (PPC) Microfluidic Chips", Nucleic Acids Research, vol. 34, Nov. 10, Jun. 6, 2006, 9 pages.
Woo, Hyun-Kyung, et al., "Exodisc for Rapid, Size-Selective, and Efficient Isolation and Analysis of Nanoscale Extracellular Vesicles from Biological Samples", vol. 11, Issue 2, Jan. 9, 2017, pp. 1360-1370.
Yang, Junfa, et al., "Extracellular Vesicles as Carriers of Non0Coding RNAs in Liver Diseases", Frontiers in Pharmacology, vol. 9, Article 415, Apr. 24, 2018, 11 pages.
Yilmaz, Gokhan, et al., "Role of T Lymphocytes and Interferon-y in Ischemic Stroke", Circulation, vol. 114, Issue 7, May 2, 2006, pp. 2105-2112.
Yoon, C.W., et al., "Premorbid Warfarin Use and Lower D-Dimer Levels are Associated with a Spontaneous Early Improvement in an Atrial Fibrillation-Related Stroke", Journal of Thrombosis and Haemostasis, vol. 10, Issue 11, Nov. 2012, pp. 2215-2416.
Yoon, Yae Jin, et al., "Extracellular Vesicles as Emerging Intercellular Communicasomes", BMB Reports, vol. 47, Issue 10, Jul. 18, 2014, pp. 531-539.
Yoshioka, Yusuke, et al., "Ultra-Sensitive Liquid Biopsy of Circulating Extracellular Vesicles Using ExoScreen", Nature Communications, Issue 5, Article No. 3591, Apr. 7, 2014, 8 pages.
Zhang, Peng, et al., "Ultrasensitive Detection of Circulating Exosomes with a 3D-Nanopatterned Microfluidic Chip", Nature Biomedical Engineering, vol. 3, Issue 6, Jun. 2019, pp. 438-451.
Zhang, Peng, et al., "Ultrasensitive Microfluidic Analysis of Circulating Exosomes Using a Nanostructured Graphene Oxide/Polydopamine Coating", Lab on a Chip, Issue 16, Mar. 22, 2016, pp. 3033-3042.
Zhao, Zheng, et al., "A Microfluidic ExoSearch Chipo for Multiplexed Exosome Detection Towards Blood-Based Ovarian Cancer Diagnosis", Lab on a Chip, Issue 16, 2016, pp. 489-496.

* cited by examiner

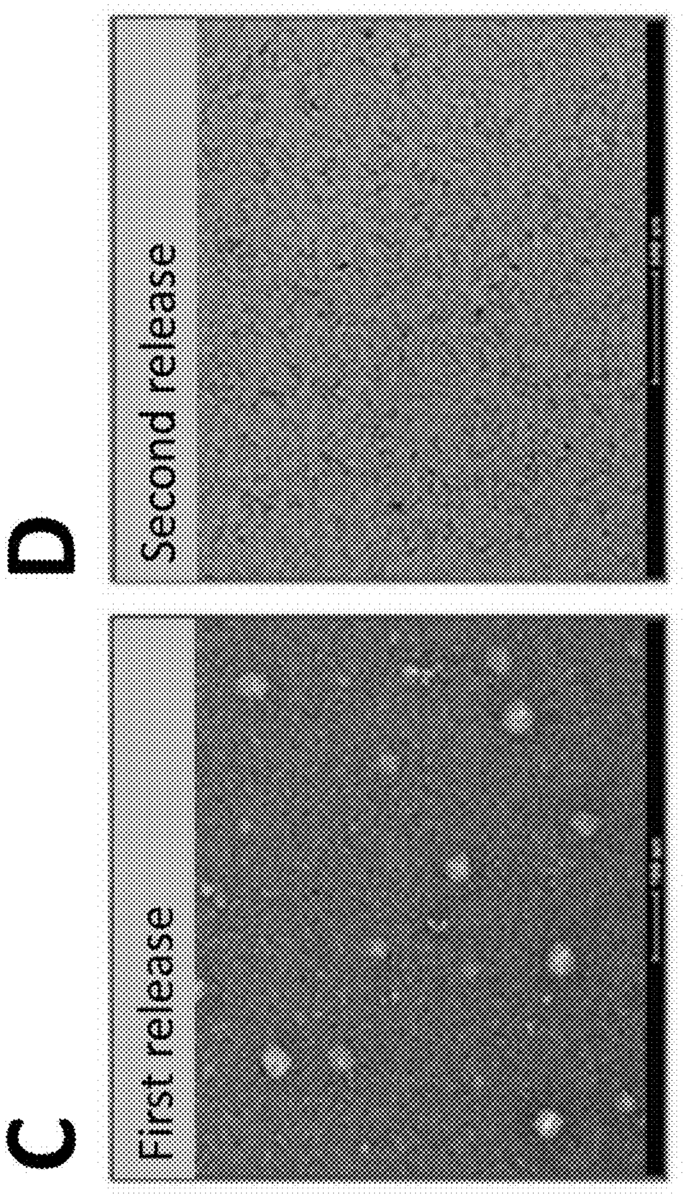
FIG. 13C-D

Gene Transcript Assignment

| # | Name | # | Name | # | Name |
|---|---|---|---|---|---|
| 1 | CCNE1 | 18 | MYBL2 | 35 | TYMS |
| 2 | MKI67 | 19 | MIA | 36 | PTTG1 |
| 3 | KNTC2 | 20 | GRB7 | 37 | CCNB1 |
| 4 | CDC20 | 21 | ERBB2 | 38 | RRM2 |
| 5 | ANLN | 22 | MYC | 39 | CDC6 |
| 6 | UBE2T | 23 | KRT14 | 40 | CENPF |
| 7 | BIRC5 | 24 | MMP11 | 41 | CEP55 |
| 8 | PHGDH | 25 | GPR160 | 42 | EXO1 |
| 9 | EGFR | 26 | CXXC5 | 43 | MELK |
| 10 | TMEM45B | 27 | SLC39A6 | 44 | UBE2C |
| 11 | PGR | 28 | MDM2 | 45 | ACTR3B |
| 12 | NAT1 | 29 | ORC6L | 46 | SFRP1 |
| 13 | CDH3 | 30 | FGFR4 | 47 | MLPH |
| 14 | KRT17 | 31 | FOXC1 | 48 | FOXA1 |
| 15 | ESR1 | 32 | KRT5 | 49 | BLVRA |
| 16 | KIF2C | 33 | MAPT | 50 | BAG1 |
| 17 | CDCA1 | 34 | BCL2 | | |

C

| Sample ID | Total EV mRNA concordance (%) vs. | | | Tissue mRNA concordance (%) vs. | | | |
|---|---|---|---|---|---|---|---|
| | EpCAM EV | FAPα EV | CD81 EV | Total EV | EpCAM EV | FAPα EV | CD81EV |
| LumA/38291 | 70.6 | 77.8 | 77.5 | 21.4 | 4.2 | 5.9 | 9.1 |
| 38184/LumB | 98.3 | 92.8 | 90.5 | 7.8 | 8.3 | 4.7 | 2.2 |
| 38242/Her2 | 54.3 | 54.3 | 43.8 | 23.9 | 1.5 | 14.6 | 1.6 |
| 35469/Basal | 49.2 | 50.2 | 41.2 | 31.6 | 9.8 | 3.4 | 4.7 |

| Sample ID | CD81 EV mRNA concordance (%) vs. | | | Tissue mRNA concordance (%) vs. | | |
|---|---|---|---|---|---|---|
| | EpCAM EV | FAPα EV | CD81 EV | EpCAM EV | FAPα | CD81 |
| *35469/Basal | 102 | 97.5 | - | 9.8 | 3.4 | 4.8 |
| *30581/Her2 | 75.4 | 85.6 | - | 14.4 | 11.9 | 3.8 |
| *30181/LumA | 79.9 | 83.8 | - | 11.2 | 5.4 | 4.8 |

| Sample ID | Tissue mRNA concordance (%) vs. | |
|---|---|---|
| | EpCAM EV | FAPα EV |
| **30249/Basal | 0.5 | 4.2 |
| **35424/LumA | 7.7 | 4.2 |

FIG. 16C

DUAL-DEPTH THERMOPLASTIC MICROFLUIDIC DEVICE AND RELATED SYSTEMS AND METHODS

CROSS REFERENCE TO RELATED APPLICATIONS

This is a continuation of U.S. application Ser. No. 18/079,860 filed Dec. 12, 2022, which is a continuation of Patent Cooperation Treaty Application No. PCT/US21/37297, entitled "DUAL-DEPTH THERMOPLASTIC MICROFLUIDIC DEVICE AND RELATED SYSTEMS AND METHODS," which was filed on Jun. 14, 2021, which claims the benefit of and priority to U.S. Provisional Patent Application No. 63/038,492 filed on Jun. 12, 2020, the contents of each of which are hereby incorporated by reference in their entirety.

FIELD

The invention relates to the fields of liquid biopsies, microfluidic devices for solid phase extraction of biomarkers such as extracellular vesicles and nucleic acid analytes, and biomarker sample preparation.

SEQUENCE LISTING

The instant application contains a Sequence Listing which has been submitted electronically in XML file format and is hereby incorporated by reference in its entirety. Said XML copy, created Dec. 15, 2022, is named "Sequence_Listing_998-6" and is 12.2 KB in size and is a copy of the previously filed ASCII text file but in XML format.

BACKGROUND

Liquid biopsies utilize disease-associated biomarkers found in bodily fluids such as urine, cerebrospinal fluid, blood, or saliva; and offer several advantages over traditional solid tissue biopsies. Liquid biopsies are less invasive, less painful, and easily obtainable. For example, a simple blood draw would be preferred over a bone marrow biopsy requiring insertion of a needle into bone to remove bone marrow tissue. Liquid biopsies would allow frequent sampling of metastatic sites and improved monitoring of disease progression.

Biomarkers found in liquid biopsy samples, such as blood, include circulating tumor cells (CTCs), extracellular vesicles (EVs) and nucleic acid analytes such as cell free DNA (cfDNA). Biomarkers released from tumor cells harbor important signatures of disease including mutations, copy number variations, methylation changes, and/or chromosomal rearrangements. These biomarkers can be used to monitor disease progression or to tailor individualized treatment options. In particular, the genetic information found in certain biomarkers can provide molecular characteristics of a disease to enable precision medicine.

However, isolation of biomarkers such as CTCs, EVs, and cfDNA has challenges. CTCs are detected in relatively low abundance (1-100/mL of blood), with their abundance extremely rare in early stage disease. With respect to cfDNA, ctDNA (circulating tumor DNA) can account for ~0.01% of the total cfDNA content. Short fragment size populations of cfDNA (70-300 bp) are also generally difficult to isolate. Also, while EVs exist in high abundance ($10^7$-$10^{12}$ EVs in 1 mL of plasma and increased numbers in diseased patients), the amount of molecular cargo EVs carry is limited because of the small size of many EVs. For example, Wei et al. (*Nature Communications,* 2017, 8, 1145.) found that a single EV carries about 4.45 ag of TRNA, and 1.9% of TRNA is mRNA related.

Existing microfluidic devices for isolation of CTCs, EVs, and cfDNA lack operability in high-through-put systems and lack a high degree of integration with robotic fluidic workstations. Prototypes are often limited to scaled down processes using syringe pumps and capillary connections to pump fluid, and manual operation by a trained technician. For example, microfluidic chips for isolation of cfDNA previously described by Campos et al. (Lab Chip. 2018 Nov. 6; 18(22): 3459-3470) were comprised of one or more beds of microposts in various arrangements with modified bed sizes, bed numbers, and micropost spacing and size. However, such devices were either tested with syringe pumps requiring tubing and capillary connections or merely run through a Monte Carlo simulation of DNA recovery. Application of previously described microfluidic chips in commercial settings and integration into larger systems pose challenges in operability, analyte recovery, and through-put.

There remains a need for improved microfluidic isolation platforms for capturing biomarkers that can be integrated with high through-put systems while providing significant analyte recovery.

SUMMARY OF THE INVENTION

The presently disclosed subject matter describes a dual-depth thermoplastic microfluidic device comprising: a thermoplastic substrate comprising an inlet channel, an outlet channel, bifurcated channels, and one or more isolation beds comprising a plurality of microposts, wherein the one or more isolation beds are connected to the inlet channel and outlet channel by the bifurcated channels; wherein each of the microposts has a height in the range of about 40 μm to about 60 μm, and a width in the range of about 5 μm to about 15 μm; and wherein at least a portion of the microposts are spaced apart by about 5 μm to about 15 μm; wherein the cross-section of the bifurcated channels has a height in the range of about 40 μm to about 60 μm; wherein the cross-section of the inlet channel has a height in the range of about 40 μm to about 500 μm, and a width in the range of 200 μm to about 500 μm; and wherein the cross-section of the outlet channel has a height in the range of about 40 μm to about 500 μm, and a width in the range of 200 μm to about 500 μm; and wherein the aspect ratio of each of the inlet channel and outlet channel is about 1:4 to about 4:1; and wherein the inlet channel, the outlet channel, the bifurcated channels, and the one or more isolation beds are a single dual-depth fluidic layer.

In some embodiments, the thermoplastic substrate is cyclic olefin copolymer (COC), cyclic olefin polymer (COP), polycarbonate (PC), polymethylmethacrylate, (PMMA), polystyrene (PS), polyvinylchloride (PVC), or polyethyleneterephthalate glycol (PETG). In some embodiments, the thermoplastic substrate is cyclic olefin copolymer (COC). In some embodiments, the cross-section of the inlet channel and the cross-section of the outlet channel each has a rectangular shape or a trapezoidal shape. In some embodiments, a portion of the cross-section of the inlet channel and a portion of the cross-section of the outlet channel each does not have a semicircular or triangular cross-section. In some embodiments, the microposts comprise capture elements. In some embodiments, the capture elements are antibodies, antigen binding fragments of antibodies, or aptamers. In some embodiments, the capture elements are surface-bound oxygen-rich moieties such as carboxylic acid groups, salicylates, or esters. In some embodiments, the microposts are UV-activated. In some embodiments, the microposts are UV/$O_3$-activated.

The presently disclosed subject matter describes a kit comprising the dual-depth thermoplastic microfluidic device described herein, and at least one reagent or buffer for use in processing a liquid sample using the dual-depth thermoplastic microfluidic device.

The presently disclosed subject matter describes a microfluidic system comprising: the dual-depth thermoplastic microfluidic device described herein, wherein the dual-depth thermoplastic microfluidic device further comprises an inlet port in fluid communication with an outlet port; a first automated pipetting channel comprising a first pump, and a first pipette tip coupled to the inlet port; a second automated pipetting channel comprising a second pump, and a second pipette tip coupled to the outlet port; and a non-transitory computer readable medium in communication with the first pump and the second pump, and programmed to command the first pump of the first automated pipetting channel and the second pump of the second automated pipetting channel to control flow of a liquid through the dual-depth thermoplastic microfluidic device.

The presently disclosed subject matter describes a method of isolating nucleic acid analytes from a liquid sample comprising: providing dual-depth thermoplastic microfluidic device described herein, wherein the microposts comprise capture elements that selectively bind a nucleic acid analyte; controlling flow of a liquid sample through the dual-depth thermoplastic microfluidic device; and binding the nucleic acid analyte to the capture elements thereby isolating the nucleic acid analytes from the liquid sample.

In some embodiments, the method comprises providing the system described herein to control flow of the liquid sample through the dual-depth thermoplastic microfluidic device. In some embodiments, the method comprises providing a syringe pump to control flow of the liquid sample through the dual-depth thermoplastic microfluidic device. In some embodiments, the nucleic acid analytes are cell-free DNA (cfDNA), circulating tumor DNA (ctDNA), genomic DNA (gDNA), or RNA. In some embodiments, the capture elements are surface-bound carboxylic acid groups, and the method comprises controlling flow of the liquid sample mixed with an immobilization buffer through the dual-depth thermoplastic microfluidic device. In some embodiments, the liquid sample:immobilization buffer mixture ratio is 1:3. In some embodiments, the immobilization buffer comprises a salt and a neutral polymer. In some embodiments, the immobilization buffer comprises a salt, a neutral polymer, and an organic solvent. In some embodiments, the immobilization buffer comprises 3% PEG, 0.5 M NaCl and 63% EtOH. In some embodiments, the immobilization buffer comprises 5% PEG, 0.4 M NaCl and 63% EtOH. In some embodiments, the liquid sample is blood or any fraction or component thereof, cerebrospinal fluids, urine, sputum, saliva, pleural effusion, stool and seminal fluid. In some embodiments, the liquid sample is plasma. In some embodiments, the cross-section of the inlet channel has a height in the range of about 225 μm to about 275 μm, and a width in the range of about 375 μm to about 425 μm; and the cross-section of the outlet channel has a height in the range of about 225 μm to about 275 μm, and a width in the range of about 375 μm to about 425 μm. In some embodiments, >80% or >90% of nucleic acid fragments 50-750 bp in size ar isolated and recovered. In some embodiments, >70% of nucleic acid fragments 50-750 bp in size were isolated and recovered.

The presently disclosed subject matter describes a method of isolating extracellular vesicles from a liquid sample comprising: providing dual-depth thermoplastic microfluidic device described herein, wherein the microposts comprise capture elements that selectively bind extracellular vesicles; controlling flow of a liquid sample through the dual-depth thermoplastic microfluidic device; and binding the extracellular vesicles to the capture elements thereby isolating the extracellular vesicles from the liquid sample.

In some embodiments, the method comprises providing the system described herein to control flow of the liquid sample through the dual-depth thermoplastic microfluidic device. In some embodiments, the method comprises providing a syringe pump to control flow of the liquid sample through the dual-depth thermoplastic microfluidic device. In some embodiments, the extracellular vesicles are exosomes. In some embodiments, the capture elements are antibodies, antigen binding fragments of antibodies, or aptamers. In some embodiments, the capture elements are monoclonal antibodies. In some embodiments, the capture elements bind with specificity to common exosome markers. In some embodiments, the capture elements bind with specificity to disease-associated markers. In some embodiments, the capture elements are immobilized to the microposts by a single-stranded oligonucleotide bifunctional cleavable linker, or a photocleavable linker. In some embodiments, the capture elements are immobilized to the microposts via surface-bound carboxylic acid groups. In some embodiments, the liquid sample is blood or any fraction or component thereof, bone marrow, pleural fluid, peritoneal fluid, cerebrospinal fluid, urine, saliva, amniotic fluid, ascites, broncho-alveolar lavage fluid, synovial fluid, breast milk, sweat, tears, joint fluid, and bronchial washes. In some embodiments, the liquid sample is plasma. In some embodiments, the cross-section of the inlet channel has a height in the range of about 225 μm to about 275 μm, and a width in the range of about 375 μm to about 425 μm; and the cross-section of the outlet channel has a height in the range of about 225 μm to about 275 μm, and a width in the range of about 375 μm to about 425 μm. In some embodiments, method further comprises controlling flow of a buffer through the dual-depth thermoplastic microfluidic device. In some embodiments, the buffer comprises bovine serum albumin (BSA) in PBS, polyvinylpyrrolidone (PVP)-40 in PBS, or polyethylene glycol sorbitan monolaurate. In some embodiments, method further comprises lysis of the extracellular vesicles, RNA purification, RNA extraction, reverse transcription, and mRNA expression profiling. In some embodiments, method further comprises obtaining distinct mRNA profiles indicative of the phenotype of the cells from which the extracellular vesicles originated. In some embodiments, the method further comprises release of the extracellular vesicles and nanoparticle tracking analysis. In some embodiments, the method further comprises release of the extracellular vesicles and transmission electron microscopy analysis.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 10 A and FIG. 10B are graphs depicting recovery of a commercial DNA ladder using Chip 1 and the LiquidScan liquid handling system. DNA ladder was spiked directly into the immobilization buffer containing 10% PEG (A) and 17% PEG (B). Recovered DNA was quantified using Tape Station 2200.

FIG. 13C and FIG. 13D are TEM images showing the number of EVs released during first (C) and second (D) USER® enzyme release of EVs isolated from MOLT-3 cell culture media.

FIG. 15B shows $EV^{EpCAM}$ and $EV^{FAP\alpha}$ mRNA abundance for healthy donors and breast cancer patients.

FIG. 15C shows principal component analysis of results.

FIG. 16C is a table showing results from analysis of the transcripts abundance.

BRIEF DESCRIPTION OF THE SEQUENCE LISTING

Figure 1A:
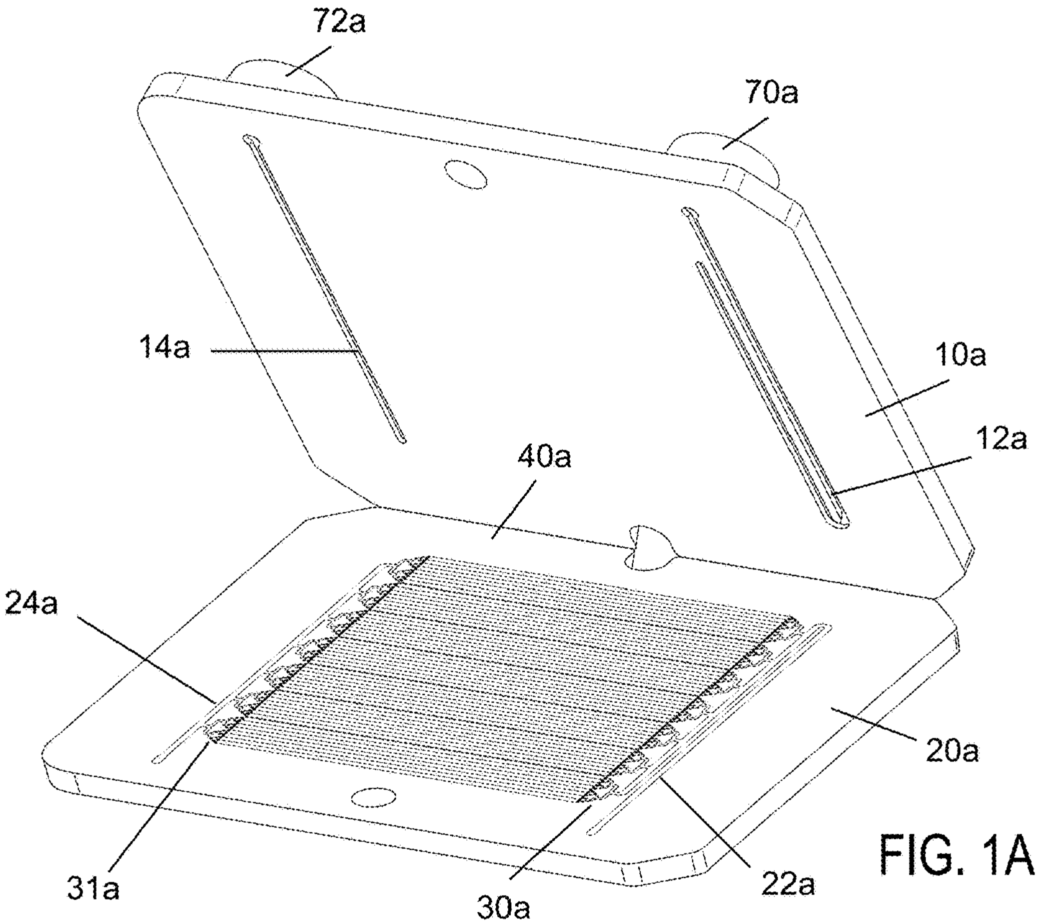
FIG. 1A is a perspective view of a thermoplastic base plate and a thermoplastic cover plate according to an embodiment of the present disclosure.

SEQ ID NO: 1 represents a KRAS forward primer.
SEQ ID NO: 2 represents a KRAS reverse primer.
SEQ ID NO: 3 represents a KRAS forward primer.
SEQ ID NO: 4 represents a KRAS reverse primer.
SEQ ID NO: 5 represents a GAPDH forward primer.
SEQ ID NO: 6 represents a GAPDH reverse primer.
SEQ ID NO: 7 represents a 18S forward primer.
SEQ ID NO: 8 represents a 18S reverse primer.
SEQ ID NO: 9 represents a linker sequence.

DETAILED DESCRIPTION OF EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. The claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Other details of the embodiments of the invention should be readily apparent to one skilled in the art from the drawings. Although the invention has been described based upon these preferred embodiments, it would be apparent to those skilled in the art that certain modifications, variations, and alternative constructions would be apparent, while remaining within the spirit and scope of the invention.

The presently disclosed subject matter is now described in more detail.

With respect the inlet channels, outlet channels, bifurcated channels, and respective recesses in a cover plate and/or base plate, the terms "depth" and "height" are used interchangeably herein.

Thermoplastic Microfluidic Device with Dual-Depth Fluidic Layer

Described herein are exemplary embodiments of a dual-depth thermoplastic microfluidic device. The dual-depth thermoplastic microfluidic device may be a chip, such as Lab-on-a-chip that integrates micro-scale features to provide various fluid processing functions, or other microfluidic device that has channels with cross-sectional dimensions that are less than 1 mm. In one embodiment, the dual-depth thermoplastic microfluidic device comprises a thermoplastic substrate comprising an inlet channel, an outlet channel, bifurcated channels, and one or more isolation beds comprising a plurality of microposts. The one or more isolation beds are connected to the inlet channel and outlet channel by the bifurcated channels. Each of the microposts has a height in the range of about 40 μm to about 60 μm. Each of the microposts also has a width in the range of about 5 μm to about 15 μm. Further, at least a portion of the microposts are spaced apart by about 5 μm to about 15 μm. The cross-section of the bifurcated channels have a height in the range of about 40 μm to about 60 μm. The cross-section of the inlet channel has a height in the range of about 40 μm to about 500 μm, and a width in the range of about 100 μm to about 500 μm; and the cross-section of the outlet channel has a height in the range of about 40 μm to about 500 μm, and a width in the range of about 100 μm to about 500 μm. The aspect ratio of each of the inlet channel and outlet channel is about 1:4 to about 4:1. The inlet channel, the outlet channel, the bifurcated channels, and the one or more isolation beds are a single dual-depth fluidic layer.

The dual-depth thermoplastic microfluidic device described herein advantageously can be integrated in a high-throughput system, such as the fluid-tight flow system described herein (for example, as embodied in the Liquid Scan liquid handling system), and used to efficiently isolate biomarkers with high recovery and through-put results.

Scaled-down or prototype processing of microfluidic chips using syringe pumps have different fluid dynamics as compared to high-throughput systems. Syringe pumping uses a syringe and electrically-driven linear actuator to push or pull syringe plunger in order to deliver liquid at controlled flow rate. Syringe pumps are capable of controlling the flow rate across microchannels independently of the fluidic resistance as the pressure automatically adapts to maintain the flow rate. In a properly filled syringe-chip setup there is no air trapped within the fluidic conduit of the chip or syringe-to-chip interface and any movement of the syringe plunger is directly and quantitatively converted into the movement of the liquid inside the fluidic conduit (i.e., the volume displaced by the plunger is equal to the volume of displaced liquid at any time during pumping step).

However, the same microfluidic chip successfully processed with syringe pumping may be inoperable with commercial high-throughput systems. For example, the fluid-tight flow system described herein (e.g., as embodied in the Liquid Scan liquid handling system) can use air displacement pipettes to deliver sample and reagents to the microfluidic chip. The inherent property of the air displacement setup is the cushion of the compressible air between the liquid inside the pipette tip and the pipette plunger. The volume of the air cushion is primarily dependent on the size of disposable pipette tip. Unconventionally, in this system, when liquid is dispensed into a fluidic conduit that offers some resistance to liquid flow (i.e.: back pressure) such as the microfluidic network of the chip, then the air inside the tip has to be first compressed to the pressure equal to or larger than the back pressure present in the system before any flow through the microfluidic network can occur. In such case, the control of the flow rate or dispensed amount of liquid becomes dependent on the factors that define the back pressure of the system including geometry of the microfluidic channels, viscosity of the liquid, and flow rate of the liquid.

Integration of microfluidic chips with high-throughput systems can subject microfluidic chips to high back pressure in flow channels. Back pressure typically is dependent on microchannel geometry, fluid viscosity, and flow rate. High back pressure can be caused, for example, by microstructures that restrict flow; a viscous liquid flowing through a microfluidic chip; the presence of gas bubbles in the liquid phase; or a liquid processing step that requires high flow rate. Depending on the pumping method, high back pressure can lead to reduction in the flow rate; cessation of the flow; flow rate instabilities; and non-uniformity in the flow between different branches of a fluidic network; as well as structural damage to the microfluidic chip.

Advantageously, the dual-depth thermoplastic microfluidic device described herein overcomes back-pressure issues and is operable with high-throughput systems such as the fluid-tight flow system described herein (for example, as embodied in the Liquid Scan liquid handling system). In particular, the inlet channel, the outlet channel, the bifurcated channels, and the one or more isolation beds form of the thermoplastic microfluidic device are a single fluidic layer. This is distinct from microfluidic devices having multiple channels formed in multiple layers, and physically separated in part (e.g. porous materials) or in full by elastomeric membranes (e.g. made of polyisoprene, polybutadiene, polychloroprene, polyisobutylene, poly(styrene-butadiene-styrene), polyurethanes, and silicones), adhesive layers, or valves. The inlet channel and the outlet channel, as described herein, each are formed in part from recesses of the thermoplastic cover plate, and advantageously have a height greater than the height of the microposts. This dual-depth structure of the single fluidic layer of the thermoplastic chip enables control of back pressure and keeps pressure drop low, which is necessary for stability of the liquid flow even for highly viscous liquids (such as a viscous immobilization buffer consisting of polyethylene glycol and salts used for cfDNA capture); and fidelity of the microfluidic chip during liquid flow processing.

The dual-depth structure of the single fluidic layer of the bonded thermoplastic chip is a novel structure and would not have been an obvious solution for multiple reasons, including the following. First, manufacture of thermoplastic microfluidic devices by injection molding or hot embossing processes can be complicated by fabrication of the mold master and the geometry of the microstructures, and these complications typically restrict manufacture to thermoplastic microfluidic structures having uniform depth. Injection molding generally includes the steps of melting and injecting a thermoplastic under high pressure into a heated mold cavity, cooling the thermoplastic, and releasing it from the mold. Hot embossing generally includes the steps of using thermoplastic sheets, patterned against a master mold using pressure and heat. Each process relies on imprinting structures with a mold master. For mass production of parts, the mold masters are made predominantly in metal, and typically by micromachining or lithography and electroplating. The mold master quality and fabrication process limits the replication capability of hot embossing and injection molding. In particular, it would be both technically challenging and expensive to create a dual-depth microfluidic network in the base plate because it would require a two-step lithography and electroplating process to generate the mold master. Thus, due to restraints in mold master fabrication, embossed or injection molded channel systems are preferred to be one-layer planar structures with uniform depth throughout. As such, pressure issues with thermoplastic microfluidic devices generally have been resolved by enlarging the space through which a liquid flows by widening channels as opposed to deepening channels relative to other structures on the same plane.

Second, manufacture of thermoplastic microfluidic structures by injection molding or hot embossing process have typically been restricted to producing recesses and/or structures on the base plate only or on the cover plate only. This is the common and preferred practice within the field because it requires only a single molding step, avoids issues with alignment of structures between the two plates bonded together, prevents underhangs, and is generally more efficient. Unconventionally, the dual-depth thermoplastic microfluidic device described herein increases the depth of the inlet channels and outlet channels by including the channel recesses in both the thermoplastic base plate and the thermoplastic cover plate.

FIG. 1A is an example of components of a thermoplastic microfluidic chip prior to bonding and provides a perspective view of a thermoplastic base plate and a thermoplastic cover plate according to an embodiment of the present disclosure. FIG. 1A illustrates a thermoplastic cover plate 10*a* and a thermoplastic base plate 20*a*. The thermoplastic base plate 20*a* comprises an inlet channel recess 22*a*, an outlet channel recess 24*a*, one or more isolation beds 40*a* comprising microposts, bifurcated channel recesses 30*a* that connect the inlet channel recess 22*a* to the one or more isolation beds 40*a*, and bifurcated channel recesses 31*a* that connect the outlet channel recess 24*a* to the one or more isolation beds 40*a*. The thermoplastic cover plate 10*a* comprises a second inlet channel recess 12*a* and a second outlet channel recess 14*a*. The opposing side of thermoplastic cover plate 10*a* comprises an inlet port 70*a* connected to the second inlet channel recess 12*a*, and an outlet port 72*a* connected to the second outlet channel recess 14*a*.

Figure 1B:
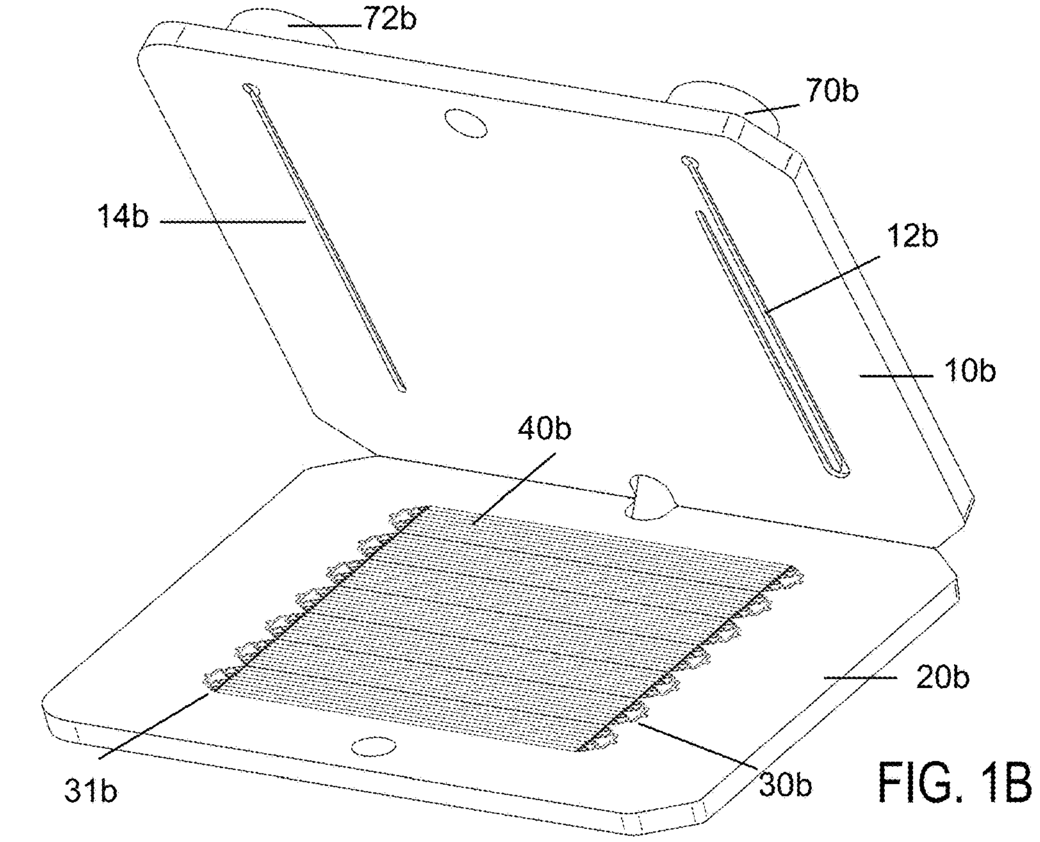
FIG. 1B is a perspective view of a thermoplastic base plate and a thermoplastic cover plate according to an alternative embodiment of the present disclosure.

FIG. 1B is another example of components of a thermoplastic microfluidic chip prior to bonding and provides a perspective view of a thermoplastic base plate and a thermoplastic cover plate according to an alternative embodiment of the present disclosure. FIG. 1B illustrates the thermoplastic cover plate 10*b* and a thermoplastic base plate 20*b*. The thermoplastic base plate 20*b* comprises one or more isolation beds 40*b* comprising microposts, and bifurcated channel recesses 30*b* and 31*b* that are connected to the one or more isolation beds 40*b*. The thermoplastic cover plate 10*b* comprises an inlet channel recess 12*b* and an outlet channel recess 14*b*. In this alternative embodiment, only the thermoplastic cover plate 10*b* has an inlet channel recess and an outlet channel recess. The opposing sides of thermoplastic cover plate 10*b* comprises an inlet port 70*b* connected to the second inlet channel recess 12*b*, and an outlet port 72*b* connected to the second outlet channel recess 14*b*. In a further alternative embodiment, only the thermoplastic cover plate 10*b* has an inlet channel recess and an outlet channel recess, and bifurcated channel recesses.

Figure 2A:
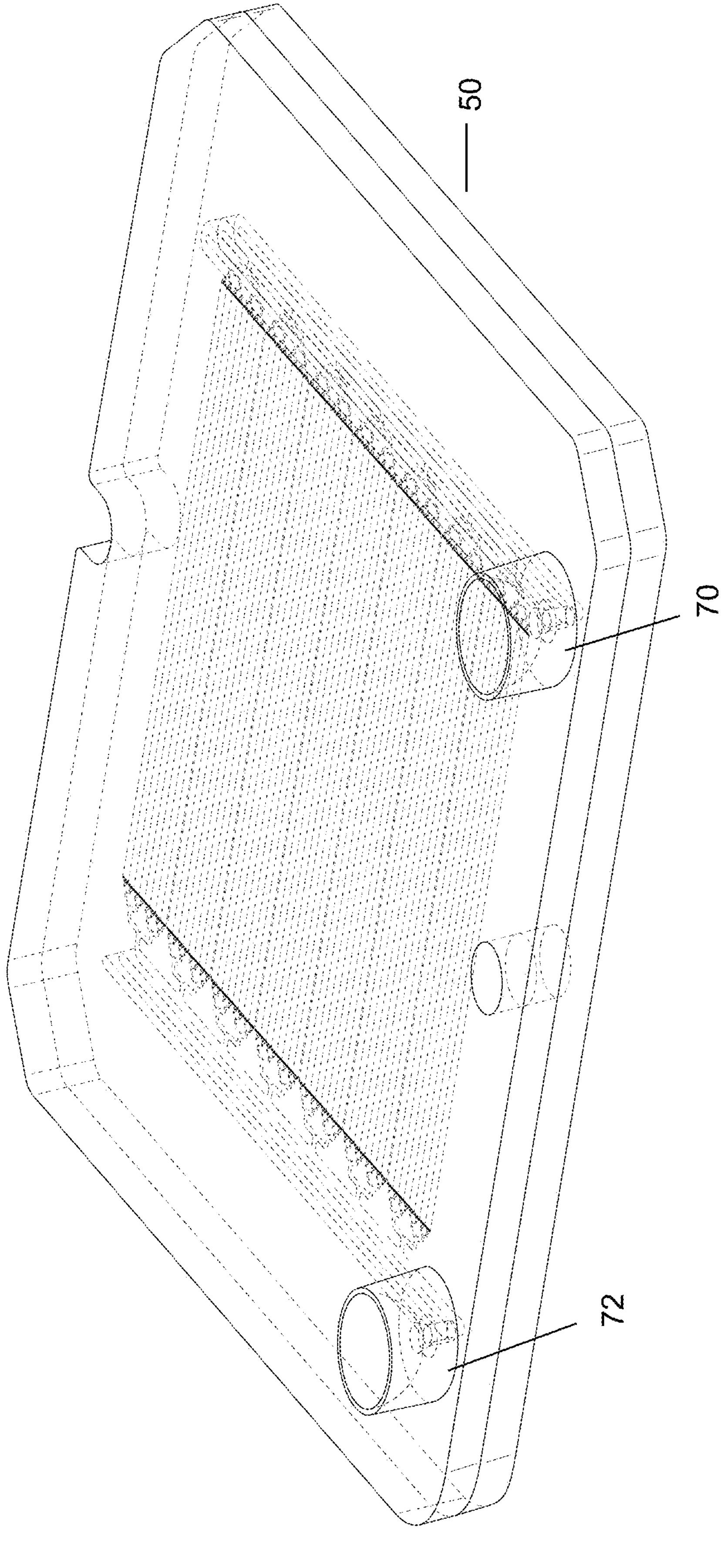
FIG. 2A is a perspective view of a bonded thermoplastic chip according to an embodiment of the present disclosure, wherein a thermoplastic base plate and a thermoplastic cover plate are bonded together.

FIG. 2A is a perspective view of a bonded thermoplastic chip 50 according to an embodiment of the present disclosure, wherein a thermoplastic base plate and a thermoplastic cover plate are bonded together. FIG. 2A illustrates the inlet port 70 and outlet port 72.

Figure 2B:
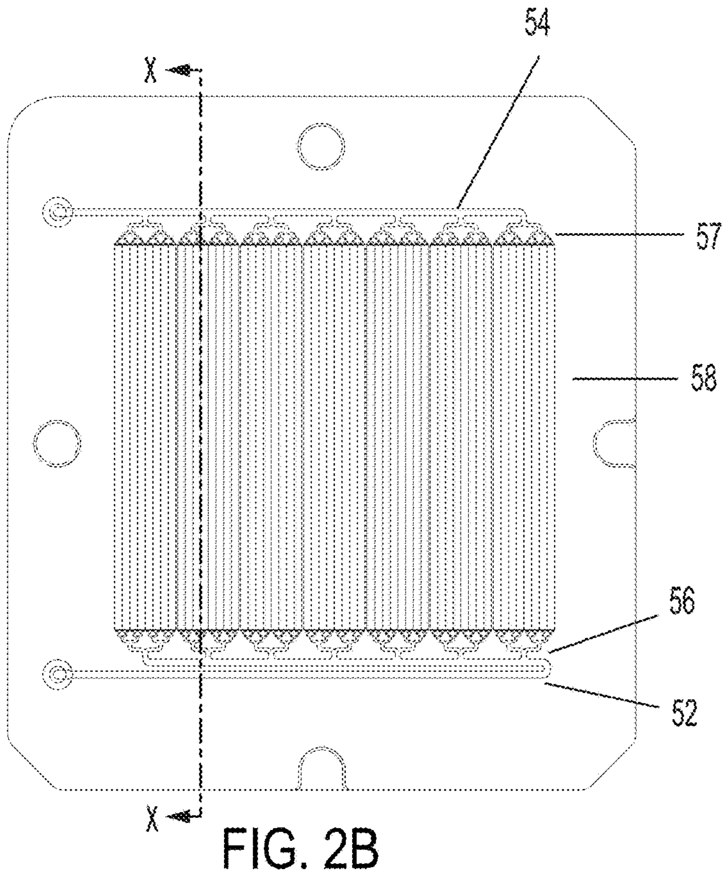
FIG. 2B is a top view of a bonded thermoplastic chip and FIG. 2C is a magnified top view of bifurcated channels according to an embodiment of the present disclosure.

FIG. 2B is a top view of a bonded thermoplastic chip. FIG. 2B illustrates a bonded thermoplastic chip 50 comprising an inlet channel 52, an outlet channel 54, one or more isolation beds 58, bifurcated channels 56 that connect the inlet channel 52 to the one or more isolation beds 58, and bifurcated channels 57 that connect the outlet channel to the one or more isolation beds 58. In an embodiment, the inlet channel 52 and the outlet channel 52 are parallel to each other and the isolation beds 58 are perpendicular to the inlet channel 52 and the outlet channel 52. The inlet channel 52 or the outlet channel 52 may be linear, or substantially linear (e.g. substantially linear and curved at portions along the length of the channel) The dotted line x represents where exemplary cross sections as illustrated in FIG. 3A and FIG. 3B could be.

The thermoplastic base plate and thermoplastic cover plate can be formed by injection molding or hot embossing techniques known in the art. In one embodiment, the thermoplastic substrate is cyclic olefin copolymer (COC), polycarbonate (PC), polymethylmethacrylate, (PMMA), polystyrene (PS), polyvinylchloride (PVC), and polyethyleneterephthalate glycol (PETG). In another embodiment, the thermoplastic substrate is cyclic olefin polymer (COP).

Figure 2C:
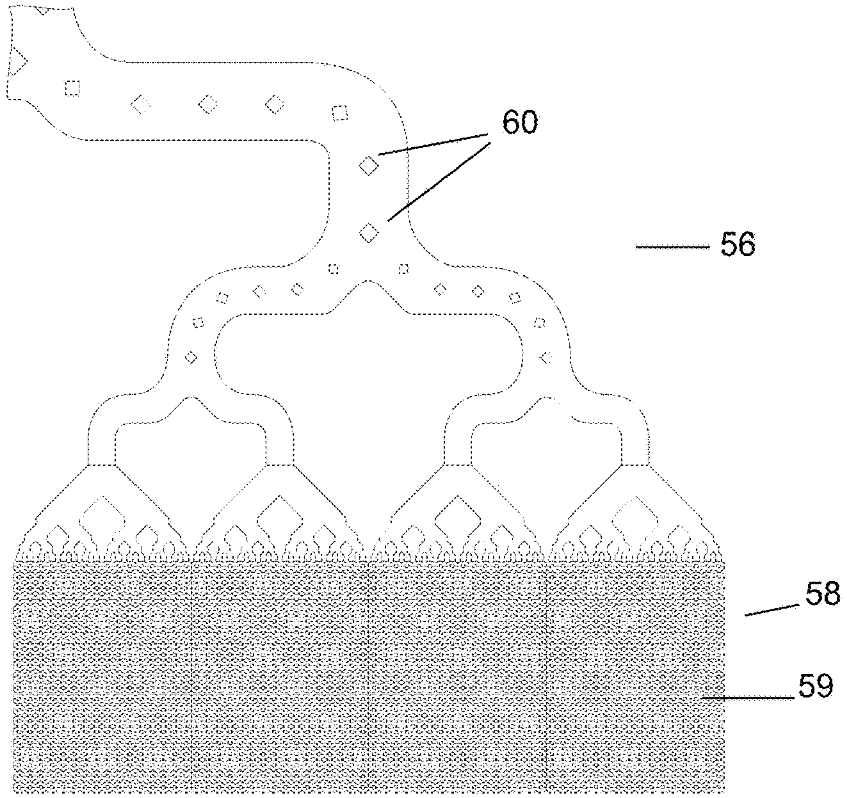

FIG. 2C is a magnified top view of bifurcated channels according to an embodiment of the present disclosure. FIG. 2C more clearly illustrates the multiple branches of the bifurcated channels 56 and one or more isolation beds 58 comprising microposts 59. In an embodiment, the bifurcated channels 56 can comprise support microposts 60.

Figure 3A:
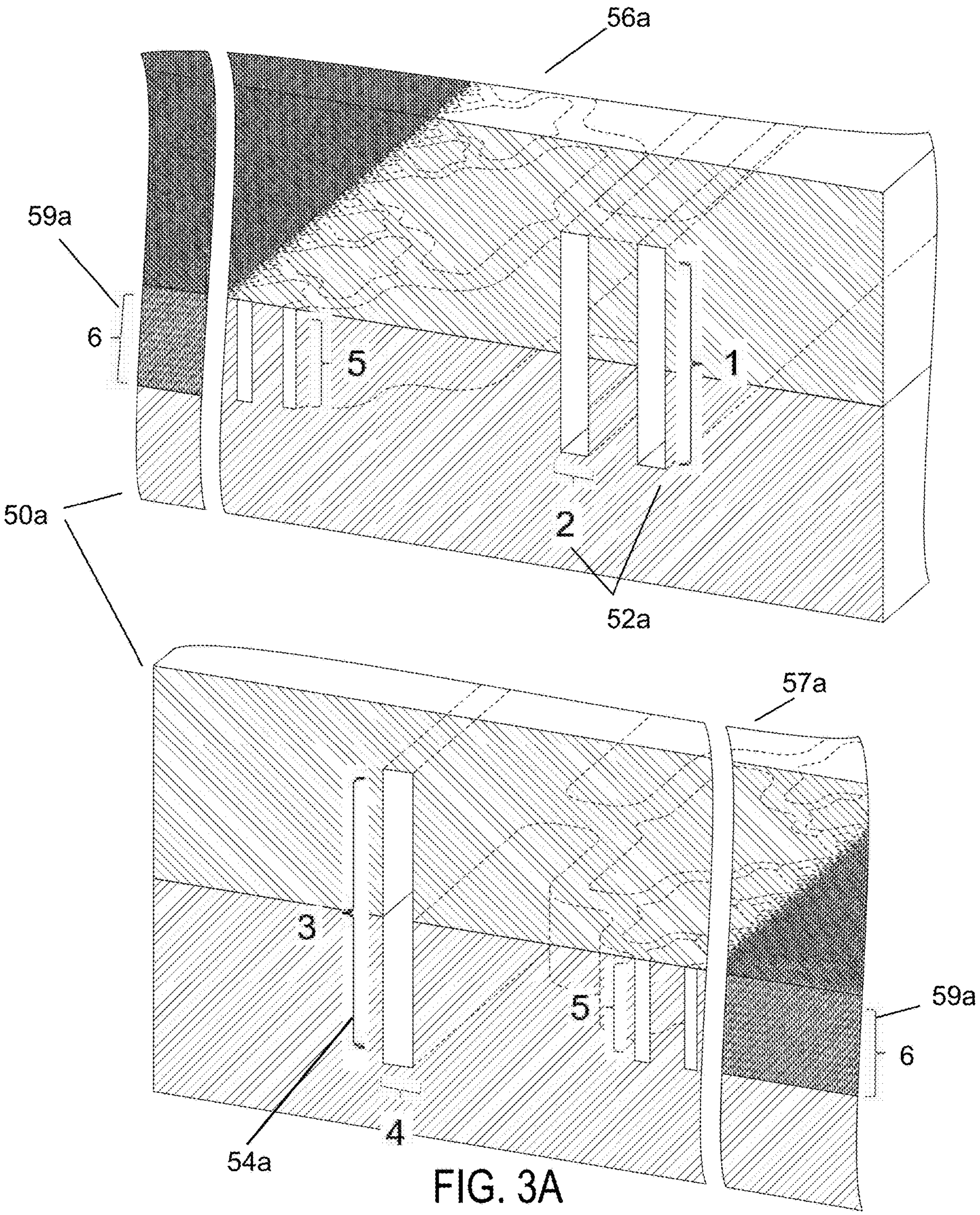
FIG. 3A is a cross-section view of portions of a bonded thermoplastic chip illustrating the cross-section dimensions of the inlet channels and outlet channels according to an embodiment of the present disclosure.
Figure 3B:
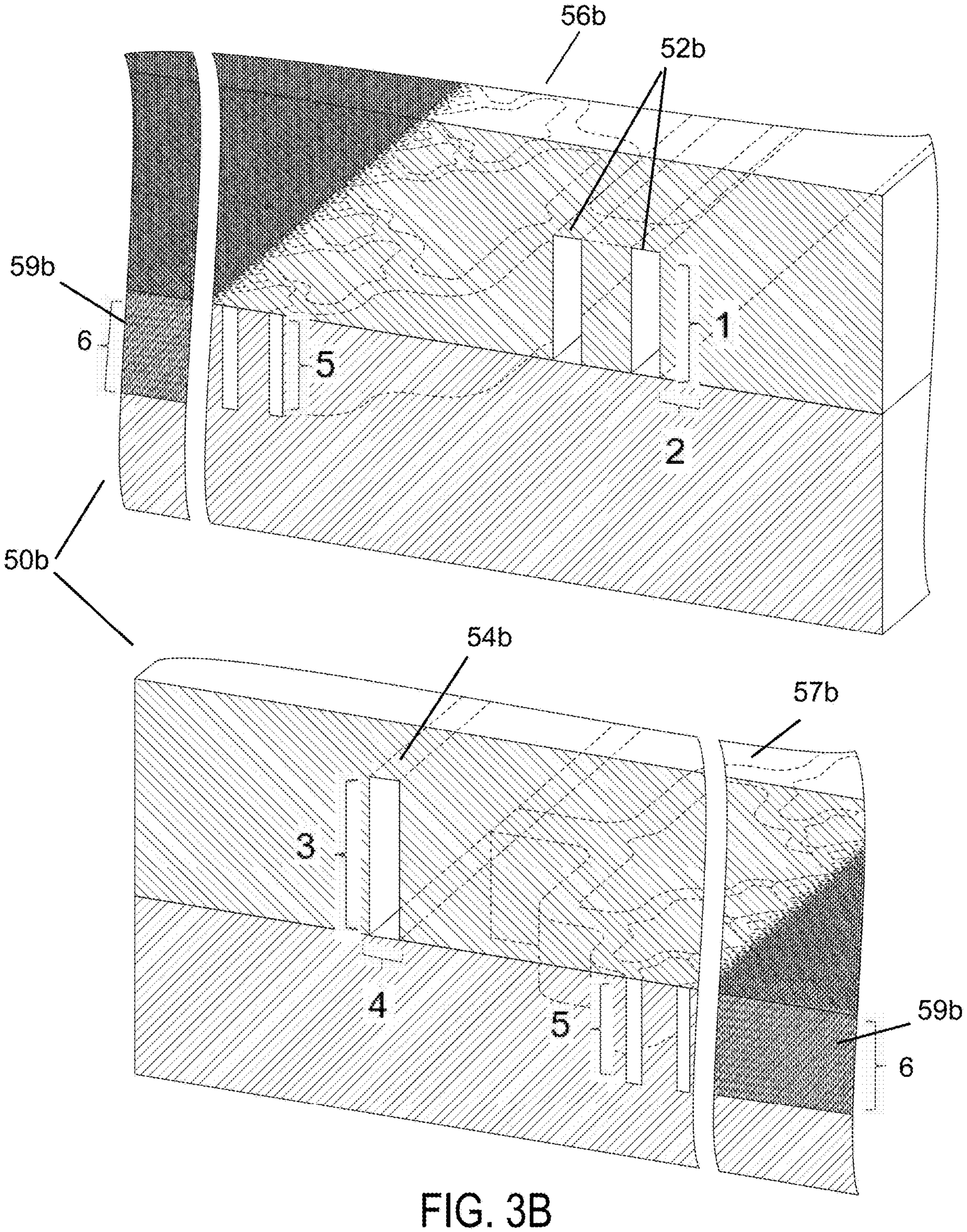
FIG. 3B is a cross-section view of portions of a bonded thermoplastic chip illustrating the cross-section dimensions of the inlet channels and outlet channels according to an alternative embodiment of the present disclosure.

FIG. 3A is a cross-section view of portions of a bonded thermoplastic chip **50*a* illustrating the cross-section dimensions of the inlet channel 52*a* and outlet channel 54*a* according to an embodiment of the present disclosure. FIG. 3A illustrates the dual-depth structure of the single fluidic layer of the bonded thermoplastic chip 50*a* according to an embodiment of the present disclosure. In particular, FIG. 3A illustrates the cross-section of the inlet channel 52*a* has a height 1 and width 2; the cross-section of the outlet channel 54*a* has a height 3 and width 4; and wherein the inlet channel height 1 and the outlet channel height 3 are each greater than the height 5 of the bifurcated channels 56*a* and 57*a*, and the height 6 of the microposts 59*a*. In one embodiment, the cross-section of the inlet channel and the cross-section of the outlet channel each has a rectangular shape or oval shape. In one embodiment, a portion of the cross-section of the inlet channel and a portion of the cross-section of the outlet channel each does not have semicircular, triangular, or trapezoidal shape. In an embodiment, the cross-sections of the inlet channel 52*a* and the outlet channel 54*a* each has a rectangular shape. FIG. 3A corresponds to a thermoplastic chip formed from bonding the thermoplastic cover plate 10*a* and a thermoplastic base plate 20*a* shown in FIG. 1A above, wherein the thermoplastic cover plate 10*a* and a thermoplastic base plate 20*a* each had an inlet channel recess and outlet channel recess. As shown in FIG. 3A, the bonded thermoplastic cover plate 10*a* adds depth to the inlet channel and the outlet channel of the bonded thermoplastic chip 50*a* such that the inlet channel height 1 and the outlet channel height 3 are each greater than the height 5 of the bifurcated channels 56*a* and 57*a*, and the height 6 of the microposts 59*a***.

FIG. 3B is a cross-section view of portions of a bonded thermoplastic chip **50*b* illustrating the cross-section dimensions of the inlet channels 52*b* and outlet channels 54*b* according to an alternative embodiment of the present disclosure. FIG. 3B illustrates the dual-depth structure of the single fluidic layer of the bonded thermoplastic chip 50*b* according to an alternative embodiment of the present disclosure. In particular, FIG. 3B illustrates the cross-section of the inlet channel 52*b* has a height 1 and width 2; the cross-section of the outlet channel 54*b* has a height 3 and width 4; and wherein the inlet channel height 1 and the outlet channel height 3 are each greater than the height 5 of the bifurcated channels 56*b* and 57*b*, and the height 6 of the microposts 59*b*. In one embodiment, the cross-section of the inlet channel and the cross-section of the outlet channel each has a rectangular shape or oval shape. In one embodiment, a portion of the cross-section of the inlet channel and a portion of the cross-section of the outlet channel each does not have semicircular, triangular, or trapezoidal shape. In an embodiment, the cross-sections of the inlet channel 52*b* and the outlet channel 54*b* each has a rectangular shape. In this embodiment, the aspect ratio of each of the inlet channel 52*b* and the outlet channel 54*b* is about 1. FIG. 3B corresponds to a thermoplastic chip formed from bonding the thermoplastic cover plate 10*b* and a thermoplastic base plate 20*b* shown in FIG. 1B above, wherein only the thermoplastic cover plate 10*b* had an inlet channel recess and an outlet channel recess. A portion of the bifurcated channels 56*b* overlaps vertically with the inlet channel 52*b* such that the bifurcated channels 56*b* are connected to the inlet channel 52*b*. A portion of the bifurcated channels 57*b* overlaps vertically with the outlet channel 54*b* such that the bifurcated channels 57*b* are connected to the outlet channel 54*b*. As shown in FIG. 3B, the bonded thermoplastic cover plate 10*b* adds depth to the bonded thermoplastic chip 50*a* and permits the inlet channel height 1 and the outlet channel height 3 to be greater than the height 5 of the bifurcated channels 56*b* and 57*b*, and the height 6 of the microposts 59*b***.

In an embodiment, the cross-section of the inlet channel and outlet channel each have a height in the range of about 40 μm to about 500 μm. Preferably, the cross-section of the inlet channel and outlet channel each have a height in the range of about 100 to about 500 μm, about 150 μm to about 400 μm, about 200 μm to about 300 μm, or about 225 μm to about 275 μm. Preferably, the cross-section of the inlet channel and outlet channel each have a height of about 250 μm. In an embodiment, the cross-section of the inlet channel and outlet channel each have a width in the range of about 100 μm to about 500 μm. Preferably, the cross-section of the inlet channel and outlet channel each have a width in the range of about 200 μm to about 500 μm, about 300 μm to about 500 μm, about 350 μm to about 450 μm, or about 375 μm to about 425 μm. Preferably, the cross-section of the inlet channel and outlet channel each have a width of about 400 μm. In an embodiment, the cross-section of the inlet channel and outlet channel each have an aspect ratio (height:width) of about 1:4 to about 4:1. The term "about" as used herein to refer to an integer shall mean+/−10%, 9%, 8%, 7%, 6%, 5%, 4%, 3%, 2%, or 1% of that integer. Alternatively, the range encompassed by the term "about" is informed by the range of specific activity covered by the term about, i.e. inlet channel height and outlet channel cross-section dimensions (height, width) and aspect ratio for maintaining a low pressure environment for operability of a dual-depth thermoplastic microfluidic device with a fluid-tight flow system (e.g., as embodied in the Liquid Scan liquid handling system). In other embodiments, the cross-section of the inlet channel and outlet channel each have a height in the range of 40 μm to 500 μm, 100 to 500 μm, 150 μm to 400 μm, 200 μm to 300 μm, or 225 μm to 275 μm. Preferably, the cross-section of the inlet channel and outlet channel each have a height of 250 μm. In other embodiments, the cross-section of the inlet channel and outlet channel each have a width in the range of 100 μm to 500 μm, 200 μm to 500 μm, 300 μm to 500 μm, 350 μm to 450 μm, or 375 μm to 425 μm. Preferably, the cross-section of the inlet channel and outlet channel each have a width of 400 μm.

In an embodiment, the cross-section of the inlet channel and the cross-section of the outlet channel each has a rectangular shape. The resistance (R) of a rectangular geometry to flow of fluid with given viscosity (μ) can be expressed as:

$$R = \frac{2(Ref)\mu L}{D_h^2}$$

where the channel's geometry is defined by its width (W), height (H), cross-sectional area (A=W·H), perimeter (P=2W+2H), and length (L). The hydraulic diameter ($D_h$) is given by 4A/P, and the product of the Reynolds number and friction factor (Ref) is approximated by Kays and Crawford [W. M. Kays, M. E. Crawford, Convective Heat and Mass Transfer, 2d ed., McGraw-Hill, New York, 1980] as 13.84+10.38exp(−3.4/α), where α is the channel's aspect ratio (≥1).

The pressure drop observed in such a channel can be then calculated as:

$$\Delta P = R \cdot V = \frac{R \cdot F}{A}$$

where (V) is the average linear velocity and (F) is a volumetric flow rate of the liquid. The inverse second power dependence of channel resistance on hydraulic diameter is the dominating factor when selecting the optimal channel geometry with regards to minimizing pressure drop. For example, cross-section dimensions of 50 μm (height) times 400 μm (width) results in hydraulic diameter of 89 μm. Increasing the channel depth 5 times to 250 μm will result in the increase of $D_h$ by a factor of 3.46 to 308 μm which will reduce the channel resistance by a factor of 12 and, in conjunction with 5× increase in the channel cross-sectional area, will reduce the pressure drop in the new channel by a factor 60 for the specific volumetric flow rate. On the other hand, increasing the channel width 5 times to 2 mm will increase the $D_h$ by only about 10% to 98 μm which will result in the pressure drop reduction by the multiple of 6 for the same flow rate. In this hypothetical example, the channel width would have to be increased 50× to achieve the pressure drop reduction comparable to reduction resulting from 5× increase of channel depth.

The bifurcated channels split flow of a liquid from the inlet channel to the one or more isolation beds such that the liquid enters the one or more isolation beds at multiple point uniformly. The bifurcated channels permit increased capacity of the one or more isolation beds. In an embodiment, the cross-section of the bifurcated channels have a height in the range of about 40 μm to about 60 μm. Preferably, the cross-section of the bifurcated channels have a height in the range of about 40 μm to about 60 μm. Preferably, the cross-section of the bifurcated channels have a height in the range of about 45 μm to about 55 μm. The term "about" as used herein to refer to an integer shall mean+/−10%, 9%, 8%, 7%, 6%, 5%, 4%, 3%, 2%, or 1% of that integer. Alternatively, the range encompassed by the term "about" is informed by the range of specific activity covered by the term about, i.e. bifurcated channel height for providing uniform distribution of liquid flow to the one or more isolation beds. In other embodiments, the cross-section of the bifurcated channels have a height in the range of 40 μm to 60 μm, or 45 μm to 55 μm.

Figure 4A:
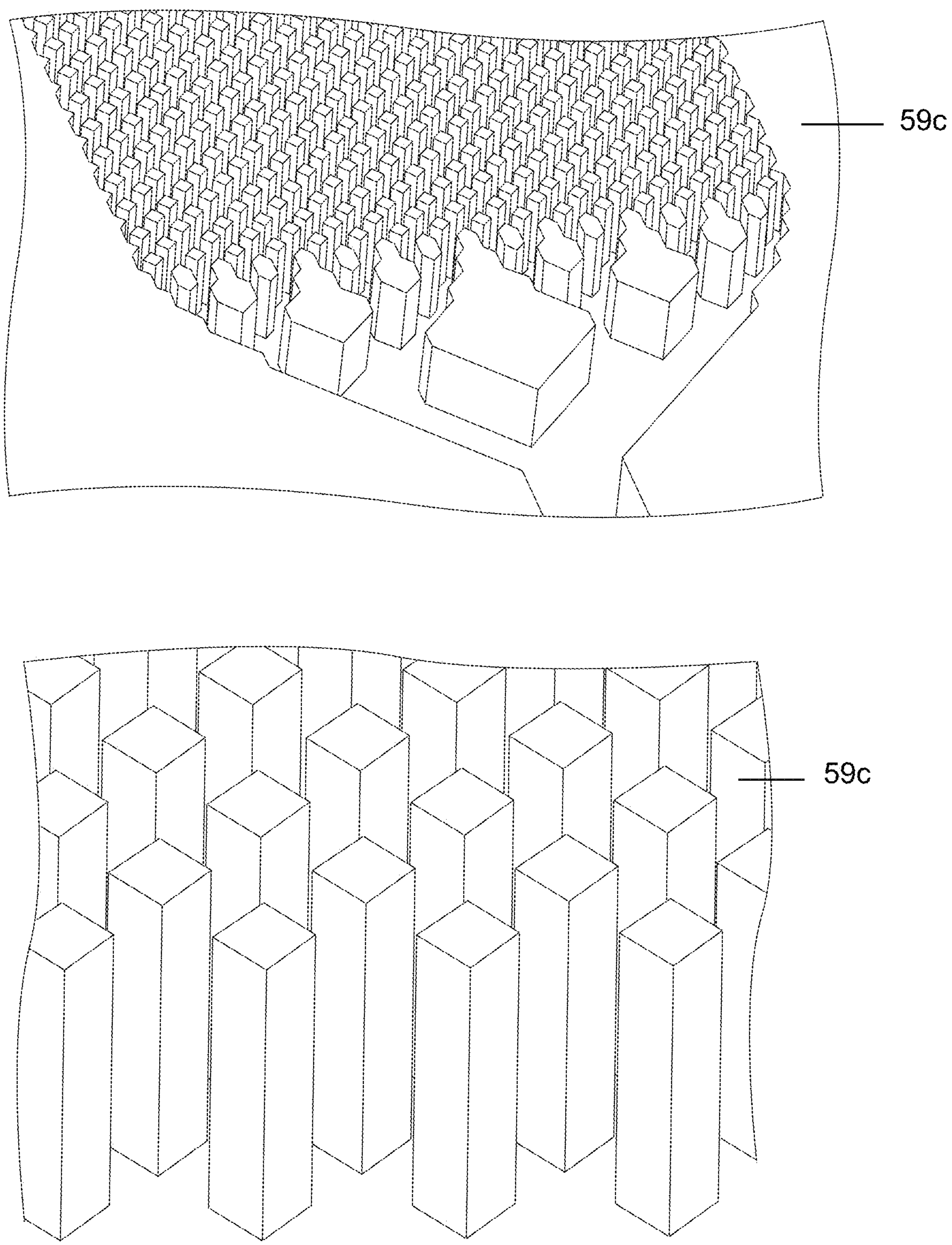
FIG. 4A is a perspective magnified views of microposts according to an embodiment of the present disclosure.
Figure 4B:
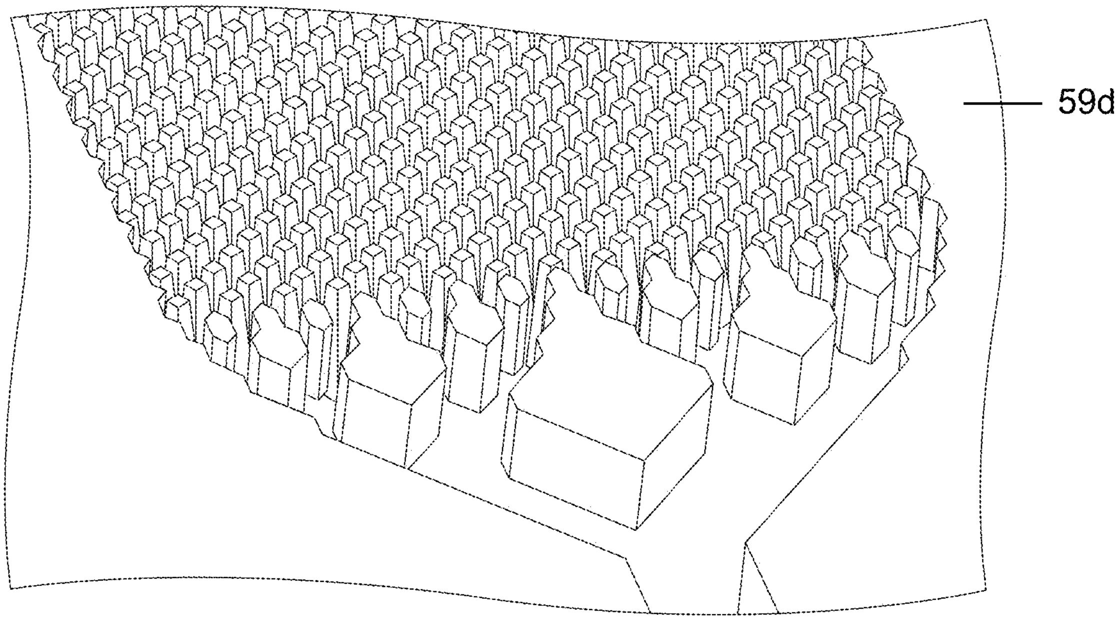
FIG. 4B is a perspective magnified views of microposts according to an embodiment of the present disclosure.
Figure 4B:
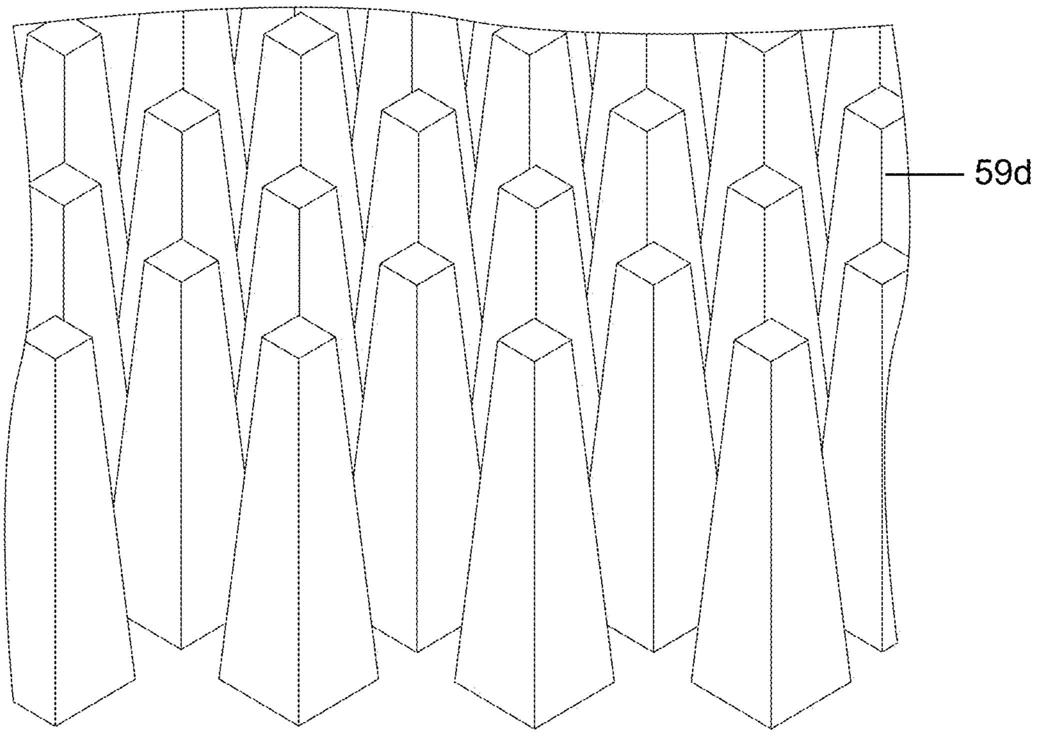

FIG. 4A is a perspective magnified views of microposts 59$c$ with a square or diamond shape (horizontal cross-section), according to an embodiment of the present disclosure, wherein each micropost has a height 6 and micropost width 7. In another embodiment, the microposts may have a circular shape (horizontal cross-section). In an embodiment the microposts are arranged diagonally and uniformly across the one or more isolation beds. FIG. 4B is a perspective magnified views of microposts 59$d$ with a tapered square or diamond horizontal cross-section shape, according to an embodiment of the present disclosure, wherein each micropost has a height 6, top micropost width 8, and base micropost width 9. In an embodiment the microposts are arranged diagonally and uniformly across the one or more isolation beds.

In an embodiment, the thermoplastic chip is about 40 mm by about 40 mm. In on embodiment, the chip is 42 mm by 38 mm. In an embodiment, the one or more isolation bed(s) 58 and micropost density can be tailored to the target analyte load. In an embodiment, the dual-depth thermoplastic microfluidic chip comprises one isolation bed to which all bifurcated channels are connected. In an embodiment, the dual-depth thermoplastic microfluidic device comprises two or more isolation beds in parallel. In an embodiment, the isolation bed size is about 20 mm to about 25 mm (in length) by about 2 mm to about 5 mm (width). In an embodiment, each of the microposts has a height in the range of about 40 μm to about 60 μm. Preferably, the microposts have a height of about 50 μm. In an embodiment, each of the microposts has a width, top width, or base width in the range of about 5 μm to about 15 μm. Preferably, the microposts have a width, top width, or base width of about 10 μm. In an embodiment, at least a portion of the microposts are spaced apart by about 5 μm to about 15 μm. Preferably, a portion of the microposts are spaced apart by about 10 μm. The term "about" as used herein to refer to an integer shall mean+/−10%, 9%, 8%, 7%, 6%, 5%, 4%, 3%, 2%, or 1% of that integer. Alternatively, the range encompassed by the term "about" is informed by the range of specific activity covered by the term about, i.e. micropost dimension (height, width), inter-micropost spacing, and/or isolation bed length to accommodate a target analyte load and recovery. For example, small micropost size and/or small inter-micropost spacing (or increased micropost density) could help increase the analyte load by decreasing diffusional distances; and increased isolation bed lengths could help increase the analyte load by increasing residence time for potential contact with capture elements, such as mAbs, immobilized on micropost surfaces. In other embodiments, the microposts have a height in the range of 40 μm to 60 μm, and preferably a height of 50 μm. In some embodiments, the microposts have a width, top width, or base width in the range of 5 μm to 15 μm, and preferably a width, top width, or base width of 10 μm. In other embodiments, a portion of the microposts are spaced apart by 5 μm to 15 μm, and preferably spaced apart by 10 μm.

In an embodiment, capture elements are immobilized on the micropost surface. A capture element is any agent or any moiety or group thereof that specifically binds to an analyte molecule of interest. In some embodiments, the capture elements are antibodies, antigen binding fragments of antibodies, or aptamers. In an embodiment, the capture elements are monoclonal antibodies (mAbs). In an embodiment, the mAbs are immobilized by single-stranded oligonucleotide bifunctional cleavable linker, or a photocleavable linker, or amine coupling with EDC/NHS (1-ethyl-3-(3-dimethylaminopropyl) carbodiimide (EDC)/N-Hydroxysuccinimide (NHS)). In an embodiment, the mAbs are immobilized by surface-bound carboxylic acid groups. In an embodiment, the capture elements are surface-bound oxygen-rich moieties. In an embodiment, the capture elements are surface-bound carboxylic acid groups, salicylates, or esters.

Kits

Described herein are exemplary embodiments of a kit comprising the dual-depth thermoplastic microfluidic device as described herein, and at least one reagent or buffer for use in processing a liquid sample using the dual-depth thermoplastic microfluidic device. In an embodiment, the kit can further comprise one or more sealable containers for collecting a liquid sample. In an embodiment, the reagent is a reagent used to isolate, concentrate, purify, or release an analyte. In an embodiment, the buffer is an immobilization buffer, a blocking buffer, or a washing buffer.

Dual-Depth Microfluidic Device Manufacture

Described herein is a method of making a dual-depth microfluidic device. In an embodiment, a method of making a dual-depth microfluidic device comprises providing a first thermoplastic plate that comprises a first inlet channel recess, a first outlet channel recess, one or more isolation beds comprising a plurality of micropost; wherein each of the microposts has a height in the range of about 40 μm to about 60 μm, and a width in the range of about 5 μm to about 15 μm; and wherein at least a portion of the microposts are spaced apart by about 5 μm to about 15 μm; providing a second thermoplastic plate that comprises a second inlet channel recess and a second outlet channel recess; wherein either the first thermoplastic plate or the second thermoplastic plate further comprises bifurcated channel recesses; bonding the first thermoplastic plate and the second thermoplastic plate, wherein the bonded first inlet channel recess and the second inlet channel recess forms an inlet channel with a height in the range of about 40 μm to about 500p m, and wherein the bonded first outlet channel recess and the second outlet channel recess forms an outlet channel with a height in the range of about 40 μm to about 500 μm, and wherein the bonded first thermoplastic plate and the second thermoplastic plate forms bifurcated channels that connect the one or more isolation beds to the inlet channel and outlet channel, and wherein the inlet channel, the outlet channel, the bifurcated channels, and the one or more isolation beds form a single dual-depth fluidic layer.

In another embodiment, a method of making a dual-depth microfluidic device comprises providing a first thermoplastic plate that comprises bifurcated channel recesses, and one or more isolation beds comprising a plurality of microposts; wherein each of the microposts has a height in the range of about 40 μm to about 60 μm, and a width in the range of about 5 μm to about 15 μm; and wherein at least a portion of the microposts are spaced apart by about 5 μm to about 15 μm; providing a second thermoplastic plate that comprises an inlet channel recess, an outlet channel recess, wherein the inlet channel and outlet channel recess have a height in the range of about 40 μm to about 500 μm; bonding the first thermoplastic plate and the second thermoplastic plate; wherein the bonded first thermoplastic plate and the second thermoplastic plate forms bifurcated channels that connect the one or more isolation beds to the inlet channel and outlet channel, and wherein the inlet channel, the outlet channel, the bifurcated channels, and the one or more isolation beds form a single dual-depth fluidic layer.

The thermoplastic plates may be manufactured by hot embossing or injection molding. In one embodiment, the first thermoplastic plate and second thermoplastic plate are injection molded thermoplastic plates. In another embodiment, the first thermoplastic plate and second thermoplastic plate are formed from hot embossing. Both embossing processes and injection molding processes are well known to one of ordinary skill in the art.

Soft lithography and laser ablation are not preferred for producing a dual-depth microfluidic device as described herein. Soft lithography is often limited to use of polydimethylsiloxane (PDMS) to fabricate microfluidic structures. PDMS is a problematic material for producing microfluidic devices due to surface chemistry issues, such as hydrophobicity of native PDMS, hydrophobic recovery of the oxygen plasma treated PDMS surface (i.e. loss of hydrophilic behavior over time), porosity toward small organic molecules, etc. Moreover, PDMS has a high cost in mass production resulting from difficulties associated with relatively long curing process of casted PDMS resin in high scale manufacturing. Laser ablation involves melting, vaporizing, and ejecting material by laser irradiation; which in turn creates pores, deposits material residue, and generates high surface roughness, all of which are problematic for producing reliable microfluidic structures. For example, such structural infidelity weakens bonding with other surface and the integrity of microfluidic structures formed therefrom. Surface treatments to reduce surface roughness of laser ablated thermoplastics typically requires solvents and thermal cycles that deform channel geometry, crack the surface, or cause residual deposits.

In an embodiment, the thermoplastic material of the thermoplastic plates described herein, and accordingly the dual-depth thermoplastic microfluidic device described herein, may be cyclic olefin copolymer (COC), cyclic olefin polymer (COP), and polycarbonate (PC). Other materials include: polymethylmethacrylate, (PMMA), polystyrene (PS), polyvinylchloride (PVC), cyclic olefin copolymer (COC) and polyethyleneterephthalate glycol (PETG).

In an embodiment, the mold master or mold insert is produced via optical lithography. In an embodiment the mold master or mold insert is produced via optical lithography using photoresist spin coated onto a Si wafer, resist development, and electroplating (Ni electroplated from resist-patterned Si wafer). In another embodiment, the mold master or mold insert is produced via deep reactive-ion etching (DRIE).

In an embodiment, the first thermoplastic plate and the second thermoplastic plate are UV activated. In an embodiment, the first thermoplastic plate and the second thermoplastic plate are UV/$O_3$ activated. In an embodiment, the first thermoplastic plate and the second thermoplastic plate comprise surface-bound carboxylic acid groups. In an embodiment, the first thermoplastic plate and the second thermoplastic plate comprise high —COOH surface density.

In an embodiment, the first thermoplastic plate and the second thermoplastic plate are precisely aligned and thermally fusion bonded.

Microfluidic System

Described herein are exemplary embodiments of a microfluidic system comprising the dual-depth thermoplastic microfluidic device. In one embodiment, a microfluidic system comprises a dual-depth thermoplastic microfluidic device, wherein the dual-depth thermoplastic microfluidic device further comprises an inlet port in fluid communication with an outlet port; a first automated pipetting channel comprising a first pump, and a first pipette tip coupled to the inlet port; a second automated pipetting channel comprising a second pump, and a second pipette tip coupled to the outlet port; and a non-transitory computer readable medium in communication with the first pump and the second pump, and programmed to command the first pump of the first automated pipetting channel and the second pump of the second automated pipetting channel to control flow of a liquid through the dual-depth thermoplastic microfluidic device.

Figure 5A:
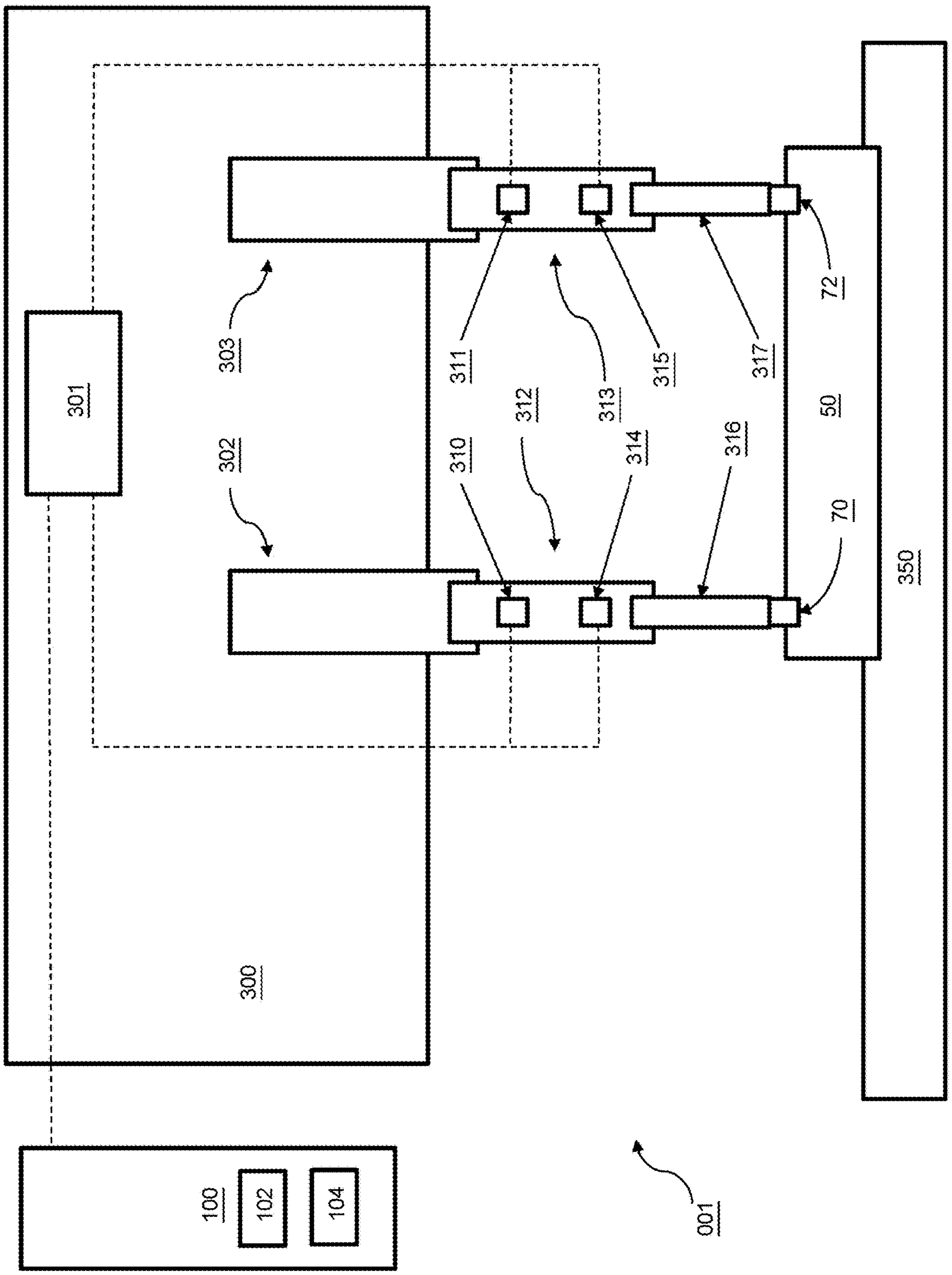
FIG. 5A is a schematic diagram of an example fluid-tight flow system according to embodiments of the present disclosure, and additional components of real-time feedback control according to embodiments of the present disclosure.
Figure 5B:
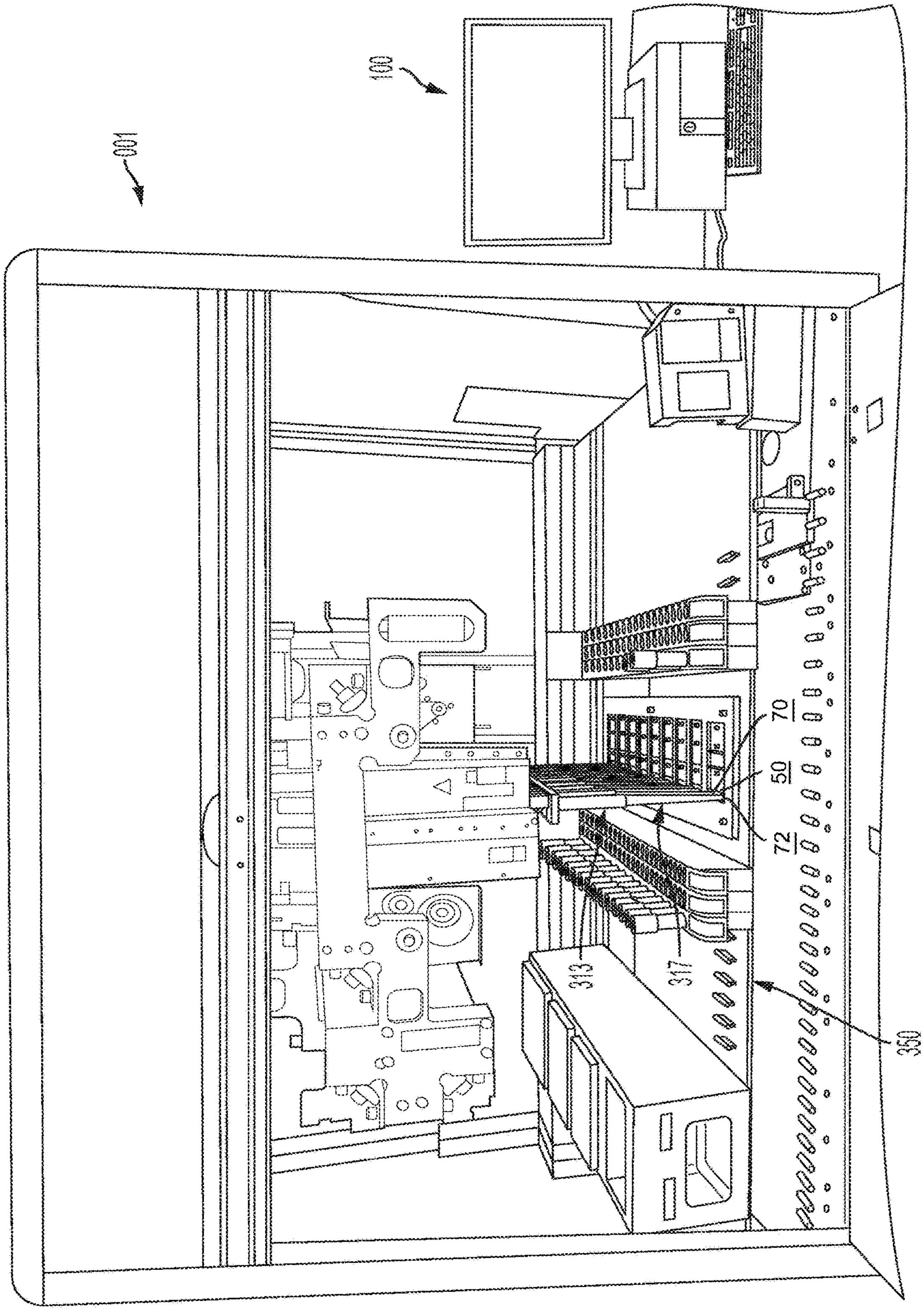
FIG. 5B illustrates an example fluid-tight flow system including a controller, a pipetting instrument, e.g. an automated liquid handler, comprising multiple automated pipetting channels, multiple microfluidic chips each with an inlet port and outlet port, and an instrument deck to support the microfluidic chip, pipette tips, samples, reagents, workstations for sample processing.
Figure 5C:
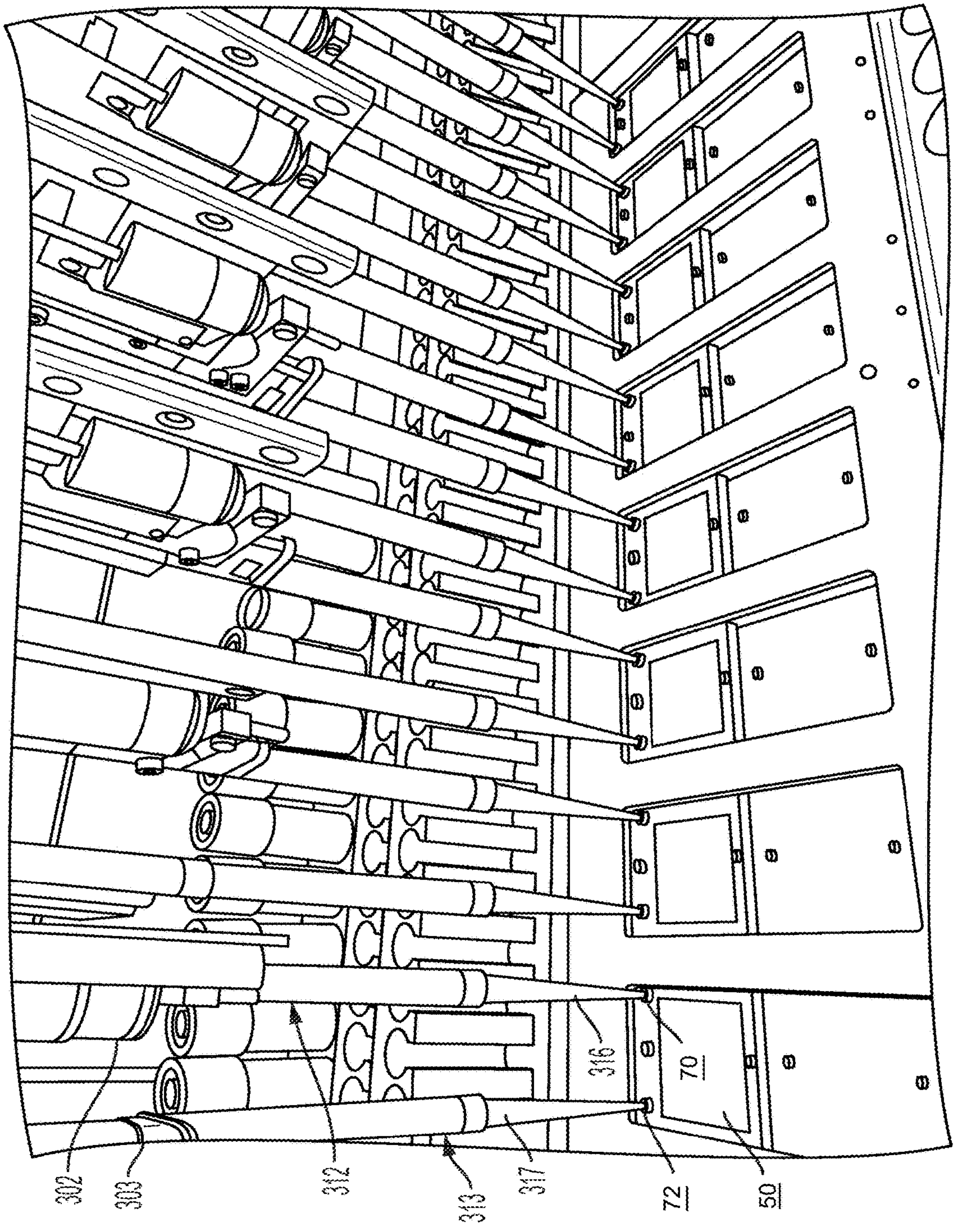
FIG. 5C is a perspective view of multiple pipetting channels and microfluidic chips, wherein the pipette tips are coupled to the inlet port and outlet port of the respective microfluidic chip, according to embodiments of the present disclosure.

FIG. 5A is a schematic diagram of an example fluid-tight flow system according to embodiments of the present disclosure, and additional components of real-time feedback control according to embodiments of the present disclosure. FIG. 5A illustrates an example fluid-tight flow system including a controller 100, a pipetting instrument 001 comprising two automated pipetting channels 312 and 313, and a microfluidic chip 50. The microfluidic chip 50 comprises an inlet port 70, an outlet port 72, microchannels (e.g. micron-sized channels) such as bifurcated channels 56 and micron-sized isolation bed(s) 58 (shown in FIG. 1A, FIG. 1B, FIG. 2A, FIG. 2B, and FIG. 2C). FIG. 5B illustrates an example fluid-tight flow system including a controller 100, e.g. embodied in a computer; a pipetting instrument 001, e.g. an automated liquid handler, comprising multiple automated pipetting channels, e.g. 312 and 313; multiple microfluidic chips, e.g. 50, each with an inlet port and outlet port, e.g. 70 and 72, respectively; and an instrument deck 350 to support the microfluidic chip 50, pipette tips, samples, reagents, workstations for sample processing. FIG. 5C is a perspective view of multiple pipetting channels, e.g. 312 and 313, and microfluidic chips, e.g. 50, wherein the pipette tips, e.g. 316 and 317, are coupled to the inlet port, e.g. 70, and outlet port, e.g. 72, of the respective microfluidic chip, e.g. 50, according to embodiments of the present disclosure.

A first automated pipetting channel 312 comprises a pump 308 (shown in FIG. 6A) and a pipette tip 316 that contains a liquid sample (not shown) and is coupled to the inlet port 70. A second automated pipetting channel 313 comprises a pump 309 (shown in FIG. 6A) and a pipette tip 317 that is coupled to the outlet port 72. In one embodiment, the pipette tips 316 and 317 are simultaneously coupled to the inlet port 70 and the outlet port 72, respectively. In one embodiment, the pipette tips 316 and 317 are disposable pipette tips. The two automated pipetting channels 312 and 313 are configured and operative to control fluid flow of a liquid sample from the pipette tip 316 and through the microfluidic chip 50 via the inlet port 70, microchannels (e.g. micron-sized channels) such as bifurcated channels 56, micron-sized isolation bed(s) 58, and outlet port 72 (shown in FIG. 1A, FIG. 1B, FIG. 2A, FIG. 2B, and FIG. 2C). The liquid sample may flow through the microfluidic chip into the pipette tip 317 of the second automated pipette 313 or a sample container (not shown).

The pipetting instrument 001 may be an automated liquid handling system such as Biomek™ FX from Beckman-Coulter, Inc. (Brea, Calif.), Freedom EVO™ from Tecan Group, Ltd. (Switzerland), and STAR Line™ from Hamilton Company (Reno, Nev.). In one embodiment, the pipetting instrument 001 comprises an instrument motherboard 301 that is in communication with a controller 100, instrument motors (e.g. pipettor arm drive motors such as X- and Y-drive motors; pipetting channel Z-drive motor; and pipetting drive motors 310, and 311), and instrument sensors (e.g. pressure sensors 315 and 315, tip sensors, capacitive sensors). The instrument motherboard 301 comprises a communication device, a processing device, and a memory device for storing programs that control the functions of various pipetting instrument 001 components. The pipetting instrument 001 may further comprise an instrument deck 350 to support the microfluidic chip 50, pipette tips, samples, reagents, workstations for sample processing.

The controller 100 is in communication with the instrument motherboard 301, instrument motors (e.g. pipettor arm drive motors such as X- and Y-drive motors; pipetting channel Z-drive motor; and pipetting drive motors 310, and 311), and instrument sensors (e.g. pressure sensors 315 and 315, tip sensors, capacitive sensors). In one embodiment, the controller 100 is integrated into the pipetting instrument 001 or with the instrument motherboard 301. The controller 100 generally comprises a communication device, a processing device, and a memory device. The processing device is operatively coupled to the communication device and memory device. The processing device uses the communication device to communicate with the instrument motherboard 301, and as such the communication device generally comprises a modem, server, or other device for communicating with the instrument motherboard 301. The controller 100 may comprises a non-transitory computer readable medium, stored in the memory device, and programmed to command the first pump of the first automated pipetting channel and the second pump of the second automated pipetting channel to control flow of the liquid sample through the microfluidic chip. The controller 100 may be embodied in one or more computers, microprocessors or microcomputers, microcontrollers, programmable logic controllers, field programmable gate arrays, or other suitably configurable or programmable hardware components. The controller 100 may comprise control software, firmware, hardware or other programming instruction sets programmed to receive user inputs, and control instrument motors (e.g. pipettor arm drive motors such as X- and Y-drive motors; pipetting channel Z-drive motor; and pipetting drive motors 310, and 311); as well as provide for real-time feedback control according to embodiments of the present disclosure.

The controller 100 may comprise a non-transitory computer readable medium, stored in the memory device, and programmed to receive data from the first pressure sensor in real-time and data from the second pressure sensor in real-time, and adjust command of at least the first pump of the first automated pipetting channel or the second pump of the second automated pipetting channel to adjust a flow rate within the microfluidic chip using real-time feedback based on said data from the first pressure sensor and second pressure sensor. The controller 100 may comprise control software, firmware, hardware or other programming instruction sets programmed to receive data from instrument sensors (e.g. pressure sensors 314 and 315), receive user inputs, conduct analyses based on pressure data, and adjust control of the pump(s) of the automated pipetting channel(s).

The controller 100 may control parameters of the pipetting instrument 001 such as, timing of movement and X, Y, Z positions of instrument arms 302 and 303, timing and control of pipetting drive motors 310 and 311 such as to control fluid flow rates of a liquid sample through a microfluidic chip. The controller 100 can transmit control signals or other instructions to electrical or electromechanical system components (e.g. such as motors or drives, servos, actuators, racks and pinions, gearing mechanisms, and other interconnected or engaging dynamic parts) via communication technologies to enable data communication (e.g. serial or Ethernet connections, Universal Serial Bus (USB), Institute of Electrical and Electronics Engineers (IEEE) Standard 1394 (i.e., "FireWire") connections, wireless data communications technologies such as BLUETOOTH™ or other forms based upon infrared (IR) or radio frequency (RF) signals.

Figure 6A:
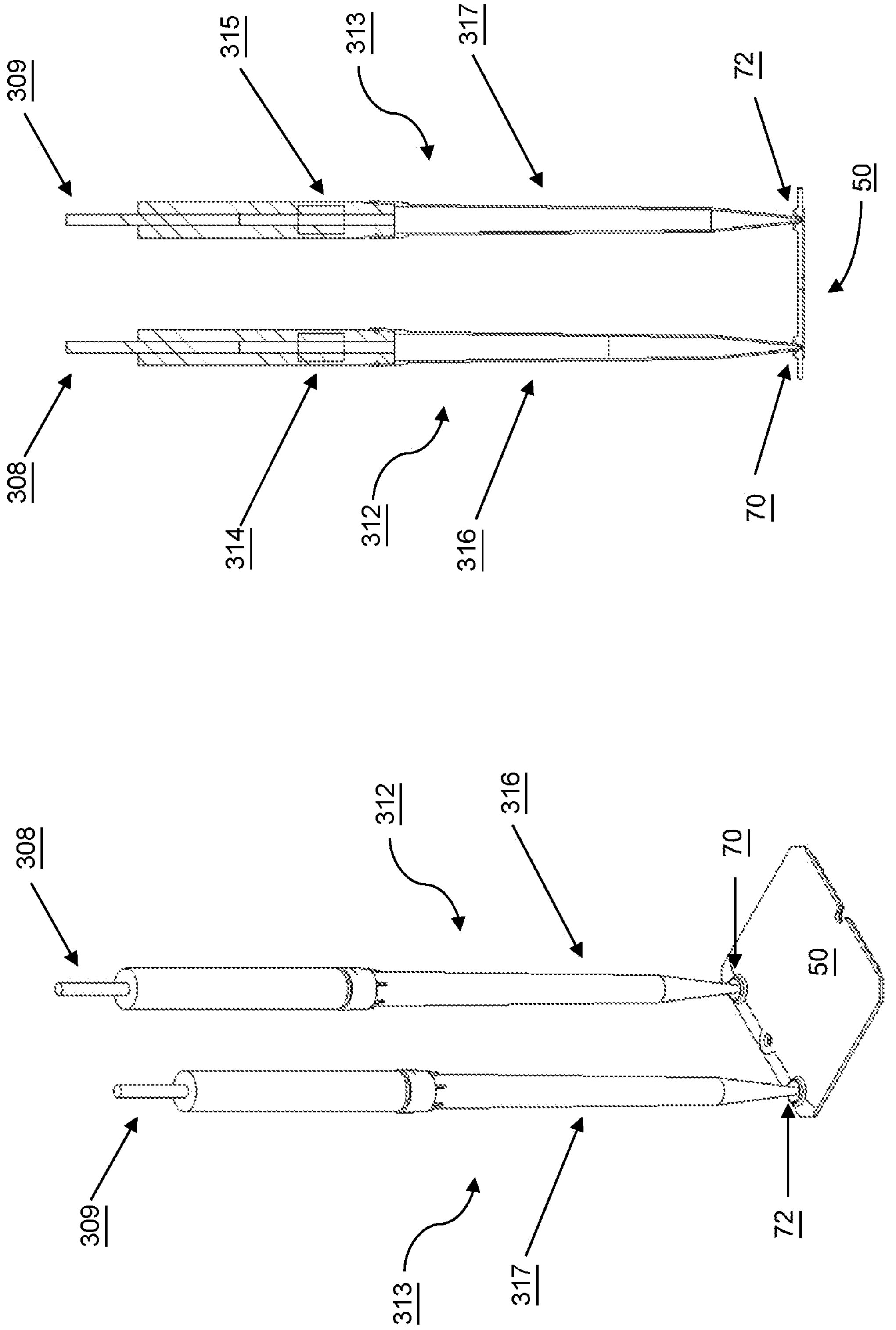
FIG. 6A, on the left, is a perspective view of the pipetting channels and microfluidic chip, wherein the pipette tips are coupled to the inlet port and outlet port of the microfluidic chip, respectively, according to embodiments of the present disclosure; and on the right, is a vertical sectional view of the same according to embodiments of the present disclosure.

FIG. 6A, on the left, is a perspective view of the pipetting channels 312 and 313 and microfluidic chip 50, wherein the pipette tips 316 and 317 are coupled to the inlet port 70 and outlet port 72 of the microfluidic chip 50, respectively, according to embodiments of the present disclosure; and on the right, is a vertical sectional view of the same according to embodiments of the present disclosure. Accordingly, the pipetting channels 312 and 313 comprising the pipette tips 316 and 317, respectively, are in fluid communication with the channels of the microfluidic chip. The pipette tips 316 and 317 are coupled to the inlet port 70 and outlet port 72 of the microfluidic chip 50 via a friction fit, thereby creating a hermetic (or air-tight) seal and a leak-tight seal. As used herein, "fluid-tight" means air-tight and leak-tight. In one embodiment, the pumps of the automated pipetting channels are pistons or plungers 308 and 309 in communication with pipetting drive motors 310 and 311 and pressure sensors 314 and 315. In one embodiment, the pressure sensors 314 and 315 are integrated into the pipetting channels 312 and 313.

Figure 6B:
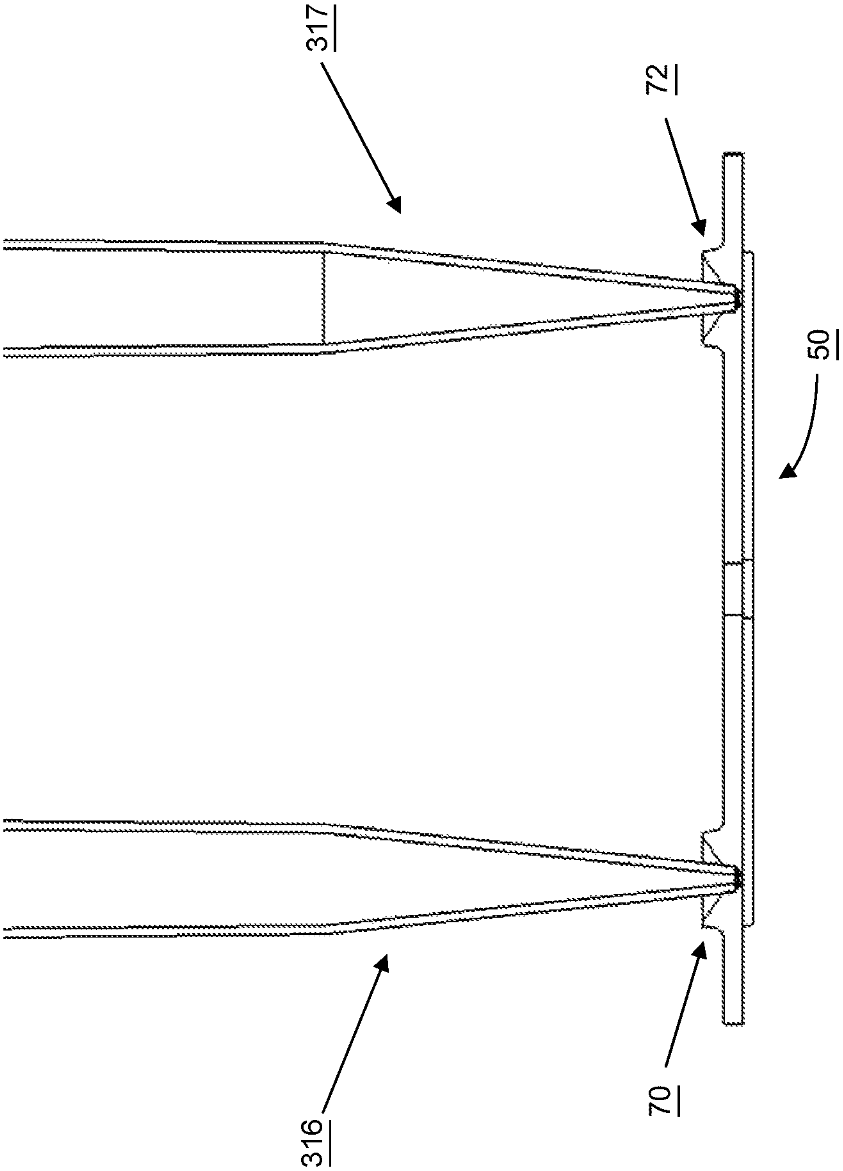
FIG. 6B is a cross sectional view of the pipette tips coupled to the inlet port and outlet port of the microfluidic chip, respectively, according to embodiments of the present disclosure.

FIG. 6B is a cross sectional view of the pipette tips 316 and 317 coupled to the inlet port 70 and outlet port 72 of the microfluidic chip 50, respectively, according to embodiments of the present disclosure. In one embodiment, the inlet port 70 or outlet port 72 has a tapered shape. In one embodiment, the inlet port 70 and outlet port 72 have a tapered shape and are thus configured to receive and couple to pipette tips are varying sizes.

Figure 7:
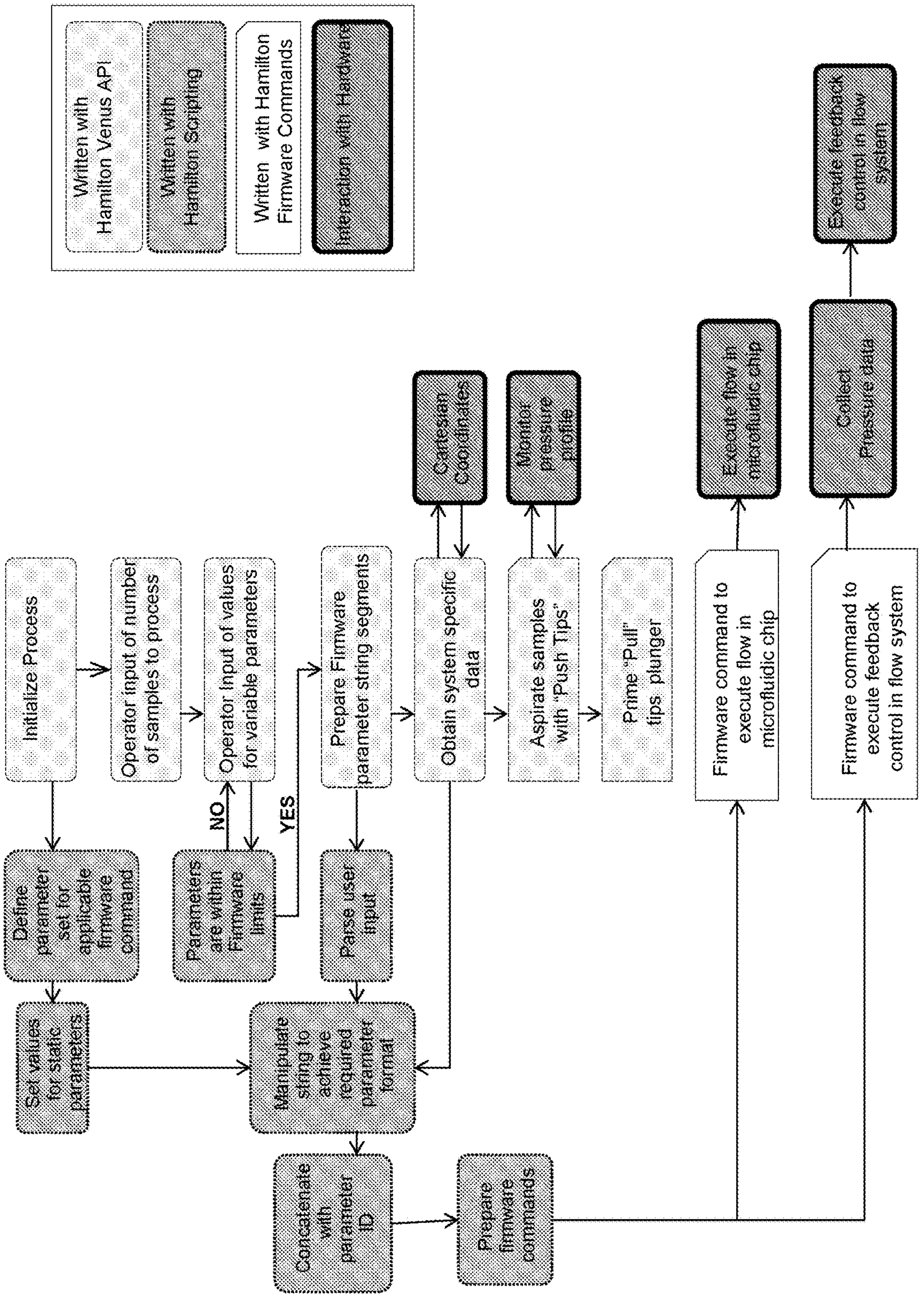
FIG. 7 is the backend software architecture for preparing firmware commands of a Hamilton Microlab STAR line liquid handler according to one embodiment of the present disclosure.

FIG. 7 is the backend software architecture for preparing firmware commands of a Hamilton Microlab STAR line liquid handler according to one embodiment of the present disclosure.

Figure 8A:
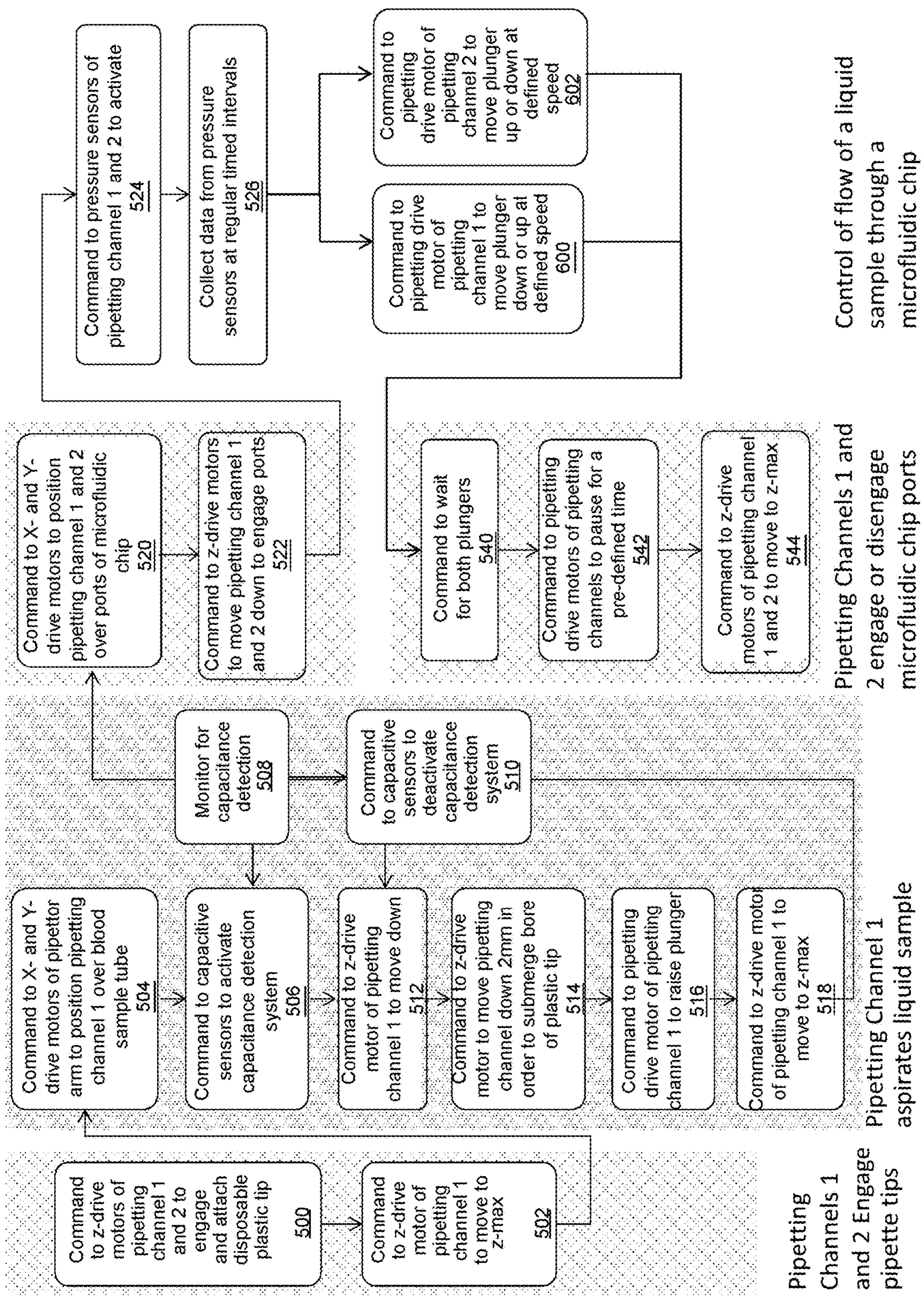
FIG. 8A is a flow chart including exemplary methods according to embodiments of the present invention.
Figure 8B:
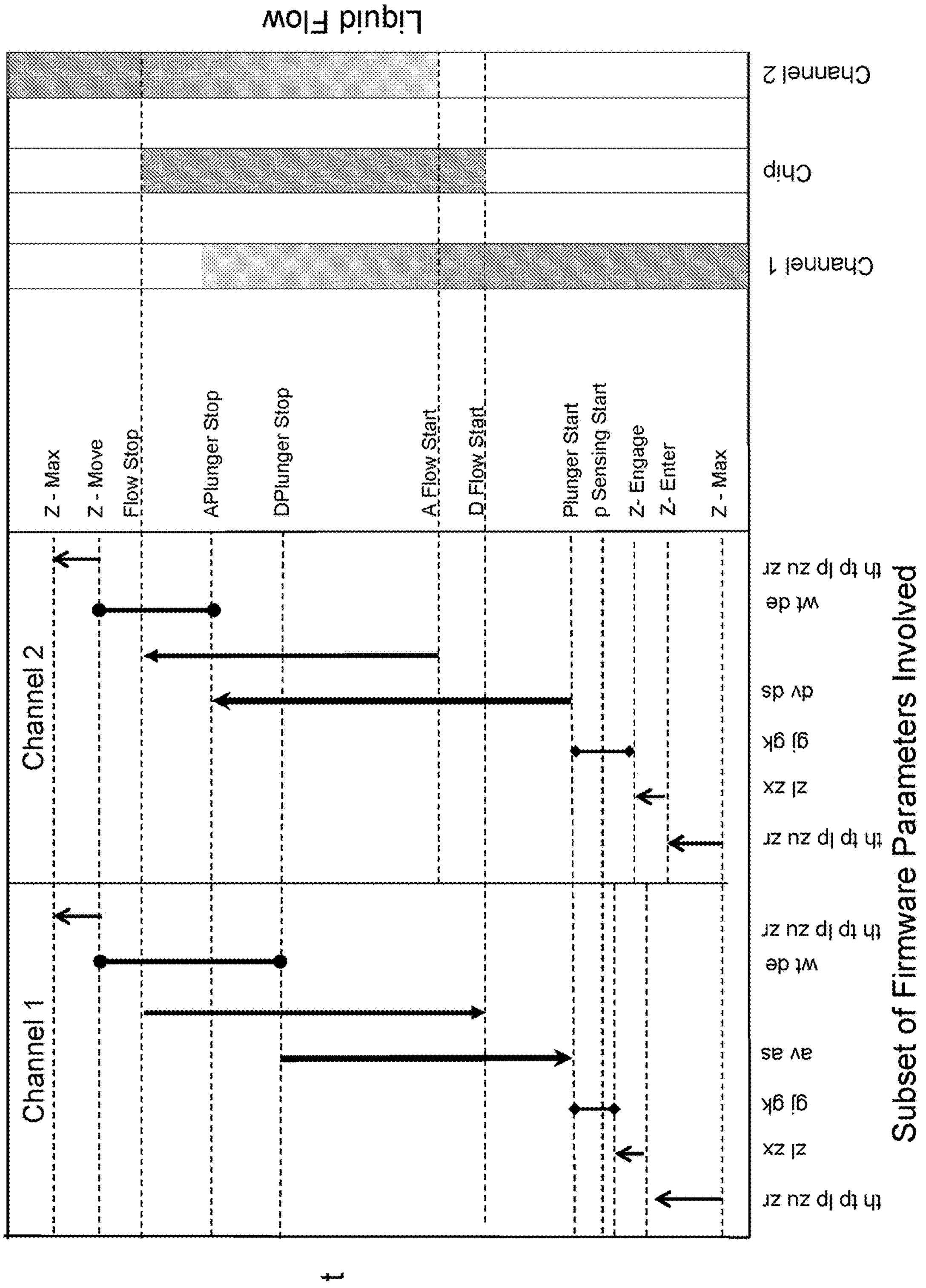
FIG. 8B is an exemplary schematic of coordinating commands and firmware parameters to control z-drive motors and pipetting drive motors of pipetting channels 1 and 2 according to embodiments of the present invention.

FIG. 8A is a flow chart including exemplary methods according to embodiments of the present invention. The method may be implemented by controller 100 in communication with other components of the presently disclosed system; for example, by sending commands and receiving data via the instrument motherboard 301, which is in communication with instrument motors or instrument sensors. In accordance with some embodiments, a computer readable medium may be encoded with data and instructions for controlling flow of a liquid sample through a microfluidic chip; such as data and instructions to: command the X- and Y-drive motors of the pipetting arm to position pipetting channel 1 and 2, each comprising a pipette tip, over the inlet and outlet ports of a microfluidic chip (step 520), command the z-drive motors to move pipetting channel 1 and 2 down to engage the pipette tips with the inlet and outlet ports of the microfluidic chip, respectively (step 522), command pressure sensors of pipetting channels 1 and 2 to activate (step 524), collect data from pressure sensors, preferably at regular time intervals (step 526), and command a) pipetting drive motor of pipetting channel 1 to move plunger down or up at a defined speed (step 600) and b) pipetting drive motor of pipetting channel 2 to move plunger up or down at a defined speed (step 602) and coordinate these commands to control flow of a liquid sample through a microfluidic chip and into the pipette tip of pipetting channel 2, and command the z-drive motors of the pipetting channels to move to z-max (step 544). The command to a pipetting drive motor of a pipetting channel to move plunger down or up at a defined speed includes a defined speed of zero to stop the movement of the plunger. FIG. 8B is an exemplary schematic of coordinating commands and firmware parameters to control z-drive motors and pipetting drive motors of pipetting channels 1 and 2 to control flow from the pipette tip of pipetting channel 1, through a microfluidic chip, and into the pipette tip of pipetting channel 2, according to embodiments of the present invention.

The fluid-tight flow system reduces the loss of biomaterial by using automated pipetting channels comprising pipette tips coupled to the inlet and outlet ports of a microfluidic chip, removing extraneous components such as capillary connectors and directly introducing a liquid sample into a microfluidic chip for isolation and/or processing of a biomarker. The automated pipetting channels comprising pipette tips coupled to the inlet and outlet ports of a microfluidic chip creates a fluid-tight flow system that enables coordinated use of the pipetting channels to control flow of a liquid sample from one pipette tip, through a microfluidic chip, and into the other pipette tip to collect the liquid sample. Typically, pistons or plungers of automated pipetting channels are configured to aspirate or dispense when the pipette tip is in contact with a liquid sample. The fluid-tight flow system described herein enables use of the pipetting channels as synchronized pumps to control flow of a liquid sample through a microfluidic chip, including use of a pipetting channel to aspirate or pull a liquid sample that is not in contact with the pipette tip or dispense or push a liquid sample that is no longer in contact with the pipette tip (i.e. when the liquid sample has completely entered the microfluidic chip). The systems and methods disclosed herein enable control of flow rates at low to extremely low flow rates through microfluidic chips; thus, providing advantages in capture and isolation, and/or processing of rare biomarkers (e.g. CTCs, DNA, RNA, exosomes).

Figure 8C:
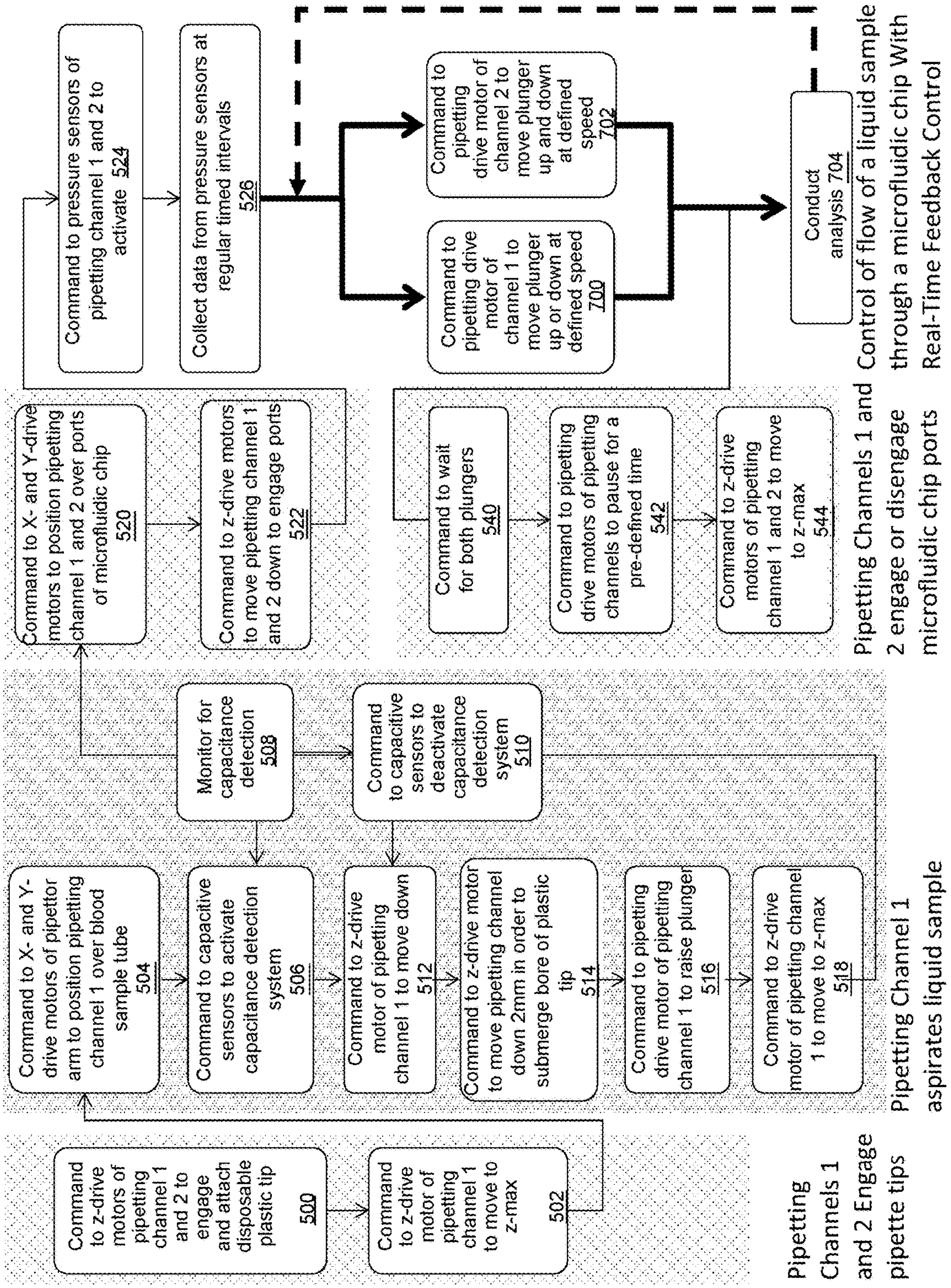
FIG. 8C is a flow chart including exemplary methods according to embodiments of the present invention.

FIG. 8C is a flow chart including exemplary methods according to embodiments of the present invention. The method may be implemented by controller 100 in communication with other components of the presently disclosed system; for example, by sending commands and receiving data via the instrument motherboard 301, which is in communication with instrument motors or instrument sensors. In accordance with some embodiments, a computer readable medium may be encoded with data and instructions for controlling flow of a liquid sample through a microfluidic chip; such as data and instructions to: command the X- and Y-drive motors of the pipetting arm to position pipetting channel 1 and 2, each comprising a pipette tip, over the inlet and outlet ports of a microfluidic chip (step 520), command the z-drive motors to move pipetting channel 1 and 2 down to engage the pipette tips with the inlet and outlet ports of the microfluidic chip, respectively (step 522), command pressure sensors of pipetting channels 1 and 2 to activate (step 524), collect data from pressure sensors, preferably at regular time intervals (step 526), command a) pipetting drive motor of pipetting channel 1 to move plunger down or up at a defined speed (step 700) and b) pipetting drive motor of pipetting channel 2 to move plunger up or down at a defined speed (step 702) and coordinate these commands to control flow of a liquid sample through a microfluidic chip (and ultimately into the pipette tip of pipetting channel 2), conduct analysis on the data from the pressure sensors (step 704) and adjust commands (represented by dotted line) in steps 700 and 702, and command the z-drive motors of the pipetting channels to move to z-max (step 544). The command to a pipetting drive motor of a pipetting channel to move plunger down or up at a defined speed includes a defined speed of zero to stop the movement of the plunger.

Typically, a pressure sensor monitors pressure in the air space between a liquid sample and a plunger in a pipetting channel. Accordingly, any real-time feedback in current liquid handling pipetting systems with pressure sensors (e.g. Dynamic Device real-time closed loop pipetting systems) is limited to detection of errors related to functions of a pipette tip (e.g. clogging in a pipette tip, flow rate of aspirating into a pipette tip, flow rate of dispensing from a pipette tip, volumetric monitoring of liquid dispensed or aspirated) apart from any fluidic system and thus requiring separate pressure sensors to monitor pressure in a fluidic system. Pressure data and movement of the plunger can be correlated to calculate a standard curve (pressure v. time) representing aspirating a liquid sample into a pipette tip or dispensing a liquid sample from a pipette tip. For example, when the pipette tip is in contact with a sample liquid and as the piston or plunger moves up, air pressure in the tip is lowered and a liquid sample is pushed into a pipette tip by the atmospheric pressure. Deviations from this standard curve can detect errors related to functions of pipette tip, such as a clogged tip during aspiration based on a pressure threshold for clots and incomplete aspiration of a liquid sample into a pipette tip based on a pressure threshold for insufficient liquid in a pipette tip.

The systems and methods including real-time feedback control and disclosed herein are novel and have unique advantages in controlling flow in a microfluidic chip. The automated pipetting channels comprising pressure sensors and pipette tips coupled to the inlet and outlet ports of a microfluidic chip creates a fluid-tight flow system that enables monitoring pressure in a fluidic system and determining flow rate without additional sensor components, and adjusting flow rate with real-time feedback controls. Real-time feedback based on pressure data in the systems disclosed herein comprises detection of clogging in the microfluidic chip, detection of a pressure level at or above a pressure threshold to avoid over-pressure in a microfluidic chip, and detection of flow rate at or above a flow rate threshold for a liquid sample.

Figure 8D:
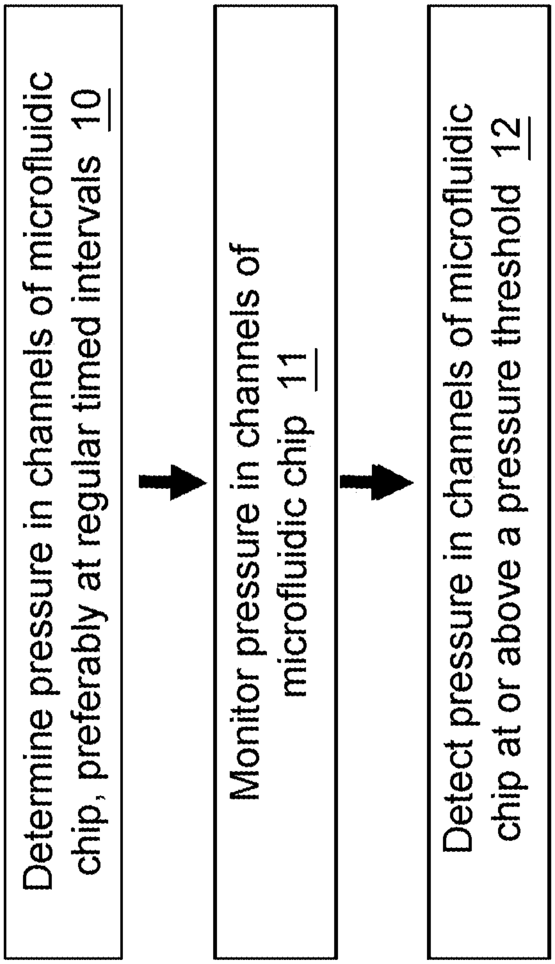
FIG. 8D is a flow chart including exemplary methods for conducting analysis on the data from the pressure sensors according to embodiments of the present invention.

FIG. 8D is a flow chart including exemplary methods for conducting analysis on the data from the pressure sensors according to embodiments of the present invention. As shown in FIG. 8D, the step of conducting analysis on the data from the pressure sensors (step 704) can include the following steps, and a computer readable medium may further be encoded with data and instructions to: determine pressure in the channels of a microfluidic chip, preferably at regular timed intervals (step 10), monitor pressure in channels of a microfluidic chip (step 11), and detect pressure in the channels of a microfluidic chip at, above, or below a pressure threshold (step 12). A pressure threshold that correlates to detection of clogging in a microfluidic chip can be determined by 1) comparison between a standard curve (pressure v. time), based on pressure data and movement of the plunger(s), that represents successful flow of a liquid sample through a microfluidic chip and a curve (pressure v. time), based on pressure data and movement of the plunger(s), that represents clogging in a microfluidic chip and 2) selection of a pressure level as a pressure threshold. A pressure threshold that correlates to maximum pressure in a microfluidic chip can be determined by 1) comparison between a standard curve (pressure v. time), based on pressure data and movement of the plunger(s), that represents successful flow of a liquid sample through a microfluidic chip and a curve (pressure v. time), based on pressure data and movement of the plunger(s), that represents reaching maximum pressure in a microfluidic chip and 2) selection of a pressure level as a pressure threshold, e.g. to avoid over-pressure in a microfluidic chip. A computer readable medium may further be encoded with data and instructions to receive user input of a pressure threshold, or to determine any of the foregoing pressure thresholds.

Figure 8E:
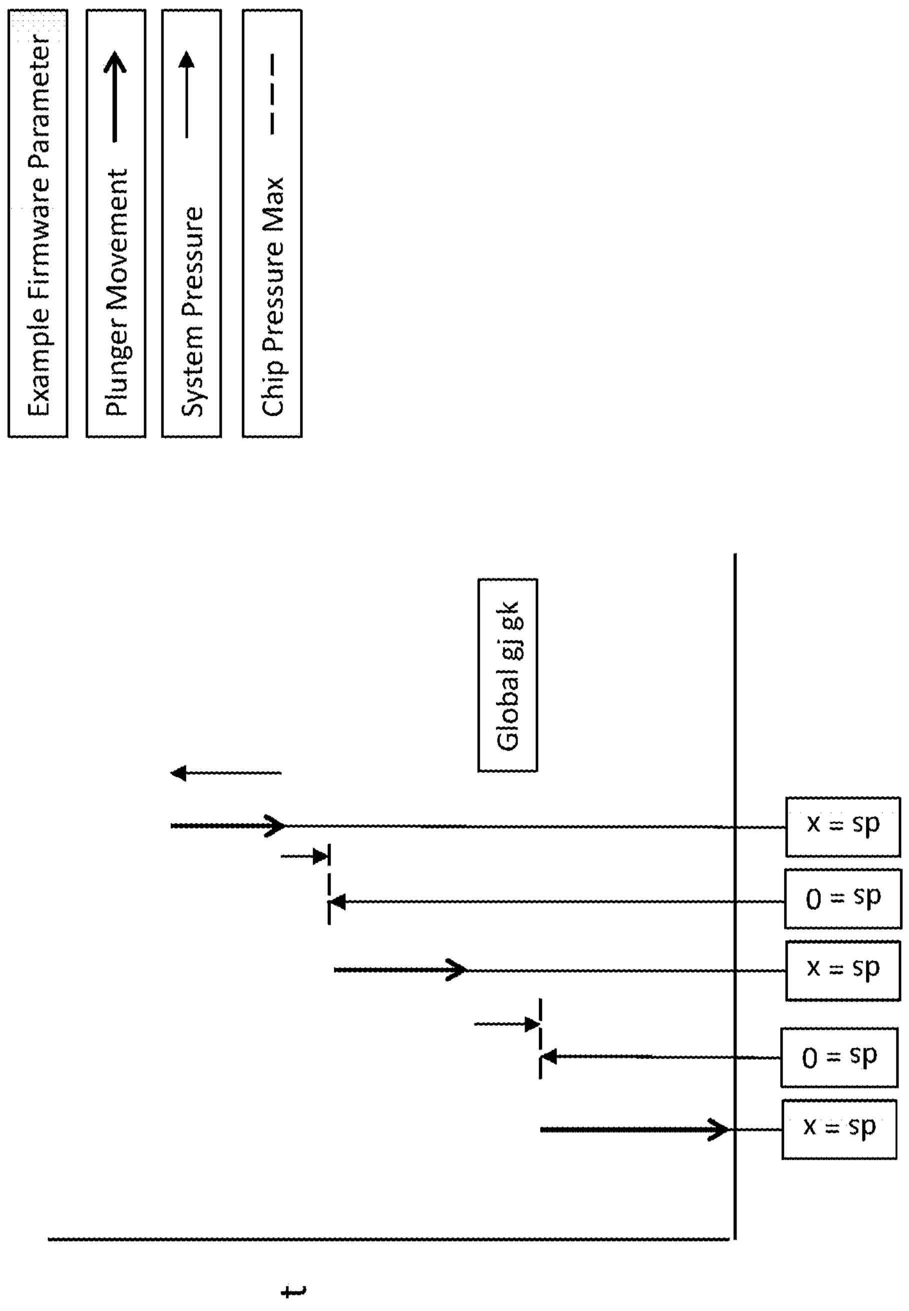
FIG. 8E is a chart of exemplary real-time feedback control parameters to avoid over-pressure in a microfluidic chip according to embodiments of the present invention.

A computer readable medium may further be encoded with data and instructions to repeat adjustments in commands in steps 700 and 702 and analysis (step 704) in order to control flow of a liquid sample through a microfluidic chip with real-time feedback. FIG. 8E is a chart of exemplary real-time feedback control parameters to avoid over-pressure in a microfluidic chip according to embodiments of the present invention. As shown schematically in this chart, steps 10-12 (with respect to a pressure threshold that correlates to maximum pressure in a microfluidic chip), 700, and 702 are repeated over time as fluid flow through a microfluidic chip is adjusted. Pressure thresholds to avoid over-pressure in a microfluidic chip may be defined by user, or a computer readable medium may further be encoded with data and instructions to determine a pressure threshold to avoid over-pressure in a microfluidic chip.

Figure 8F:
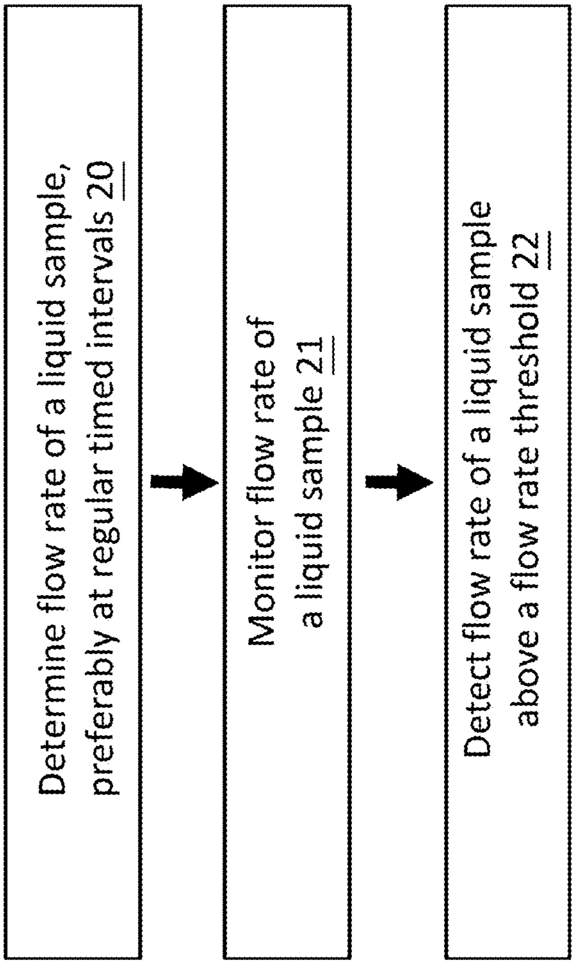
FIG. 8F is a flow chart including exemplary methods for conducting analysis on the data from the pressure sensors according to embodiments of the present invention.

FIG. 8F is a flow chart including exemplary methods for conducting analysis on the data from the pressure sensors according to embodiments of the present invention. As shown in FIG. 8F, the step of conducting analysis on the data from the pressure sensors (step 704) can include the following steps, and a computer readable medium may further be encoded with data and instructions to: determine flow rate of a liquid sample in the channels of a microfluidic chip, preferably at regular timed intervals (step 20), monitor the flow rate of a liquid sample in channels of a microfluidic chip (step 21), and detect a flow rate in the channels of a microfluidic chip at, above, or below a flow rate threshold (step 22). A flow rate threshold that correlates to optimized flow to isolate a given biomarker can be determined by 1) comparison between a standard curve (flow rate v. time), based on pressure data and movement of the plunger(s), that represents successful flow of a liquid sample through a microfluidic chip and a curve (flow rate v. time), based on pressure data and movement of the plunger(s), that represents an optimized flow rate for a class of liquid samples through a microfluidic chip and 2) selection of a flow rate as a flow rate threshold. A computer readable medium may further be encoded with data and instructions to receive user input of a flow rate threshold, or to determine a flow rate threshold. A computer readable medium may further be encoded with data and instructions to repeat adjustments in commands in steps 700 and 702 and analysis (step 704) in order to control flow of a liquid sample through a microfluidic chip with real-time feedback.

As shown in FIG. 5A, the controller 100 comprises a decision engine 102 and a flow control rules server 104. As described herein, a computer readable medium may be encoded with data and instructions to command a) pipetting drive motor of pipetting channel 1 to move plunger down or up at a defined speed (step 700) and b) pipetting drive motor of pipetting channel 2 to move plunger up or down at a defined speed (step 702) and coordinate these commands to control flow of a liquid sample through a microfluidic chip (and ultimately into the pipette tip of pipetting channel 2). The flow control rules server 104 comprises rules for coordinating commands to the pipetting drive motors of the pipetting channels to control flow of a liquid sample through a microfluidic chip. Exemplary rules are set forth in Table 1:

| Flow Control options | Command to pipetting drive motor of Pipetting Channel 1 comprising pipette tip coupled to inlet port | Command to pipetting drive motor of Pipetting Channel 2 comprising pipette tip coupled to outlet port |
|---|---|---|
| Start flow | Move plunger down | Move plunger up |
| Start flow | Move plunger down | No movement of plunger |
| Start flow | No movement of plunger | Move plunger up |
| Decrease flow rate | Move plunger down at decreased speed | No change in movement |
| Decrease flow rate | No change in movement | Move plunger up at decrease speed |
| Decrease flow rate | No change in movement | Move plunger down |
| Decrease flow rate | Move plunger down at decreased speed | Move plunger up at decreased speed |
| Increase flow rate | Move plunger down at increased speed | No change in movement |
| Increase flow rate | No change in movement | Move plunger up at increased speed |
| Increase flow rate | Move plunger down at increased speed | Move plunger up at increased speed |
| Stop flow | Stop movement of plunger | Stop movement of plunger |
| Stop flow | Move plunger down | Move plunger down |
| Reverse flow | Move plunger in opposite direction relative to previous movement | Move plunger in opposite direction relative to previous movement |

The flow control rules server 104 may comprise rules for determining a pressure threshold. The flow control rules server 104 may comprise rules for determining a flow rate threshold. The decision engine 102 is configured to determine which rules of the flow control rules server to apply to coordinate commands to the pipetting drive motors of the pipetting channels to control flow of a liquid sample through a microfluidic chip. In one embodiment, the decision engine 102 is configured to determine which rules of the flow control rules server to apply in response to detection of pressure at, above, or below a pressure threshold. In one embodiment, the decision engine 102 is configured to determine which rules of the flow control rules server to apply in response to detection of a flow rate at, above, or below a flow rate threshold.

The various techniques described herein may be implemented with hardware or software or, where appropriate, with a combination of both. For example, the controller device 100 shown in FIG. 5A may include suitable hardware, software, or combinations thereof configured to implement the various techniques described herein. The methods and system of the disclosed embodiments, or certain aspects or portions thereof, may take the form of program code (i.e., instructions) embodied in tangible media, such as CD-ROMs, hard drives, flash memory, solid state drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and components of the system may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Methods of Isolating Nucleic Acid Analytes

Described herein are exemplary embodiments of methods of isolating nucleic acid analytes. In some embodiments, the nucleic acid analytes are cell-free DNA (cfDNA), circulating tumor DNA (ctDNA), genomic DNA (gDNA), or RNA. cfDNA is a liquid biopsy biomarker that carries signatures, such as mutations, associated with diseases. Extraction of cfDNA from plasma of whole blood samples provides minimally invasive sample preparation of biomarkers that can be subsequently utilized in molecular assays, such as next generation sequencing, to detect disease. The methods described herein efficiently produce high quality samples as reflected by high recovery (e.g. as high as >90%), including high recovery of nucleic acid analytes in the 50-750 bp range, sample inputs as large as 500 μL introduced at a flow rate of 25 μL/min, and minimal interference by coextraction of genomic DNA.

In an embodiment, the method of isolating nucleic acid analytes from a liquid sample comprises providing the microfluidic system described herein, including a dual-depth thermoplastic microfluidic device as described herein, wherein the microposts comprise capture elements that selectively bind a nucleic acid analyte; controlling flow of a liquid sample through the dual-depth microfluidic device; and binding the nucleic acid analyte to the capture elements thereby isolating the nucleic acid analytes from the liquid sample.

In an embodiment, wherein the nucleic acid analytes are cell-free DNA (cfDNA), circulating tumor DNA (ctDNA), genomic DNA (gDNA), or RNA.

In an embodiment, the liquid sample is any liquid sample that includes cfDNA suitable for detection or isolation. In an embodiment, the liquid sample is blood, cerebrospinal fluids, urine, sputum, saliva, pleural effusion, stool and seminal fluid. In an embodiment, the liquid sample is whole blood or any fraction or component thereof. In an embodiment, the liquid sample is blood and the method further comprises isolating plasma.

In an embodiment, the liquid sample is plasma. In an embodiment, the liquid sample is processed plasma. In an embodiment, the liquid sample is plasma treated with protein digestion to remove endogenous plasma proteins and release cfDNA fragments from histones. In an embodiment, the liquid sample is plasma treated with proteinase K.

A capture element is any agent or any moiety or group thereof that specifically binds to an analyte molecule of interest. In an embodiment, the capture elements are surface-bound oxygen-rich moieties. In an embodiment, the capture elements are surface-bound carboxylic acid groups, salicylates, or esters. In an embodiment, the microposts comprise surface-bound carboxylic acid groups, and the method further comprises controlling flow of the liquid sample mixed with an immobilization buffer through the dual-depth microfluidic device. In an embodiment, the liquid sample:immobilization buffer mixture ratio is 1:3.

Immobilization buffers can be used to induce cfDNA condensation onto the activated thermoplastic dual-depth microfluidic surface described herein. In an embodiment, the immobilization buffer comprises a salt and a neutral polymer. In an embodiment, the neutral polymer is polyethylene glycol (PEG). In an embodiment, the immobilization buffer comprises a salt, a neutral polymer, and an organic solvent. In an embodiment, the organic solvent is ethanol. In an embodiment, the immobilization buffer comprises 3%-20% PEG. In an embodiment, the immobilization buffer comprises $Na^+$ salts or $Mg^{2+}$ salts. In an embodiment, the immobilization buffer comprises NaCl. In an embodiment, the immobilization buffer comprises $MgCl_2$. In an embodiment, the immobilization buffer comprises EtOH. In an embodiment, the immobilization buffer comprises 17% PEG, >10 mM $MgCl_2$, and 20% EtOH. In an embodiment, the immobilization buffer comprises 17% PEG, >10 mM $MgCl_2$, and 20% EtOH, and the nucleic acid analyte is ctDNA. In an embodiment, the immobilization buffer comprises 3% PEG, 0.5 M NaCl and 63% EtOH. In an embodiment, the immobilization buffer comprises 3% PEG, 0.5 M NaCl and 63% EtOH, and the nucleic acid analyte is gDNA. In an embodiment, the immobilization buffer comprises 5% PEG, 0.4 M NaCl and 63% EtOH. In an embodiment, the immobilization buffer comprises 5% PEG, 0.4 M NaCl and 63% EtOH, and the nucleic acid analyte is RNA. One skilled in the art could modify the concentration of PEG, the salt concentration, and the EtOH concentration depending on the target DNA size.

In an embodiment, the method further comprises eluting cfDNA with an aqueous buffer. In an embodiment, the method further comprises eluting cfDNA with nuclease free water, Tris, and EDTA. In an embodiment, the method further comprises eluting cfDNA with nuclease free water, Tris, EDTA, and polyoxyethylenesorbitan monolaurate.

Samples of various volumes that can be processed on the dual-depth microfluidic device described herein can be at least about 50 μL, 60 μL, 70 μL, 80 μL, 90 μL, 100 μL, 150 μL, 175 μL, 200 μL, 225 μL, 250 μL, 275 μL, 300 μL, 350 μL, 400 μL, 450 μL, 500 μL, 600 μL, 700 μL, 800 μL, 900 μL, 1 milliliter (mL), 2 mL, 3 mL, 4 mL, 5 mL, 6 mL, 7 mL, 8 mL, 9 mL, or 10 mL.

In an embodiment, the high-throughput, fluid-tight flow system described herein comprises multiple pairs of pipetting channels and a corresponding number of chips coupled to 2 pipetting channels each, wherein the chips can be processed in parallel. For example, 16 pipetting channels, and 8 chips in parallel, with each microfluidic chip coupled to 2 pipetting channels permits up to 128 samples being processed per day, each sample processed in 90 minutes in parallel with multiple other samples. In an embodiment, >80% of nucleic acid analytes in the 50-750 bp range are isolated and recovered. In an embodiment, >85% of nucleic acid analytes in the 50-750 bp range are isolated and recovered. In an embodiment, >90% of nucleic acid analytes in the 50-750 bp range are isolated and recovered.

Samples with different amounts of nucleic acid that can be processed on the dual-depth microfluidic device described herein can contain at least about 1 microgram (1 μg), 100 nanograms (ng), 10 ng, 1 ng, 100 picograms (pg), 10 μg, or 1 μg of nucleic acid. In some cases, samples can contain greater than or equal to about 1 microgram (1 μg), 100 nanograms (ng), 10 ng, 1 ng, 100 picograms (pg), 10 pg, or 1 pg of nucleic acid. In an embodiment, >90% of nucleic acid fragments ranging from 40-800 bp in size are isolated and recovered.

Following isolation and extraction, the cfDNA may be processed with tagging before sequencing with one or more reagents (e.g., enzymes, unique identifiers (e.g., barcodes), probes, etc.) by methods known in the art. Tags can be any types of molecules attached to a polynucleotide, including, but not limited to, nucleic acids, chemical compounds, florescent probes, or radioactive probes. Tags can also be oligonucleotides (e.g., DNA or RNA). Tags can comprise known sequences, unknown sequences, or both. A tag can comprise random sequences, pre-determined sequences, or both. A tag can be double-stranded or single-stranded. A double-stranded tag can be a duplex tag. A double-stranded tag can comprise two complementary strands. Alternatively, a double-stranded tag can comprise a hybridized portion and a non-hybridized portion. The double-stranded tag can be Y-shaped, e.g., the hybridized portion is at one end of the tag and the non-hybridized portion is at the opposite end of the tag. Tagging can be performed using any method known in the art. A polynucleotide can be tagged with an adaptor by hybridization. For example, the adaptor can have a nucleotide sequence that is complementary to at least a portion of a sequence of the polynucleotide. As an alternative, a polynucleotide can be tagged with an adaptor by ligation. A tagged sample may then be used in a downstream application such as a sequencing reaction by which individual molecules may be tracked to parent molecules and individual samples.

Following the isolation and extraction, the cfDNA may be useful for a variety of downstream reactions and/operations include nucleic acid sequencing, nucleic acid quantification, sequencing optimization, detecting gene expression, quantifying gene expression, genomic profiling, cancer profiling, or analysis of expressed markers. Sequencing methods may include, but are not limited to: high-throughput sequencing, pyrosequencing, sequencing-by-synthesis, single-molecule sequencing, nanopore sequencing, semiconductor sequencing, sequencing-by-ligation, sequencing-by-hybridization, RNA-Seq (Illumina), digital gene expression, Next generation sequencing, single molecule sequencing by synthesis (SMSS), massively-parallel sequencing, Clonal Single Molecule Array (Solexa), shotgun sequencing, Maxam-Gilbert or Sanger sequencing, primer walking, sequencing using PacBio, SOLiD, Ion Torrent, or Nanopore platforms and any other sequencing methods known in the art. After sequencing data of cell free polynucleotide sequences is collected, one or more bioinformatics processes may be applied to the sequence data to detect genetic features or aberrations such as copy number variation, rare mutations (e.g., single or multiple nucleotide variations) or changes in epigenetic markers, including but not limited to methylation profiles.

Such downstream reactions may be used for the identification, detection, diagnosis, treatment, staging of, or risk prediction of various genetic and non-genetic diseases and disorders including cancer. It may be used to assess subject response to different treatments of said genetic and non-genetic diseases, or provide information regarding disease progression and prognosis.

Methods of Isolating Extracellular Vesicles

Described herein are exemplary embodiments of methods of isolating disease-specific extracellular vesicles (EVs). EVs comprise proteins, lipids, and nucleic acids. Extracellular vesicles, particularly exosomes, are used for intercellular communications involved in many pathophysiological conditions, such as cancer progression and metastasis.

Tumor-derived circulating exosomes, enriched with a group of tumor antigens, have been recognized as a promising biomarker source for cancer diagnosis. Extraction of exosomes from plasma of whole blood samples provides minimally invasive sample preparation of biomarkers that can be subsequently utilized in molecular assays, such as mRNA expression profiling, to detect disease. The methods described herein efficiently produce high quality EV samples (high recovery and high purity with minimal interference produced by non-diseased EVs), which can be demonstrated by downstream analysis results.

In an embodiment, the method of isolating extracellular vesicles from a liquid sample comprises providing a microfluidic system as described herein, including a dual-depth thermoplastic microfluidic device as described herein, wherein the microposts comprise capture elements that selectively bind extracellular vesicles; controlling flow of a liquid sample through the dual-depth microfluidic device; and binding the extracellular vesicles to the capture elements thereby isolating the extracellular vesicles from the liquid sample.

In an embodiment, the liquid sample may be any liquid sample that includes extracellular vesicles suitable for detection or isolation. In an embodiment, the liquid sample is blood, bone marrow, pleural fluid, peritoneal fluid, cerebrospinal fluid, urine, saliva, amniotic fluid, ascites, bronchoalveolar lavage fluid, synovial fluid, breast milk, sweat, tears, joint fluid, and bronchial washes. In an embodiment, the liquid sample is whole blood or any fraction or component thereof. In an embodiment, the liquid sample is blood and the method further comprises isolating plasma.

In an embodiment, the liquid sample is plasma. In an embodiment, the liquid sample is processed plasma. In an embodiment, the liquid sample is plasma treated with protein digestion to remove endogenous plasma proteins.

In an embodiment, the extracellular vesicles are exosomes. Exosomes are small membrane vesicles (i.e. vesicles surrounded by a phospholipid bilayer) secreted from cells as a result of multivesicular endosome/lysosome fusion with the plasma membrane. Exosomes are typically about 50 nm to about 200 nm, about 30 nm to about 100 nm, or about 50 nm to about 150 nm in size. Most commonly, exosomes will have a size (average diameter) that is up to 5% of the size of the donor cell. Exosomes may act as molecular messengers for intracellular communication and may contain proteins, DNA, gDNA, mRNAs, microRNAs, and/or mitochondrial DNA. Exosomes carry markers, signatures, or a group of specific proteins, DNA, and RNA that represents their cells of origin. Depending on cellular origin, exosome functions include involvement in intercellular viral spread, mediation of adaptive immune responses to pathogens and tumors, and transfer of oncogenes between cancer cells and the tumor stroma that primes the so-called "metastatic niche" for metastatic spread. In an embodiment, the extracellular vesicles are tumor-derived exosomes. In an embodiment, the extracellular vesicles are cancer-derived exosomes.

The methods of isolating extracellular vesicles described herein are based on selection by biological properties, e.g. expression of antigenic species, and affinity enrichment, as opposed to selection by EV size. A capture element is any agent or any moiety or group thereof that specifically binds to an analyte molecule of interest. In an embodiment, the capture elements are specific to disease-associated EVs. In an embodiment, the capture elements are antibodies, antigen binding fragments of antibodies, or aptamers. In an embodiment, the capture elements are monoclonal antibodies (mAbs). In an embodiment, the capture elements are antibodies that bind with specificity to common exosome markers (e.g. CD9, or CD81, or CD63). In an embodiment, the capture elements are antibodies that bind with specificity to tumor-associated markers (e.g. phosphatidylserine, or Epithelial cell adhesion molecule (EpCAM)) or a surface antigen present on cells of interest (and likewise present on EVs originating from these cells). In an embodiment, the mAbs are anti-FAPα, anti-EpCAM, anti-α-IGF-1R, and/or Anti-CD8α mAbs.

The capture element can be immobilized, directly or indirectly, covalently or non-covalently to the microposts. In an embodiment, the capture element is immobilized by a single-stranded oligonucleotide bifunctional cleavable linker containing a uracil residue that could be cleaved using USER®, a coumarin-based photocleavable linker, or amine coupling with EDC/NHS (1-ethyl-3-(3-dimethylaminopropyl) carbodiimide (EDC)/N-Hydroxysuccinimide (NHS)). In an embodiment, the mAbs are immobilized by surface-bound carboxylic acid groups.

Samples of various volumes that can be processed on the dual-depth microfluidic device described herein can be at least about 50 μL, 60 μL, 70 μL, 80 μL, 90 μL, 100 μL, 150 μL, 175 μL, 200 μL, 225 μL, 250 μL, 275 μL, 300 μL, 350 μL, 400 μL, 450 μL, 500 μL, 600 μL, 700 μL, 800 μL, 900 L, 1 milliliter (mL), 2 mL, 3 mL, 4 mL, 5 mL, 6 mL, 7 mL, 8 mL, 9 mL, or 10 mL.

In an embodiment, 1 mL of the liquid sample comprising human plasma flows through the dual-depth microfluidic device described herein, at a rate of 10 μL/min, with a total sample preparation processing time of 100 minutes. In an embodiment, the high-throughput, fluid-tight flow system described herein comprises multiple pairs of pipetting channels and a corresponding number of chips coupled to 2 pipetting channels each, wherein the chips can be processed in parallel. For example, 16 pipetting channels, and 8 chips in parallel, with each microfluidic chip coupled to 2 pipetting channels permits up to 128 samples being processed per day, each sample processed in 100 minutes in parallel with multiple other samples.

In an embodiment, a liquid sample is loaded with one or more buffers to increase specificity. In an embodiment, a liquid sample is loaded with a buffer that reduces nonspecific artifacts from plasma processing. In an embodiment, a liquid sample is loaded with bovine serum albumin (BSA) in PBS, polyvinylpyrrolidone (PVP)-40 and BSA in PBS, and/or Tween-20®. Exemplary buffer formulations include: 1% PVP-40/1% BSA in PBS and 0.2% Tween 20® in TBS; 1% PVP-40 and 0.5% BSA and 1% Tween-20 in TBS.

In an embodiment, the method further comprises lysing the EVs on-chip or off-chip. In an embodiment, the method further comprises RNA purification. In an embodiment, the method further comprises RNA extraction and reverse transcription of EV-RNA into cDNA. In an embodiment, the method further comprises PCR. In an embodiment, the method further comprises EV mRNA expression profiling. In an embodiment, the method further comprises gene expression profiling using droplet digital PCR (ddPCR).

In an embodiment, the method further comprises releasing EVs. In an embodiment, EVs are released via proteolytic digestion. In an embodiment, proteinase K is used to release EVs. In an embodiment, the method further comprises nanoparticle tracking analysis (NTA) or transmission electron microscopy (TEM) analysis.

In an embodiment, >80% of disease-specific EVs are isolated and recovered. In an embodiment, >90% of disease-specific EVs are isolated and recovered.

Following the isolation and extraction, EV-associated RNA may be useful for molecular characterization of diseases. EV-associated RNA may be useful for a variety of downstream reactions and/operations include nucleic acid sequencing, nucleic acid quantification, sequencing optimization, detecting gene expression, quantifying gene expression, genomic profiling, cancer profiling, or analysis of expressed markers. Sequencing methods may include, but are not limited to: high-throughput sequencing, pyrosequencing, sequencing-by-synthesis, single-molecule sequencing, nanopore sequencing, semiconductor sequencing, sequencing-by-ligation, sequencing-by-hybridization, RNA-Seq (Illumina), Digital Gene Expression (Helicos), Next generation sequencing, Single Molecule Sequencing by Synthesis (SMSS) (Helicos), massively-parallel sequencing, Clonal Single Molecule Array (Solexa), shotgun sequencing, Maxam-Gilbert or Sanger sequencing, primer walking, sequencing using PacBio, SOLiD, Ion Torrent, or Nanopore platforms and any other sequencing methods known in the art. After sequencing data of cell free polynucleotide sequences is collected, one or more bioinformatics processes may be applied to the sequence data to detect genetic features or aberrations such as copy number variation, rare mutations (e.g., single or multiple nucleotide variations) or changes in epigenetic markers, including but not limited to methylation profiles.

Such downstream reactions may be used for the identification, detection, diagnosis, treatment, staging of, or risk prediction of various genetic and non-genetic diseases and disorders including cancer. It may be used to assess subject response to different treatments of said genetic and non-genetic diseases, or provide information regarding disease progression and prognosis.

EXAMPLES

Example 1: Thermoplastic Microfluidic Chip 1 (with a Modified Cover Plate) and Chip 2 (without a Modified Cover Plate)

A. Microfluidic Chip Specifications

Two microfluidic chips, Chip 1 and Chip 2, for the isolation of the biomarkers, such as cfDNA or EVs, were made. Each chip was composed of a thermoplastic base plate and a thermoplastic cover plate.

Thermoplastic base plate: For each chip, the thermoplastic base plate included an inlet channel recess, an outlet channel recess, isolation beds with microposts used for biomarker isolation, bifurcated channel recesses that connect the inlet channel recess to the isolation beds, and bifurcated channel recesses that connect the outlet channel recess to the isolation beds.

The thermoplastic base plate specifications were the same for Chip 1 and Chip 2. The nominal depth of each of the inlet channel recess, outlet channel recess, micropost, and bifurcated channel recesses of the thermoplastic base plate was 50 μm.

The microfluidic network was composed of 7 rectangular beds (3.6 mm×23.3 mm) populated with 210,816 microposts per bed and a total of 1,475,712 per device. Microposts had a square cross-section with nominal width dimensions of 10 μm×10 μm and were 50 μm in height. Microposts were spaced apart by 10 μm, wall-to-wall of each micropost, and were positioned in such a way that each micropost wall surface was directed at a 45 degree angle to the main axis of the bed.

The inlet and outlet to each bed was fluidically addressed by a 7-step bifurcating structure with the following bifurcating channel recess dimensions (width×length): $1^{st}$ step—200 μm×1200 μm; $2^{nd}$ step—120 μm×650 μm, $3^{rd}$ step—70 μm×360 μm; $4^{th}$ step—80 m×150 μm; $5^{th}$ step—40 μm×70 μm, $6^{th}$ step—20 μm×40 μm; and $7^{th}$ step—10 μm×20 μm. All inlet bifurcating structures were fluidically connected to a 28.2 mm long and 0.4 mm wide inlet channel recess. All outlet bifurcating structures were fluidically connected to a 54.5 mm long and 0.4 mm wide outlet channel recess.

Figure 2D:
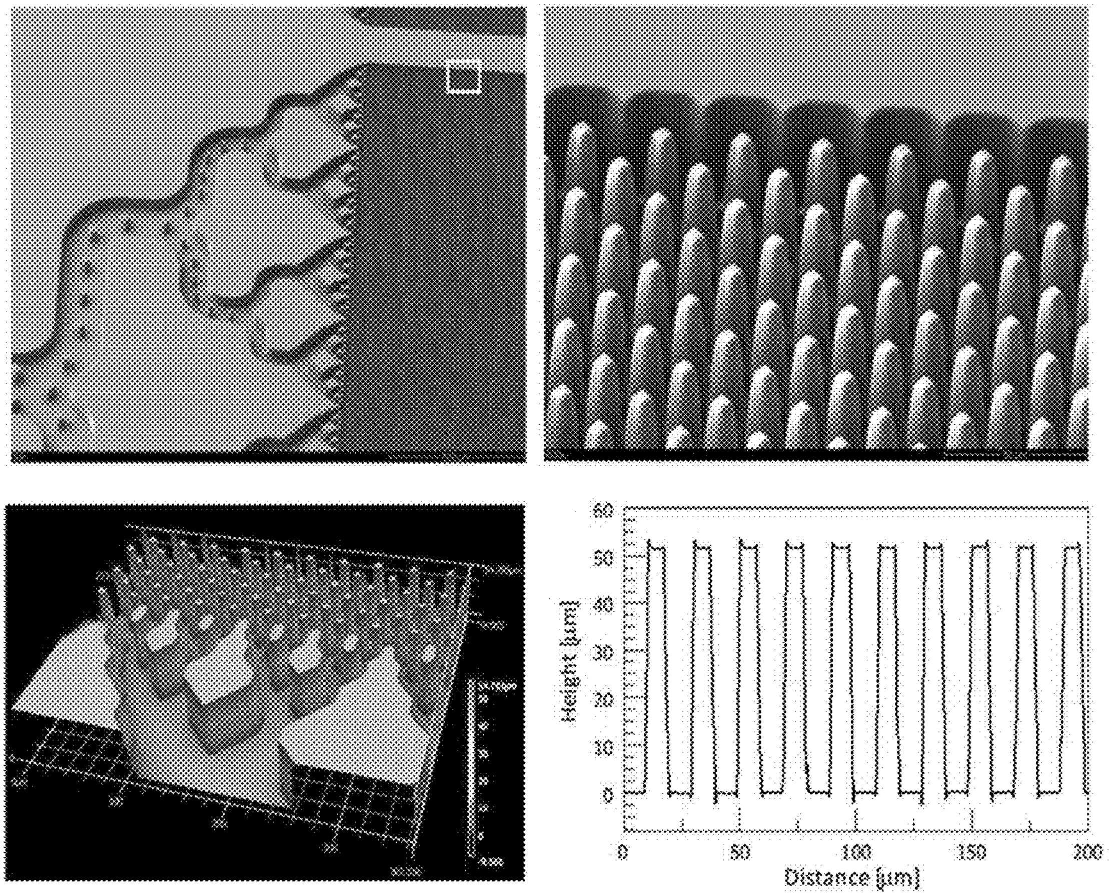
FIG. 2D shows the metrology of the biomarker isolation bed: an SEM image of an injection molded isolation bed showing part of the bifurcating structures used for uniform fluid delivery to isolation bed filled with microposts (top left); an SEM close-up image showing the shape and uniformity of molded microposts (top right); laser profiler 3D surface scan of the molded isolation bed (bottom left); and line profile of the molded microposts (bottom right).

FIG. 2D shows an SEM image of part of an injection molded isolation bed showing part of the inlet bifurcating structures used for uniform fluid delivery to an isolation bed filled with microposts (top left); an SEM close-up image showing the shape and uniformity of injection molded microposts (top right); a laser profiler 3D surface scan of the injection molded isolation bed (bottom left); and a line profile of the injection molded microposts (bottom right).

Thermoplastic cover plate: The thermoplastic cover plate of Chip 1 included an inlet channel recess and an outlet channel recess, and was used to enclose the microfluidic network located on the thermoplastic base plate and to provide inlet and outlet channels with greater depth or height relative to the height of the bifurcated channels and microposts of the bonded thermoplastic chip. With respect to Chip 1 (with a modified cover plate), the inlet and the outlet channels were constructed by overlying the inlet and outlet channels recesses molded into the base plate with inlet and outlet channel recesses of the cover plate. The inlet channel recess in the cover plate was 0.32 mm wide, 0.2 mm deep and 28.2 mm long and the outlet channel recess in the cover plate was 0.32 mm wide, 0.2 mm deep and 54.5 mm long.

The thermoplastic cover plate of Chip 2 did not have channel recesses, and was used to enclose the microfluidic network located on the corresponding Chip 2 plate. The Chip 2 microfluidic network only resides in the base plate. The depth of the entire microfluidic network in the Chip 2 design is uniform and limited to about 50 μm.

Ports and alignment holes: For both Chip 1 and Chip 2, the inlet channel and outlet channel of the microfluidic chip were fluidically connected to inlet port and outlet port, respectively, each of which is built into the cover plate. The ports possessed a well-defined geometry that facilitated the insertion of the pipetting tip of the Liquid Scan instrument into the port and produced a leak-free interconnect between the pipetting tip and the microfluidic network of the chip.

For both Chip 1 and Chip 2, both the base plate and the cover plate included an alignment hole and a notch which allowed for precise passive alignment between both components during bonding as well as precise placement of the chip on the bench of the Liquid Scan instrument for accurate mating between the inlet and outlet ports of the chips and pipetting tips of the instrument.

Bonded Dual-Depth Thermoplastic Chip

The structural specifications for bonded Chip 1, wherein the thermoplastic base plate and thermoplastic cover plate (with an inlet channel recess and an outlet channel recess) are bonded together, are set forth in Table 1 below. The structural specifications for bonded Chip 2, wherein the thermoplastic base plate and thermoplastic cover plate (without channel recesses) are bonded together, are the same as those for bonded Chip 1, except that the depth of the inlet channel and outlet channels are each 50 μm.

TABLE 2

Metrology data of selected elements of dual-depth thermoplastic microfluidic device

| | Nominal [μm] | Molded Chip 1 [μm] | Possible Range in Nominal Size [μm] |
|---|---|---|---|
| Microposts | | | |
| Micropost side top | 10 | 7.0 ± 0.4 | 5-15 |
| Micropost side bottom | 10 | 10.8 ± 0.3 | 5-15 |
| Post spacing (wall-to-wall) top | 10 | 13.4 ± 0.2 | 5-15 |
| Post spacing (wall-to-wall) bottom | 10 | 9.1 ± 0.3 | 5-15 |
| Depth of microposts | 50 | 52.2 ± 0.3 | 40-60 |
| Microchannels | | | |
| Inlet channel width top | 400 | 405.8 ± 1.3 | 100-500 |
| Inlet channel width bottom | 400 | 400.6 ± 1.0 | 100-500 |
| Outlet channel width | 400 | 406.1 ± 0.9 | 100-500 |
| Outlet channel width bottom | 400 | 401.2 ± 1.2 | 100-500 |
| Depth of inlet channel and outlet channel | 250 | 245 ± 10 | 40-500 |
| Bifurcation channels | | | |
| 1st bifurcation width top | 200 | 206.2 ± 1.2 | |
| 1st bifurcation width bottom | 200 | 201.1 ± 1.4 | |
| 2nd bifurcation width top | 120 | 127.4 ± 0.6 | |
| 2nd bifurcation width bottom | 120 | 121.8 ± 0.6 | |
| 3rd bifurcation width | 70 | 78.4 ± 0.9 | |
| 3rd bifurcation width | 70 | 72.7 ± 0.6 | |
| Depth of bifurcation channels | 50 | 52.2 ± 0.3 | 40-60 |
| Draft angle | 0 | 2.7 ± 0.4 | 1.5-5 |

B. Chip Fabrication

The thermoplastic base plate for Chip 1 and Chip 2 each was produced in cyclic olefin polymer (COP, Zeonor 1060R, Zeon Corporation, Japan) via injection molding using nickel (Ni) molding master (Stratec, Austria). Ni master was fabricated via UV-lithography/electroplating route. The general protocols for Ni master fabrication are widely described in the literature and involve the following steps: (1) 2D design of the microstructures using a computer-assisted design (CAD) software; (2) fabrication of the optical mask using the CAD file; (3) use of the optical mask to define the microstructures into a photoresist using standard photolithography processing; (4) metallization of the patterned photoresist in order to provide a conductive base for Ni electroplating; (5) electroplating of Ni to fill the voids in the patterned photoresist and produce negative, metal replica of the photoresist structures (i.e: Ni electroform); (6) conventional machining of the Ni electroform to produce the form factor that allows for Ni master to fit into an injection molding setup.

The thermoplastic cover plate for Chip 1 and Chip 2 each was fabricated in COP (Zeonor 1060R) using injection molding. The molding tool for the cover plate fabrication was designed using 3D CAD software (SolidWorks, Dassault Systèmes SolidWorks Corporation, USA). The molding tool consisted of two mating parts: (1) the "core" which defined the overall form factor of the cover plate and included features for generation of the inlet port and the outlet port, and alignment hole and (2) the "cavity" which included raised features for generation of the inlet port and the outlet port through holes. The components of the molding tool were fabricated in stainless steel using conventional computer numerically controlled (CNC) machining. Molding tool fabrication and injection molding of the cover plate were performed by Enplas Life Tech, Inc., USA.

With respect to Chip 1, the cavity of the molding tool for the cover plate fabrication includes channel forming features for the inlet channel and the outlet channel (I/O) recesses. Alternatively, with respect to Chip 1, inlet and outlet microfluidic channel extensions are machined into the injection molded cover plate using high precision CNC milling.

For each Chip 1 and Chip 2, prior to assembly, the mating sides of the thermoplastic base plate and cover plate were exposed to $UV/O_3$ for 11 minutes at 42 $mW/cm^2$ UV-light intensity measured at 254 nm, using UVO cleaner (Model 18, Jelight Company, Inc. USA). $UV/O_3$ activation step produces surface-bound oxygen-rich moieties, predominantly carboxyl and carbonyl groups, on the surface of cyclic olefin and other polymers (Jackson, et al, *Lab Chip* 2014, 14(1):106-17). These moieties can be used directly as active sites for cfDNA precipitation or for covalent attachment of antibodies used for EV isolation. $UV/O_3$ activation step also facilitates assembly of the chip components via thermal fusion bonding as the activated surfaces can be effectively bonded at temperatures below glass transition temperature of the native polymer. After activation, the base plate and the cover plate were aligned using a custom made alignment jig and bonded using pneumatic press (TS-21-H—C Precision Press, PHI, USA) by pressing the chip-cover plate stack with the force of 3300 N, at 93° C., for 4.5 min. Assembled chips were stored under nitrogen atmosphere until further use.

Example 2: Significantly Reduced Back-Pressure

Advantageously, the dual-depth thermoplastic microfluidic chip significantly reduces back-pressure associated with hydrodynamically processing a viscous fluid through a microfluidic chip with a high-throughput system.

An example of a highly viscous buffer is an immobilization buffer (IB) used for cfDNA precipitation onto the micro-post surfaces. The IB is an aqueous solution of 10-20% PEG (MW 8,000), 20% EtOH, and 10 mM $MgCl_2$ and has a viscosity in the range of 8-18 mPa-s at 25° C. which is about 9-20 times larger than the viscosity of water at the same temperature (A. Mehrdad and R. Akbarzadeh, *J. Chem. Eng. Data* 2010, 55, 2537-2541; Gonzalez-Tello, et al, *J. Chem. Eng. Data,* 1994, 39 (3), 611-614). The high viscosity of the IB buffer in connection with the geometry of the microfluidic channels of Chip 2 results in backpressure in the fluidic conduit that is too high for the Liquid Scan liquid handling system to overcome. As a result, no flow or only partial flow of a high-viscosity sample through Chip 2 (without a modified cover plate) is possible and attempts to isolate cfDNA with Chip 2, the IB buffer, and the Liquid Scan liquid handling system failed.

Figure 3C:
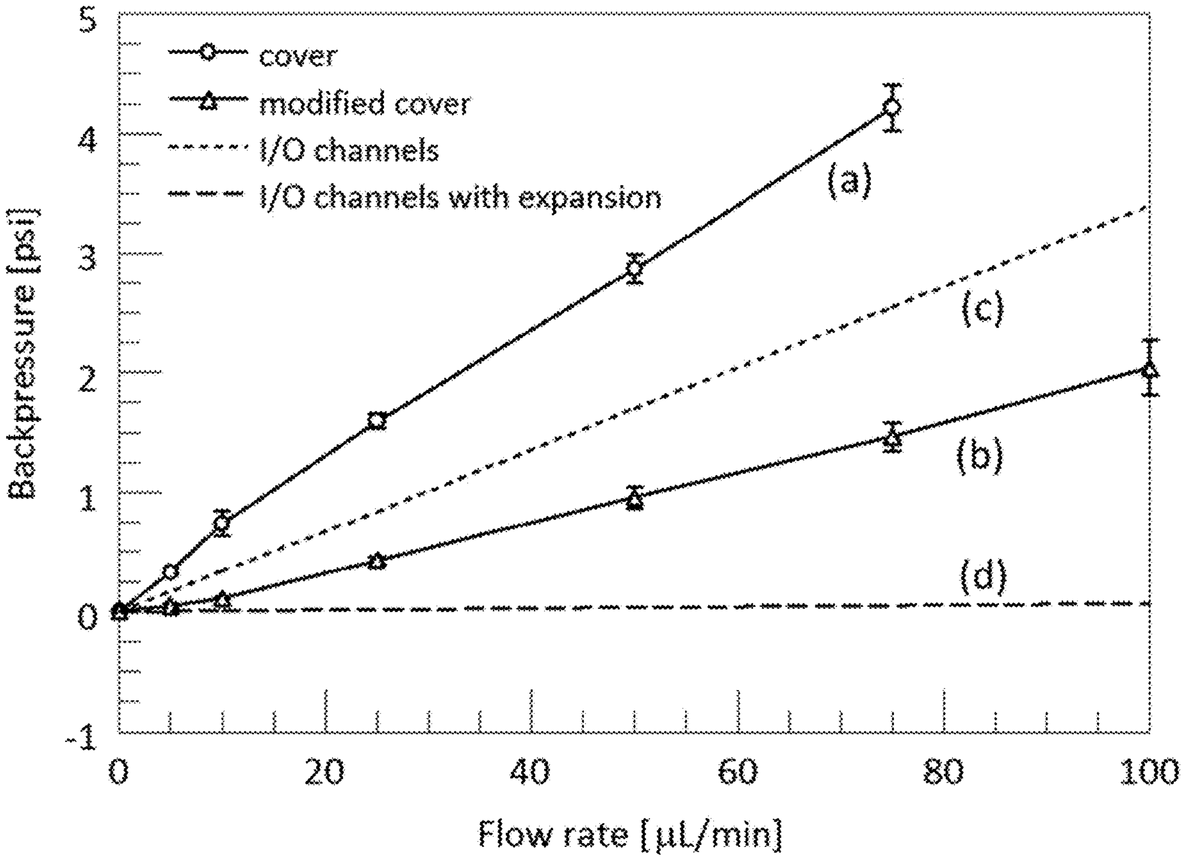
FIG. 3C is a line graph of back pressure of the biomarker isolation chip at different flow rates. (a) and (b) were established experimentally for the chip assembled using the cover plate without (a) and with (b) an inlet channel recess and an outlet channel recess. (c) and (d) were established through numerical simulations using Comsol Multiphysics version 5.5 for inlet and outlet channels only (i.e.: without the back pressure of the bifurcations and pillar arrays).

FIG. 3C is a line graph of back pressure of the biomarker isolation chips at different flow rates. Line (a) represents experimental data corresponding to Chip 2, and line (b) represents experimental data corresponding to Chip 1 inlet channel recess and outlet channel recess. Back pressure was measured using pressure sensor (PX26-015GV; Omega Engineering, Inc. Stamford, CT) mounted at the inlet of the chip, with water at 25° C. as the medium, and pumping provided with a syringe pump (PHD Ultra 4400, Harvard Apparatus, Holliston, MA). Line (c) represents simulation data corresponding to Chip 2 inlet and outlet (I/O) channels and Line (d) represents simulation data corresponding to Chip 1 inlet and outlet (I/O) channels. Numerical simulations were conducted using Comsol Multiphysics version 5.5 for inlet and outlet channels only (i.e.: without the back pressure of the bifurcations and pillar arrays). Clearly, based on experimental and simulation data, significant reduction in the backpressure was achieved via the cover plate modification of Chip 1. As demonstrated by the numerical simulations, the inlet channel recess and outlet channel recess in the cover plate reduced the back pressure attributed specifically to the I/O channels to an insignificant level of less than 2% of the original value.

The major microfluidic structures contributing to the overall pressure drop of the system were the inlet and the outlet (I/O) microchannels which have to support all the flow through the microfluidic beds populated with microposts. As shown in FIG. 3C, the back pressure originating from the fluid flow through the I/O microchannels (data established via numerical simulations) can be as high as 60% of the pressure drop produced by the entire microfluidic network (data obtained empirically). These findings indicate that significant reduction in the back pressure of the chip can be achieved by reducing the flow resistance of the I/O channels without the need to alter the design of the biomarker isolation beds.

Example 3: Efficient Capture of cfDNA

A. Post-Assembly Chip Activation

Chip 1 and Chip 2 did not require any additional surface activation prior to use for cfDNA isolation. As demonstrated below, UV/$O_3$ activation step that was performed as part of the chip assembly process, created a stable, oxidized polymer surface that was active for direct precipitation of cfDNA molecules when appropriate immobilization buffer composition was used.

B. cfDNA Isolation

Materials:

Genomic DNA (gDNA) was extracted from HT29 cells that were purchased from ATCC (USA) and propagated using supplier protocol. gDNA was purified using GenElute™ Mammalian Genomic DNA Miniprep Kits (Sigma-Millipore, USA). Plasma samples from healthy donors were provided by the KU Medical Center (KUMC) Biospecimen Repository Core Facility. Polyethylene glycol (PEG; MW 8,000), $MgCl_2$, and ethanol were secured from Sigma-Aldrich (USA). TE buffer was purchased from G Biosciences (USA), PBS from Hyclone (USA) and nuclease free water from VWR (USA). The primers for PCR and qPCR were purchased from IDT DNA (USA). Proteinase K enzyme and OneTaq® Quick-Load® 2× Master Mix with Standard Buffer used in PCR were secured from New England Biolabs (USA). QIAamp® MiniElute ccfDNA Mini Kit from Qiagen (USA) for cfDNA isolation was used for direct comparison to BioFluidica on-chip cfDNA isolation assay.

cfDNA isolation assay was evaluated using two cfDNA models. DNA ladder (PCR Marker 50 bp-766 bp, New England Biolabs, USA) was used to evaluate assay sensitivity for isolation of different size fragments, establish assay linearity range, and evaluate stability of UV/$O_3$ chip activation. Second model involved 122 and 290 bp amplicons generated via PCR of the KRAS gene secured from gDNA of HT29 cell line and was used to evaluate assay performance from spiked plasma samples. 122 bp amplicons were synthesized using primers with the following sequences; forward primer: 5'-GCCTGCTGAAAATGACT-3' (SEQ ID NO: 1) and reverse fragment: 5'-CTCTATTGTTGGATCATATTCG-3' (SEQ ID NO: 2). 290 bp amplicons were synthesized using primers with the following sequences; forward primer: 5'-TTAAAAGGTACTGGTGGAGTATTTGA-3' (SEQ ID NO: 3) and reverse primer: 5'-AAAATGGTCAGAGAAACCTTTATCTG-3' (SEQ ID NO: 4). Primers were purchased from IDT (USA). The following PCR protocol was used: an initial denaturation step at 94° C. for 3 min followed by 40 cycles of the following: 94° C. for 30 s, 55° C. for 15 s, 72° C. for 30 s, with a final extension at 72° C. for 3 min. Amplicons were purified using MinElute PCR Purification Kit (Qiagen, USA) and were spiked into the plasma of healthy donors and after extraction using microfluidic chip, quantitative PCR (qPCR) was used to assess the amount of cfDNA in the extract.

Sample Preparation:

Plasma samples obtained from healthy donors were stored at −80° C. Prior to cfDNA isolation assay, plasma samples were warmed up to room temperature, Proteinase K was added directly to plasma to a final concentration of 10 mg/ml, and sample was incubated at 60° C. overnight. Proteinase K was de-activated at 95° C. for 10 min. Digested plasma was then mixed with immobilization buffer (IB) concentrate at the volumetric ratio of 1:3 (plasma:buffer) to achieve the following final concentration of components in sample/IB mix: 22% EtOH, 10 mM $MgCl_2$, and 17% or 10% PEG depending on buffer designation.

Sample Processing:

The Liquid Scan liquid handling system (an embodiment of the high-throughput, fluid-tight flow system described herein) was used to carry out all of the liquid handling steps of the cfDNA isolation assay on Chip 1 and Chip 2. 500 μL of cfDNA sample mixed with IB was introduced at an average flow rate of 25 μL/min followed by 20 min of no flow time in order to release the pressure build-up in the pipetting setup due to use of high-viscosity sample. 1 mL of 70% EtOH was then introduced at the average flow rate of 50 μL/min in order to wash the remaining sample/IB mix off the bed without releasing already captured cfDNA. EtOH was removed by pumping 1 ml of air at 120 μL/min, 3 times. EtOH removal was assisted by heating the chip to 37° C. DNA elution was achieved by pumping 300 μL of elution buffer (1× TE buffer with 0.05% Tween 20) at 300 μL/min using 3 cycle protocol including forward, backward, and forward pumping steps followed by 3 min no flow time. cfDNA extract was collected into a microcentrifuge tube and stored at −20° C. for further analysis.

For samples processes using syringe pump the same pumping protocol was used as for the samples processed on Chip 1 and Chip 2 using Liquid Scan liquid handling system. Sample and processing liquids were preloaded into 1 mL disposable syringes. Syringes were connected to the chip using PEEK tubing (1/32" OD, 0.001" ID; IDEX, USA). All process conditions including sample and immobilization buffer composition and flow rate setting were kept the same with each pumping modality.

Quantification of cfDNA:

Chip 2 (without the cover plate modification) was completely not operable using the LiquidScan liquid handling platform and samples could not be processed on Chip 2.

With respect to Chip 1, after elution from the microfluidic bed, isolated DNA fragments were quantified using gel electrophoresis or qPCR. Isolates from the samples containing DNA ladder spiked directly into the IB were quantified using Tape Station 2200 and D1000 high sensitivity tape (Agilent Technologies, USA) following the manufacturers protocol. 122 and 290 bp KRAS fragments extracted from spiked plasma samples were quantified using qPCR. Two L of the extract was used in 10 μL of the PCR mixture with 0.25 μM reverse and forward primers (same primers as the ones used for synthesis of the amplicons were used). Standard qPCR protocol with SYBR Green indicator was used. Two sets of calibration curves were prepared for each gene, with 8 data points in each set covering the concentration range of 0-0.1 ng/μL. 18S and GAPDH were used as housekeeping genes. The following primers were used for GAPDH: 5'-GGTGTGAACCATGAGAAAGTATGA-3' (SEQ ID NO: 5) and 5'-GAGTCCTTCCACGATACCAAAG-3' (SEQ ID NO: 6), forward and reverse, respectively. Primers used for detection of 18S had the following sequences: 5'-GTAACCCGTTGAACCCCATT-3' (fwd) (SEQ ID NO: 7) and 5'-CCATCCAATCGGTAGTAGCG-3' (rev) (SEQ ID NO: 8).

C. Evaluation of cfDNA Isolation Efficiency

Chip 1 is a significant improvement over Chip 2 (without the cover plate modification). Chip 2 was completely not operable with the Liquid Scan liquid handling system because the backpressure generated by Chip 2 exceeded the pressure that could be delivered by the pipetting system. Chip 2 also was not workable with syringe pump processing because as the syringe pump was pumping the viscous sample through Chip 2, the increase in the inlet pressure led todelamination of the chip components. On the other hand, Chip 1 combined with either the Liquid Scan liquid handling system or syringe pump processing resulted in efficient on-chip isolation of DNA fragments in the 50-766 bp fragment size range with high recovery.

Figure 9:
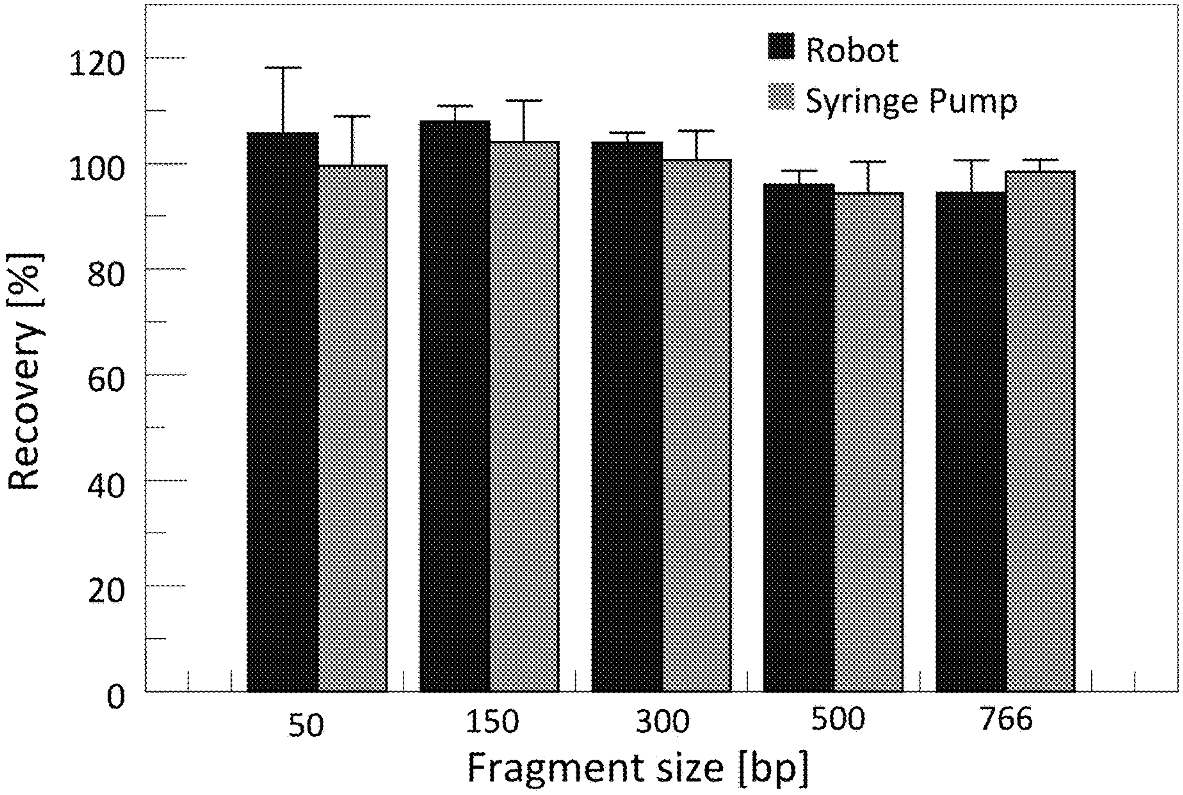
FIG. 9 is a bar graph showing recovery of DNA ladder using syringe pump and Liquid Scan liquid handling system for various fragment sizes.

FIG. 9 is a bar graph showing recovery of DNA ladder with Chip 1 using a syringe pump and the Liquid Scan liquid handling system for various fragment sizes. DNA ladder in water was spiked directly into the immobilization buffer to a final concentration of 240 ng/μL of total DNA and processed through Chip 1. Recovered DNA was quantified using Tape Station 2200. As shown in FIG. 9, Chip 1 in combination with either pumping modality provided high quality samples as reflected by efficient on-chip isolation of DNA fragments in the 50-766 bp fragment size range with recovery percentages above 90%. There was also no isolation efficiency bias toward the DNA fragment size within the tested size range.

Furthermore, Chip 1 in combination with the liquid handling system permits sample inputs as large as 500 μL at 25 μL/min with an overall processing time of 90 minutes with recovery >90%. Integration of Chip 1 with a commercial robotic liquid handling system also provides the advantages of less manual handling of the sample, reagents, and chips, shorter overall running time, and reduced possibility of cross contamination; and the ability to process multiple samples in parallel in fully automated fashion, thus further increasing throughput.

D. Isolation Efficiency of cfDNA Spiked Samples as a Function of cfDNA Load.

Figure 10:
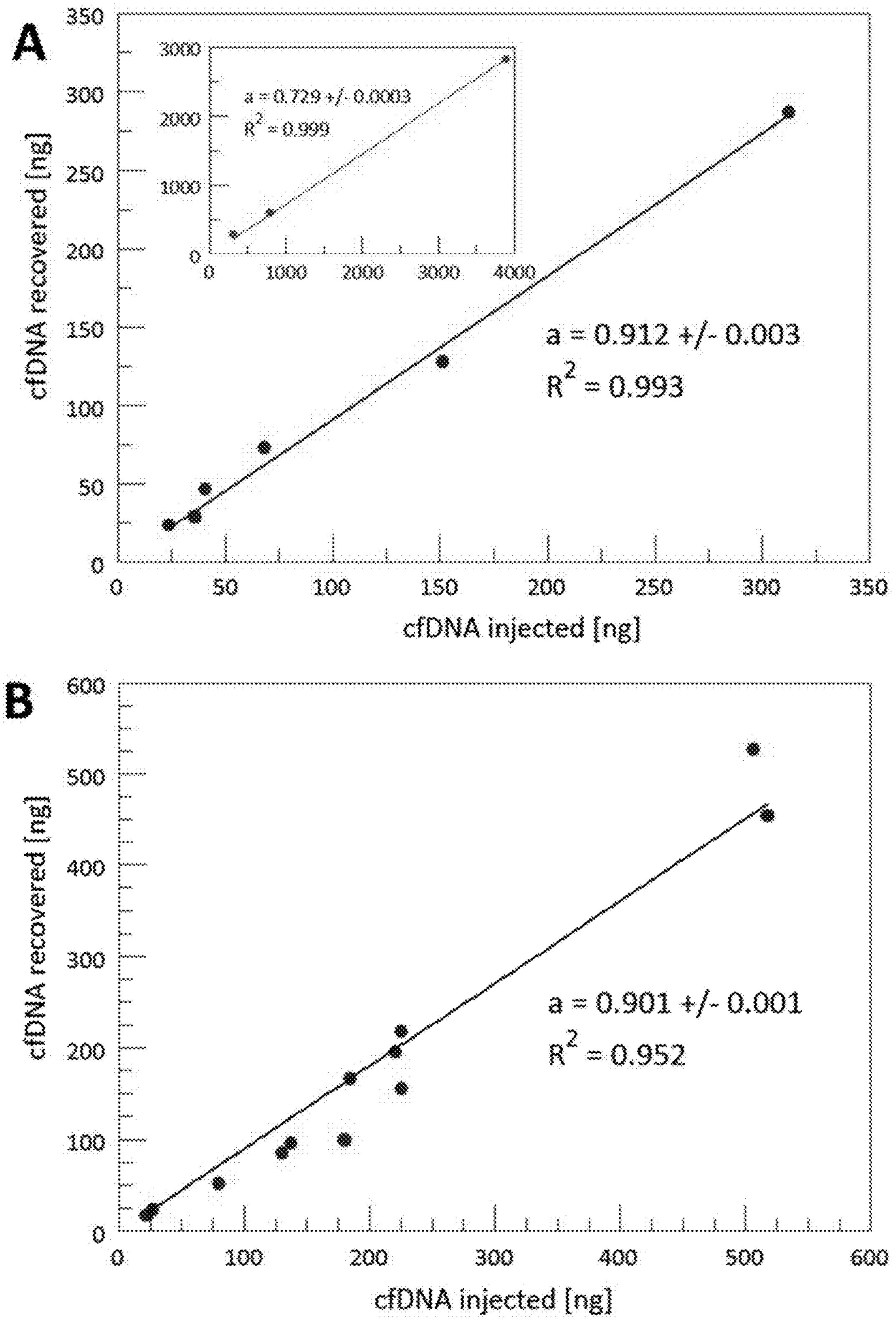

Isolation efficiency of cfDNA from spiked buffer samples using Chip 1 and the LiquidScan liquid handling system was evaluated. FIG. 10 A and FIG. 10B are graphs depicting recovery of a commercial DNA ladder using Chip 1 and the LiquidScan liquid handling system. DNA ladder was spiked directly into the immobilization buffer containing 10% PEG (A) and 17% PEG (B). Recovered DNA was quantified using Tape Station 2200. Linear relationship between processed and recovered DNA was observed for the 20-500 ng range with average recovery of ~90% independent of the buffer composition. For a higher DNA loads (up to ~4 μg) the recovery drops to ~73% as shown in the inset in FIG. 10A which might be due to partial saturation of the isolation bed.

E. Isolation Efficiency of cfDNA from Spiked Plasma Samples.

Figure 11:
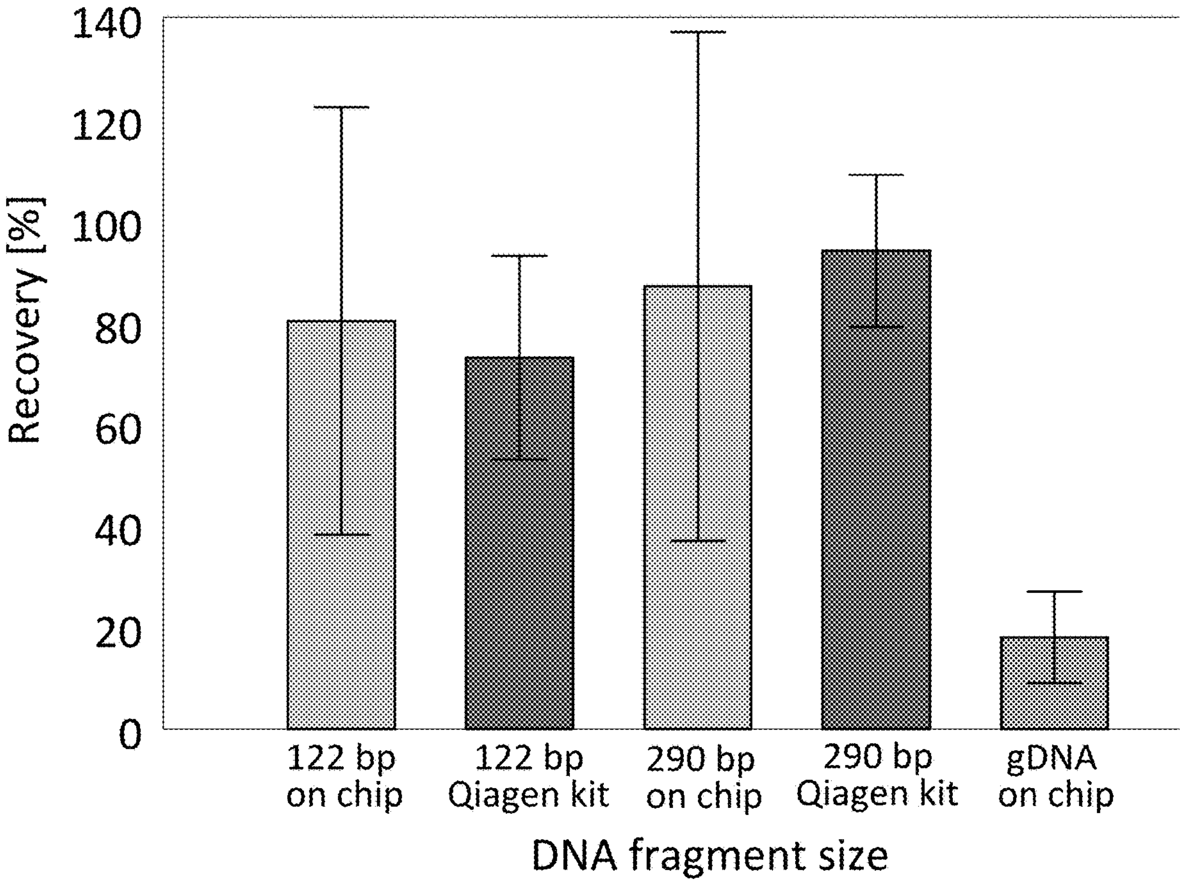
FIG. 11 is a bar graph depicting the isolation efficiency for the 122 bp and 290 bp fragments and gDNA using Chip 1 and the LiquidScan liquid handling system, compared to commercial Qiagen kit recovery.

Recovery of the cfDNA model from the spiked healthy donor samples and gDNA using Chip 1 and the LiquidScan liquid handling system was evaluated. For these studies cfDNA model involved 122 and 290 bp amplicons generated via PCR of the KRAS gene secured from gDNA of HT29 cell line. Since high concentrations of PEG, as the ones used in the immobilization buffer, can induce the precipitation of plasma proteins and/or peptides [K. C. Ingham, *Methods Enzymol.,* 1990, 182, 301-306.], the plasma sample was subjected to the enzymatic digestion protocol prior to mixing with the immobilization buffer. The initial load of the injected cfDNA model (25-120 ng) and the amount of recovered DNA were quantified using qPCR as described in the experimental section. The same protocol was used with respect to gDNA recovery. FIG. 11 is a bar graph depicting the isolation efficiency for the 122 bp and 290 bp fragments and gDNA using Chip 1 and the LiquidScan liquid handling system, compared to commercial Qiagen kit recovery. The average recovery for the 122 bp fragment was 80.2% and for the 290 bp fragment 86.9%. These recovery values were comparable to the recoveries observed for samples processed using a commercial QIAamp® MiniElute ccfDNA Mini Kit from Qiagen. With respect to the gDNA data, it is evident that isolation conditions optimized for the cfDNA extraction show specificity toward the shorter fragments as 4-5 times lower recovery was observed for gDNA as compared with shorter oligonucleotides.

F. Evaluation of the Long-Term Stability of Polymer Surface Activation for cfDNA Isolation.

The UV/$O_3$ activation step that is performed as part of the chip assembly process, creates an oxidized polymer surface that induces direct precipitation of cfDNA molecules. It has been recognized that the oxidized surface of some polymers (e.g.: PDMS, COC) which is hydrophilic, can undergo hydrophobic recovery process over time during storage in air. [Roy, S. et al. *Sens. Actuators, B,* 2010, 150, 537-549]. This process leads to the loss of the hydrophilicity of the modified polymer surface with time due to the rearrangement of the surface groups via diffusion of low molecular weight oxidized material into the polymer bulk and macromolecular motions which reorient polar groups away from the surface. [Gengenbach, T. R. and Griesser, H. J.; *J. Polym. Sci. A: Polym. Chem.* 1999, 37, 2191-2206].

Figure 12:
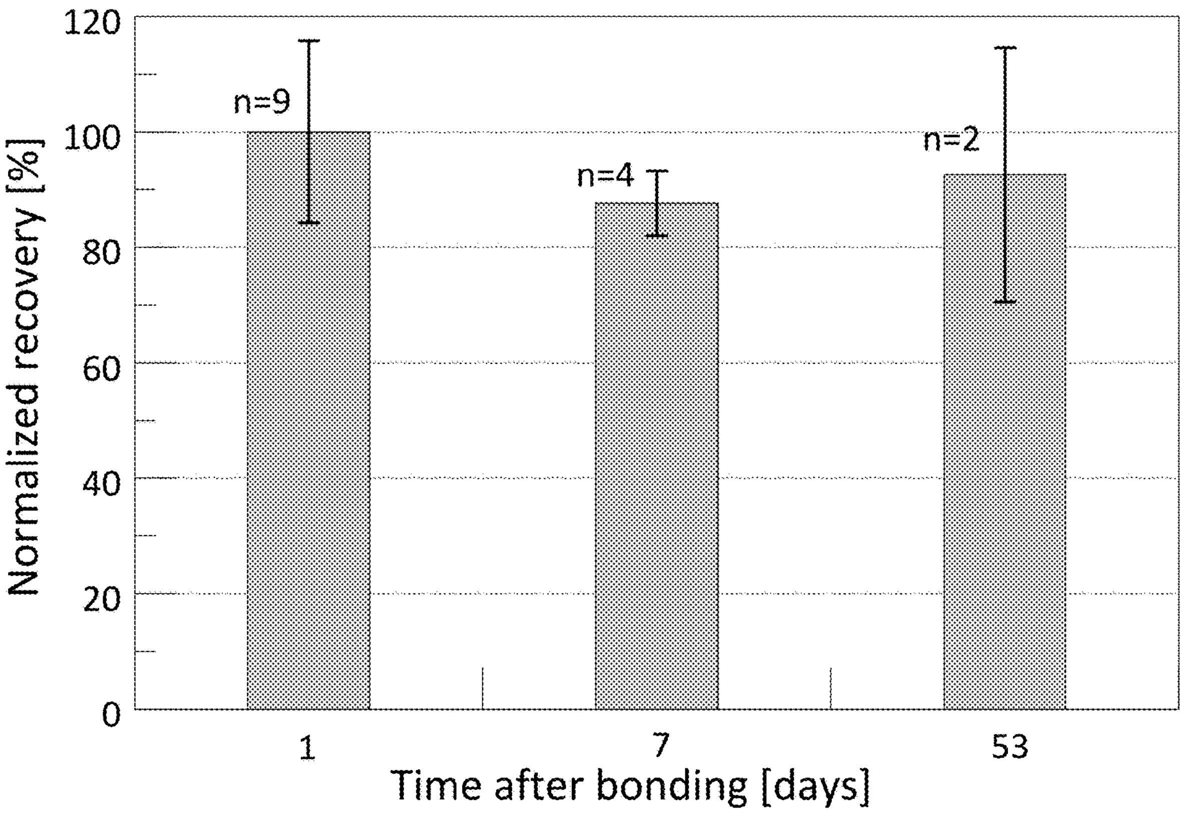
FIG. 12 is a bar graph depicting recovery of DNA ladder using LiquidScan liquid handling system as a function of the biomarker isolation chip storage time.

It was important to ascertain whether the activity of the of the UV/$O_3$ modified COP surface toward precipitation of nucleic acids does change with ageing as this has a direct impact on the shelf-life of the microfluidic device. In order to evaluate the long-term stability of the oxidized COP surface, the extraction efficiency of the microfluidic chips that were stored in air for up to 53 days was measured. The results of these studies are demonstrated in FIG. 12. FIG. 12 is a bar graph depicting recovery of DNA ladder using Chip 1 and the LiquidScan liquid handling system as a function of the chip storage time. DNA ladder in the amount ranging from 20 ng to 4 μg was spiked directly into the immobilization buffer and processed through Chip 1. Recovered DNA was quantified using Tape Station 2200. All data was normalized to average recovery for one-day old chips. No significant reduction in surface activity occurs within the time period tested.

G. Evaluation of cfDNA Isolation Method as a Sample Preparation Step for Molecular Assays Targeting the Detection of Rare, Highly Conserved Nucleotide Polymorphisms and Deletions.

The percent of mutant alleles derived from tumor cells in the total pool of cfDNA in plasma ranges between 0.5-64%. In order to develop a cfDNA assay in which rare genetic information regarding the nature of the tumor can be used to manage a variety of cancer diseases the cfDNA enrichment and purification approach has to be sufficiently sensitive to detect low abundance cfDNAs derived from tumors and yield cfDNA products of high quality that could be successfully used in downstream molecular analyses. Compatibility of the cfDNA isolation approach described herein with different molecular assays was evaluated. Advantageously, as shown in the data herein, the cfDNA isolated via the automated assay (Chip 1 and the LiquidScan liquid handling system) is of high quality and amenable to different molecular processing strategies to monitor SNPs and other mutations; thus demonstrating its viability for testing clinical blood samples from cancer patients.

For these proof-of-concept experiments cfDNA reference standards (cfDNA Reference Standard Set, Horizon Discovery) were used. Standards are short DNA fragments (~160 bp) with engineered SNPs and deletions in genes such as EGFR or KRAS at different allelic frequencies (0.1%, 1%, and 5%). The reference standards contain also a matched wild type (WT), with copy number concentrations known. cfDNA standards that reproduce a range of alleles at different concentrations (0.02%-1%) were purified from spiked samples using the cfDNA isolation Chip 1 and the LiquidScan liquid handling system according to already established isolation protocols.

Three different molecular assays were used to screen for the presence of Epidermal Growth Factor Receptor (EGFR) point mutations or deletions in isolated cfDNA. The following targets were interrogated: L747_A750del in Exon 19, T790M in Exon 20, and L858R in Exon 21 of the EGFR gene. The average recovery of the cfDNA models was 89.8±5.7% (n=9). The size distribution of cfDNA sample (50-400 bp range, with a peak at 160 bp) before and after isolation did not change indicating again no bias of the assay toward any particular length of the cfDNA.

The EGFR T790M mutations were detected via allele-specific competitive blocker—quantitative PCR (Zhao, J., Feng, H.-H., Zhao, J.-Y., Liu, L.-C., Xie, F.-F., Xu, Y., Chen, M.-J., Zhong, W., Li, L.-Y., Wang, H.-P. et al. (2016) A sensitive and practical method to detect the T790M mutation in the epidermal growth factor receptor. Oncol Lett, 11, 2573-2579.). The assay demonstrated no amplification for wt cfDNA up to 5 ng (~560 wt copies) and amplification/detectability down to 5 mutated copies. Assay detected frequency of mutated copies with an excellent sensitivity and specificity (Table A).

A EGFR T790M

| Sample ID | Input mass (ng) | Determined mt copy number | Seeding level mt copy number |
|---|---|---|---|
| S1 | 0.72 | 6.4 | 5 |
| S8 | 4 | 1.0 | 0 |
| S9 | 4 | 8.3 | 7 |
| s10 | 4 | 12.8 | 13 |

-continued

A EGFR T790M

| Sample ID | Input mass (ng) | Determined mt copy number | Seeding level mt copy number |
|---|---|---|---|
| s11 | 4 | 25.7 | 22 |
| s12 | 4 | 30.2 | 22 |
| s13 | 4 | 21.9 | 22 |

Clearly the isolated cfDNA quality was adequate for this molecular assay. This assay in particular can be very promising method to screen for EGFR T790M mutation (and if redesigned, for other point mutations) in samples that contain only a small number of mutant cfDNA molecules, as is the case in cfDNA samples isolated from patients' plasma.

Codon 858 mutation was detected via allele specific qPCR (Vallee, A., Sagan, C., Le Loupp, A.-G., Bach, K., Dejoie, T. and Denis, M. G. (2013) Detection of EGFR gene mutations in non-small cell lung cancer: lessons from a single-institution routine analysis of 1,403 tumor samples. Int J Oncol, 43, 1045-1051.). The method uses two forward primers with variations in their 3' nucleotides such that each primer is specific for the wild-type or the mutated variant, and one common reverse primer. The difference in Ct value determined for both amplified samples allows for estimation of the level of mutated frequency in the sample. The assay performed very well in terms of specificity for our control (c) and isolated cfDNA samples (s). The frequency of detection of mt alleles was 1% (7 copies of mt DNA in the abundance of 723 wt copies of this gene (Table B)).

B Codon 858 mutation (L858R)

| Sample Id | Input mass (ng) | ΔCt | % mutant seeded | % mutant detected |
|---|---|---|---|---|
| c1 | 0.04 | −4.9 | 5% | 3.3% |
| c2 | 0.2 | −4.6 | 5% | 4.2% |
| c3 | 0.4 | −4.2 | 5% | 5.3% |
| c4 | 2 | −4.1 | 5% | 6.0% |
| c5 | 4 | −4.0 | 5% | 6.3% |
| c6 | 20 | −4.6 | 5% | 4.2% |
| c7 | 4 | −10.6 | 0% | 0.06% (wt) |
| S1 | 0.72 | −4.47 | 5% | 4.5% |
| S1 | 0.72 | −4.04 | 5% | 6.1% |
| S2 | 0.5 | −5.78 | 2.5% | 1.8% |
| S3 | 0.98 | −3.82 | 5% | 7.1% |
| S4 | 3.30 | −7.09 | 1% | 0.7% |
| S5 | 2.26 | −12.55 | 0.1% | 0.01% |
| S6 | 3.86 | −4.36 | 5% | 4.8% |
| S8 | 4 | −4.11 | 5% | 5.8% |
| s9 | 4 | −14.23 | 0% | 0.005% (wt) |

Detection of L747_A750del was performed via end point PCR and fragment analysis. (Liu, Y., Lei, T., Liu, Z., Kuang, Y., Lyu, J. and Wang, Q. (2016) A Novel Technique to Detect EGFR Mutations in Lung Cancer. Int J Mol Sci, 17, 792.) Sizing by capillary gel electrophoresis indicated presence of at least 2 products, 150 bp and 135 bp, indicative of a wt and mt cfDNA present in the sample, respectively. Samples containing ≥1% of mutated alleles were determined to be positive. At level of 0.1% (1 mt copy/1000 wt copies) mutated cfDNA was not detected reproducibly (Table C).

| C EGFR L747_A750del Exon 19 | | |
|---|---|---|
| ID | Seeding level of mt copy | Detected level mt copy |
| c1 | 1% (120 copies) | Detected (2%) |
| c2 | 1% (60 copies) | Detected (2%) |
| c3 | 1% (30 copies) | Detected (2%) |
| c4 | 1% (15 copies) | Detected (2%) |
| c5 | 1% (6 copies) | Detected (2%) |
| c6 | 0% (0 copies) | Not detected |
| S3 | 5% mt (14 copies) | 6.2% |
| S4 | 1% (14 copies) | 2.5% |
| S5 | 0.1% (1 copy) | Not detected |
| S6 | 0% (0 copies) | Not detected |
| S7 | unknown | 19% |
| S9 | 5% (7 copies) | 13.5% |
| S10 | 1% (10 copies) | 1.6% |
| s11 | 0.1% (1 copy) | Not detected |

CGE results slightly overestimated the frequency of the mt cfDNA, which can be attributed to more efficient loading of the shorter product (indicative of deletion) onto the CGE, however, in terms of identification of wt and mt samples assay provided 100% specificity and 100% test positivity.

In conclusion, the quality of isolated cfDNA models was adequate for performing molecular assays for the determination of the mutated alleles frequency. The cfDNA can be eluted in a low volume to provide the concentration of the cfDNA that is ideal for molecular biology reactions (1-4 ng/μL).

H. Prophetic Example: Demonstration of the Applicability of Isolated cfDNA for Assays Targeting the Detection of Rare, Highly Conserved Nucleotide Polymorphisms and Deletions in Cancer Patients.

Plasma samples from patients diagnosed with colorectal cancer (CRC), non-small cell lung cancer (NSCLC), or pancreatic cancer (PDAC) will be tested for the presence of KRAS and EGFR mutations. These mutations are defined as "actionable targets" in CRC and NSCLC. For example, for the first-line NSCLC therapy, EGFR mutation status constitutes a test to identify patients who are most likely to benefit from EGFR-tyrosine kinase inhibitor therapy rather than from chemotherapy. CRC patients are tested for presence of KRAS mutation to identify those who will benefit from anti-EGFR monoclonal therapy [C. J. Langer, P. T. 2011 May; 36(5): 263-268, 277-279]. Although, PDAC patients are not routinely tested for KRAS because it is considered that 90% of all PDAC patients' tumors are KRAS mutations positive they will serve as likely positive control in proposed studies. 5 banked cancer patients plasma samples (1 mL) and 5 healthy donors (1 mL) will be processed and tested for the presence of KRAS and EGFR mutations/deletions in the plasma extracted cfDNA. The mutation assays will be tested on healthy donor isolated and patient derived cfDNA, as well. The levels of cfDNA in healthy donors and cancer patients will be compared and statistical analysis performed.

I. Prophetic Example: Isolation of cfDNA from Prenatal Samples.

Non-invasive prenatal testing (NIPT) is based on analysis of cfDNA in maternal blood. The majority of cfDNA in maternal blood originates from the mother herself, with the fetal component (cffDNA) contributing approximately 10-20% of the total. cffDNA is present in maternal blood from early pregnancy [Lo, Y. M. et al; *Am. J. Hum. Genet.* 1998, 62(4):768-775]. It emanates from the placenta, but represents the entire fetal genotype and is rapidly cleared from the maternal circulation with hours of delivery, making it pregnancy specific.

Plasma samples from pregnant women will be processed using a biomarker selection chip and LiquidScan pipetting platform in order to isolate cfDNA. Purified cfDNA will be subjected to library preparation protocol and the next generation sequencing (NGS) assay will be used to screen for common fetal chromosomal numerical disorders such as trisomy 13, 18, and 21. Birth outcomes or karyotypes will be used as the reference standard.

J. Efficient Capture of EVs

A. Post-Assembly Chip Activation

Microfluidic chips used for affinity selection of EVs comprise monoclonal antibodies (mAbs) covalently attached to the surface of microposts and microfluidic channels via single-stranded oligonucleotide bifunctional cleavable linkers containing uracil residue that could be cleaved using a USER®. Chip 1 was modified with mAbs attachment according to the following steps:

(1) Monoclonal antibody (mAb) labeling with sulfosuccinimidyl-4-(N-maleimido-methyl)cyclohexane-1-carboxylate (Sulfo-SMCC). mAb labeling involved addition of 6 L (50× excess) of maleimide crosslinker sulfo-SMCC (10 mg/mL in nuclease free water) to 0.5 mg mAb in 500 L of water followed by incubation for 1.5 h at room temperature on a rocker. Following reaction, the mAb was purified using a Zeba column (7K MWCO, Thermo Scientific, with exchanged buffer for PBS pH 7.4) to remove excess of non-reacted sulfo-SMCC. mAb-SMCC in PBS pH 7.4 could be stored up to 3 days at 4° C. prior to device modification. When nonlyophilized mAbs were used, which contained sodium azide, the mAb was purified using a Zeba column prior to SMCC labeling or direct attachment.

(2) Modification of the EV isolation chip with oligonucleotide linkers. A UV/03-activated device was flooded with a solution of 20 mg/mL 1-ethyl-3-[3-dimethylaminopropyl] carbodiimide hydrochloride (EDC) and 2 mg/mL N-hydroxysuccinimide (NHS) in 100 mM 2-(4-morpholino)-ethane sulfonic acid (MES) (pH 4.8) and incubated at room temperature. After 20 min, an air filled syringe was used to remove solution from the chip and immediately after that, a 40 μM solution of the ssDNA linker (linker sequence: 5'-NH2-C12-T8CCCTTCCTCCTCACTTCCCTTTUT9-C3-S—S—C3OH (SEQ ID NO: 9) in PBS buffer (pH 7.4), Integrated DNA Technologies) was introduced into the device and allowed to incubate for 2 h at room temperature or overnight at 4° C. to covalently attach the ssDNA linker at its 5'-terminus to the activated COP surface.

(3) Covalent attachment of mAbs. After ssDNA linker attachment to the COP surface was complete, the microfluidic chip was rinsed with 100 L PBS (pH 7.4) at 40 μL/min and 300 mM of dithiothreitol (DTT) in carbonate buffer (pH 9), which was infused into the microfluidic chip for 20 min to reduce the 3'-disulfide group into a reactive sulfhydryl moiety (—S—H). The microfluidic chip was rinsed with 100 L PBS (pH 7.4) at 50 μL/min, and immediately an aliquot of the modified mAb-SMCC was introduced (~0.5 mg/mL). The reaction proceeded for 2 h on ice or overnight at 4° C.

B. EV Isolation

Sample Processing and Analysis:

Bench top syringe pump (PHD Ultra, Harvard Apparatus) was used to carry out liquid handling steps for initial evaluation of the performance of the functionalized Chip 1 toward isolation of EVs. The Liquid Scan liquid handling system (an embodiment of the high-throughput, fluid-tight flow system described herein) was used to carry out all of the liquid handling steps of the EV isolation from clinical samples.

Blood samples were collected into EDTA tubes to prevent coagulation of blood. To obtain plasma and medium appropriate for EV isolation, blood components and cell suspensions were centrifuged at 300 g for 10 min followed by 1,000 g for 5 min. Plasma or medium samples were processed using biomarker isolation chip within an hour or were stored at −80° C. until use. Samples were hydrodynamically pumped through the chip using the Liquid Scan liquid handling system. To minimize non-specific adsorption, EV-MAP mAb-modified surfaces were blocked with 200 μL (10 μL/min) 1% PVP-40 and 0.5% bovine serum albumin (BSA) in PBS prior to sample processing. The chips were then washed with 1% Tween-20 in TBS after enrichment to remove non-specifically bound material. The cell media or plasma samples were processed through each chip at a flow rate of 13 L/min. Post-isolation rinse was performed at 10 μL/min with TBS/tween20 (Bio-Rad, Hercules, CA).

Following EV enrichment and wash, the selected EVs were released and subjected to NanoParticle Tracking Analysis (NTA), Transmission Electron Microscopy (TEM) analyses and total EV RNA was characterized and quantified using fluorescence and electrophoretic methods.

NanoParticle Tracking Analysis (NTA). The samples were diluted to the concentration that fits within the dynamic range of the NTA instrument (Nanosight NT 2.3) and vortexed thoroughly prior to being analyzed. NTA instrument was operated according to SOPs provided by the instrument manufacturer. NTA was used to (i) characterize size distribution of the EVs isolated from media and plasma samples and (ii) quantify the EVs isolated from media and plasma samples.

Transmission electron microscopy. Enriched and subsequently released EVs were vortexed thoroughly and 5 μL of the EV samples was placed onto a carbon grid (Carbon Type-B, 300 mesh, Copper, TED PELLA, Inc., Redding, CA) film for 20 min. Then, the grid was washed with deionized water. Next, the grid was placed in 2% (w/v) uranyl acetate stain, which was filtered by a 0.22 m filter (Thermo scientific, IL, USA) for 10 s and blot dried. The grids were dried for at least 15 min before evaluating using TEM.

Quantitation and characterization of total exosome RNA. Extracted EVs were lysed and TRNA purified using a commercial lysis and RNA extraction kit (Zymo RNA kit) following the manufacturers protocol. Purified TRNA was eluted in water. Size distribution of TRNA extract and quantification of RNA was performed using electrophoresis (Agilent 2200 TapeStation).

Figure 13A:
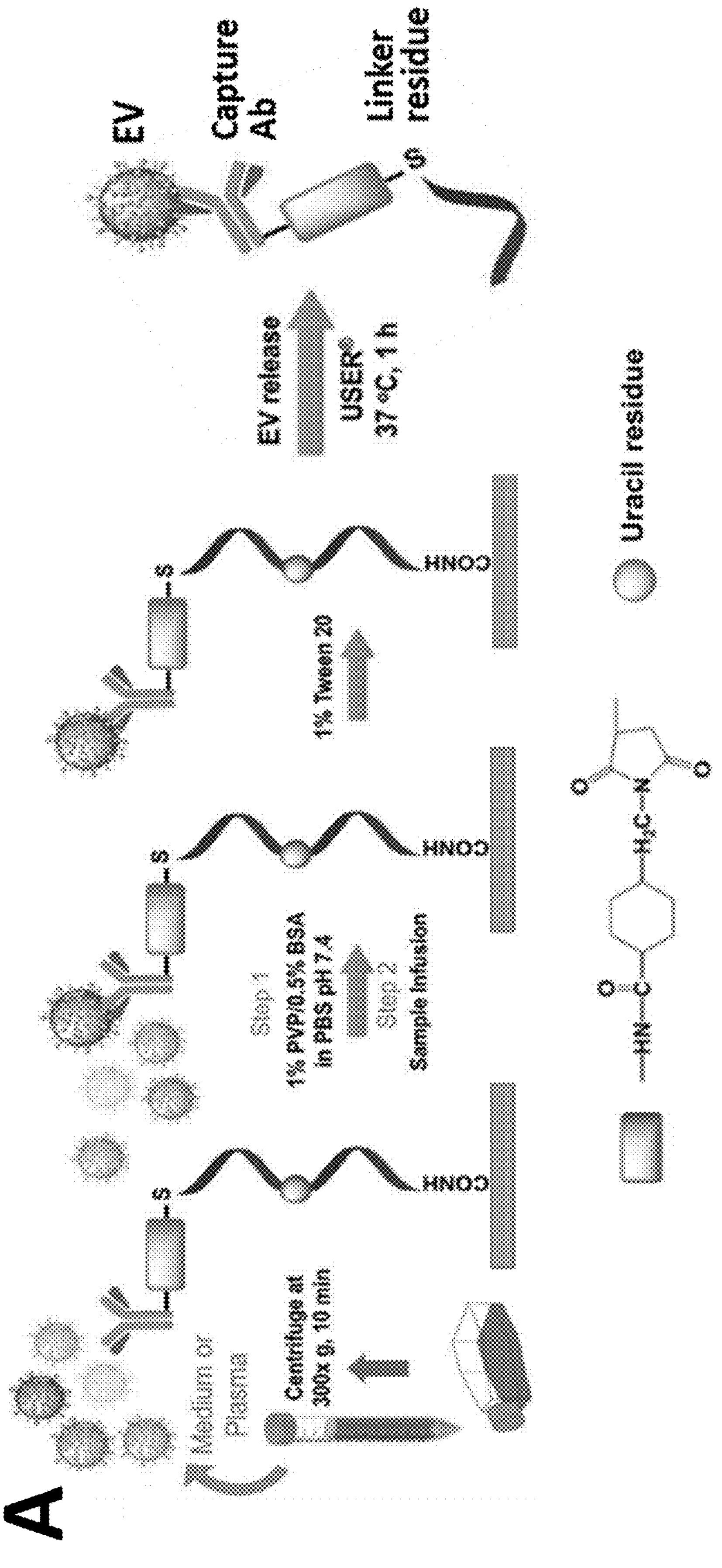
FIG. 13A is a schematic diagram representing the workflow for sample processing including affinity capture of EVs, bed wash, and release of enriched EVs from the EV-MAP device's surface.

Initial evaluation of chip performance. In order to evaluate physical properties of EVs with nanoparticle tracking analysis (NTA) and transmission emission microscopy (TEM) the EVs have to be released intact from the micropost surface. FIG. 13 are illustrations and data regarding affinity enrichment of EVs and release from the microfluidic device. Thus, we have evaluated the attachment of the antibodies to the polymer surface via oligonucleotide bifunctional linker (FIG. 13A) which contained a uracil residue that can be cleaved with USER® (Uracil Specific Excision Reagent) hence allowing for release of EVs after affinity enrichment. (Nair, S. V. et al. Enzymatic cleavage of uracil-containing single-stranded DNA linkers for the efficient release of affinity-selected circulating tumor cells. Chem. Commun. 51, 3266-3269 (2015).) FIG. 13A is a schematic diagram representing the workflow for sample processing including affinity capture of EVs, bed wash, and release of enriched EVs from the EV-MAP device's surface. We have tested this approach by covalently attaching the anti-CD8α mAbs through oligonucleotide linkers to the surfaces of the EV-MAP and isolating EVs from conditioned cell culture media (MOLT-3 cells).

Figure 13B:
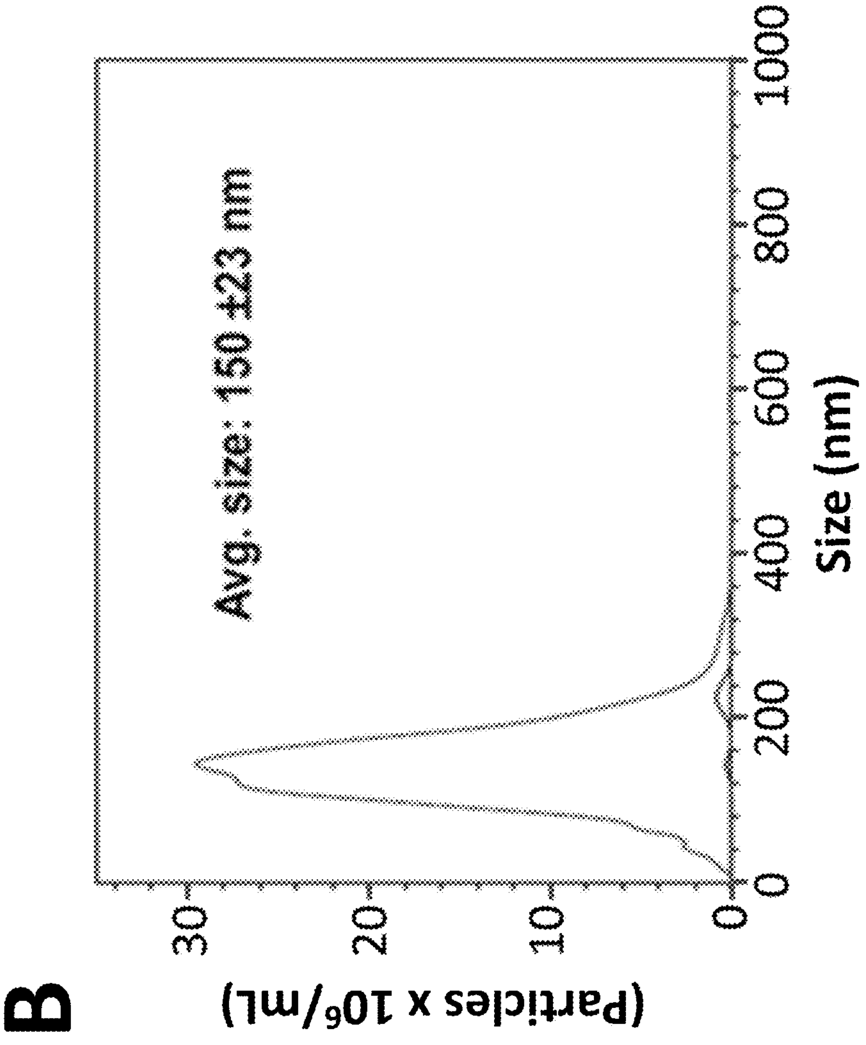
FIG. 13B is a graph showing NTA results (n=3).
Figure 13E:
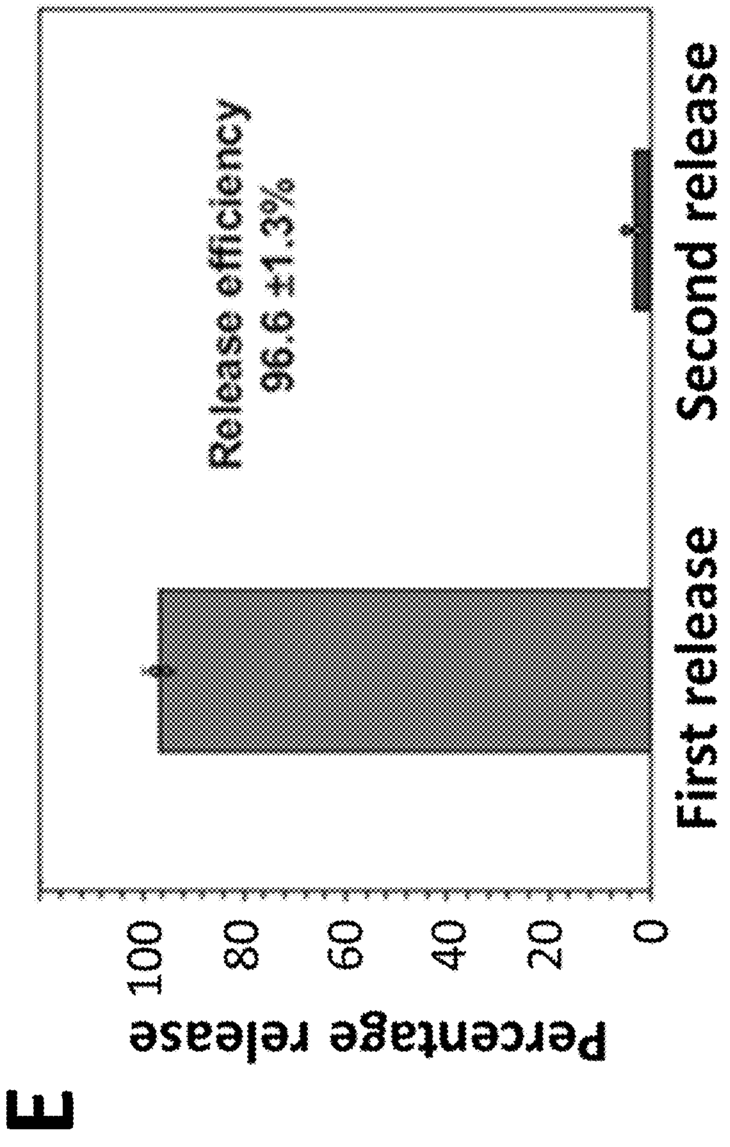
FIG. 13E is a bar graph showing the percentage of EVs released during first and second release with USER® enzyme.

FIG. 13B is a graph showing NTA results (n=3). FIG. 13C and FIG. 13D are TEM images showing the number of EVs released during first (C) and second (D) USER® enzyme release of EVs isolated from MOLT-3 cell culture media. FIG. 13E is a bar graph showing the percentage of EVs released during first and second release with USER® enzyme. As demonstrated in FIG. 13B, FIG. 13C, and FIG. 13D, the mAb linker cleaved with USER® released enriched EVs from the functionalized Chip 1 is confirmed by TEM and NTA. NTA indicated an average particle size of 150±23 nm and a concentration of $1.6\pm0.7\times10^{8}$ particles/100 μL media (n=3). Incubation with USER® yielded a 96.6±1.3% EV release efficiency (FIG. 13E).

Figure 14A:
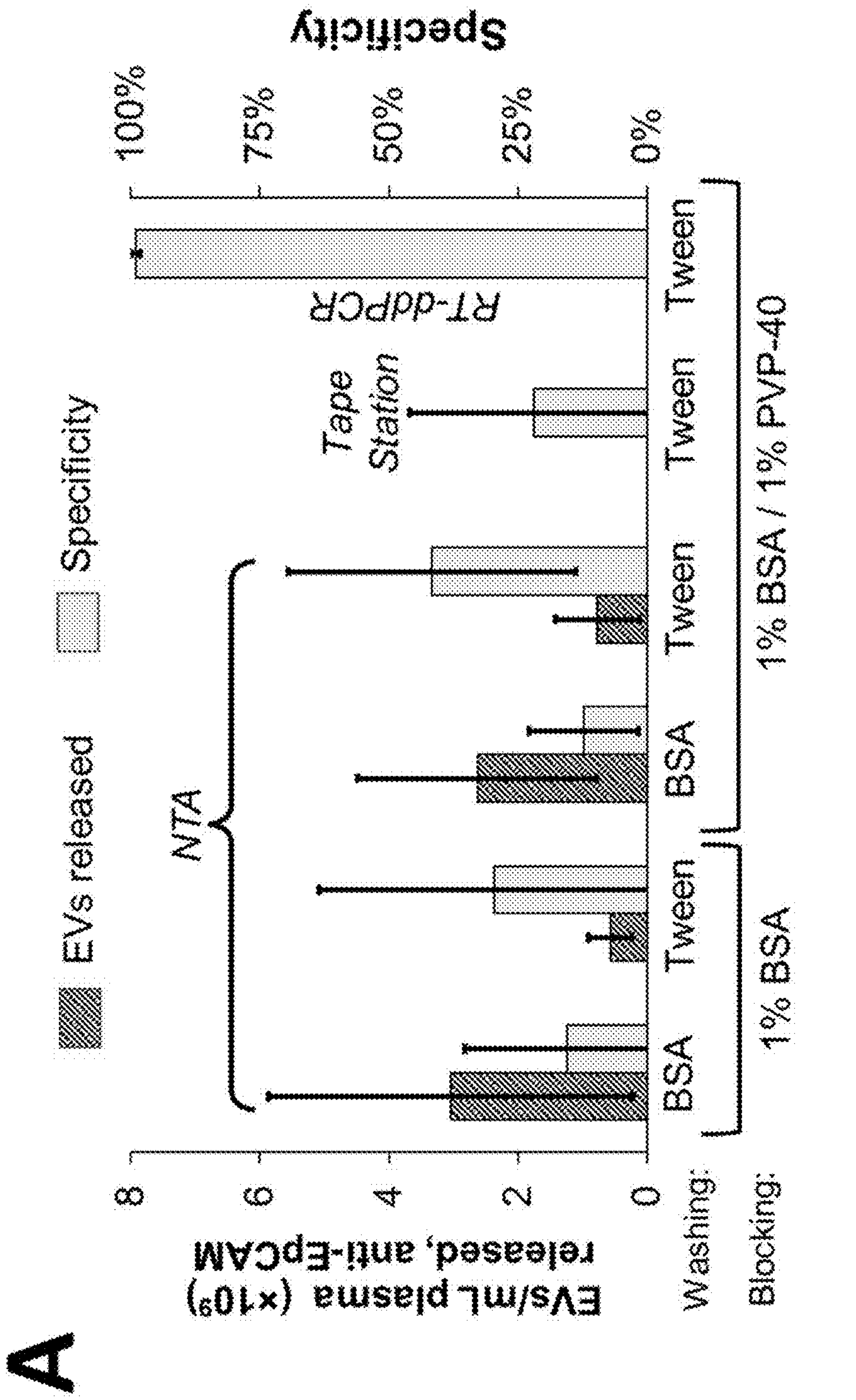
FIG. 14A is a bar graph comparing specificity and showing optimization of blocking and washing buffers based on maximizing specificity achieved from healthy donor plasma samples.

We assessed enrichment of cell-specific EV subpopulations from healthy controls using anti-EpCAM and anti-FAPα mAb functionalized Chip 1. We also tested devices decorated with anti-CD81 mAbs, which targets a tetraspanin found in most EVs and employed anti-IgG2A devices as isotype control. To minimize nonspecific adsorption artifacts that may result from plasma processing, various blocking and washing buffer combinations were assessed for their ability to increase specificity. FIG. 14A is a bar graph comparing specificity and showing optimization of blocking and washing buffers based on maximizing specificity achieved from healthy donor plasma samples. Specificity was calculated based on subtraction of the nonspecific $IgG2_{B}$ EV concentrations from the anti-EpCAM EV concentrations and dividing by the total number of nanoparticles collected as measured through NTA. Comparison of assay specificity is also included based on NTA results, RNA quantification, and mRNA copy quantification. Blocking and washing functionalized Chip 1 surfaces with 1% BSA in PBS resulted in the lowest specificity, which was determined to be 16% as determined using the anti-EpCAM device (see FIG. 14A). Using 0.2% Tween-20® to remove nonspecifically bound particles increased the specificity to 30% with the number of enriched particles using anti-EpCAM devices not affected. The addition of 1% PVP-40 to the BSA blocking buffer while washing the devices with 0.2% Tween-20® achieved the highest specificity, which was 42% (FIG. 14A). We also assessed device specificity through mRNA copy number quantification and found the assay to produce 99±1% specificity (FIG. 14A) as judged through mRNA expression profiling using RT-ddPCR analysis.

Figure 14B:
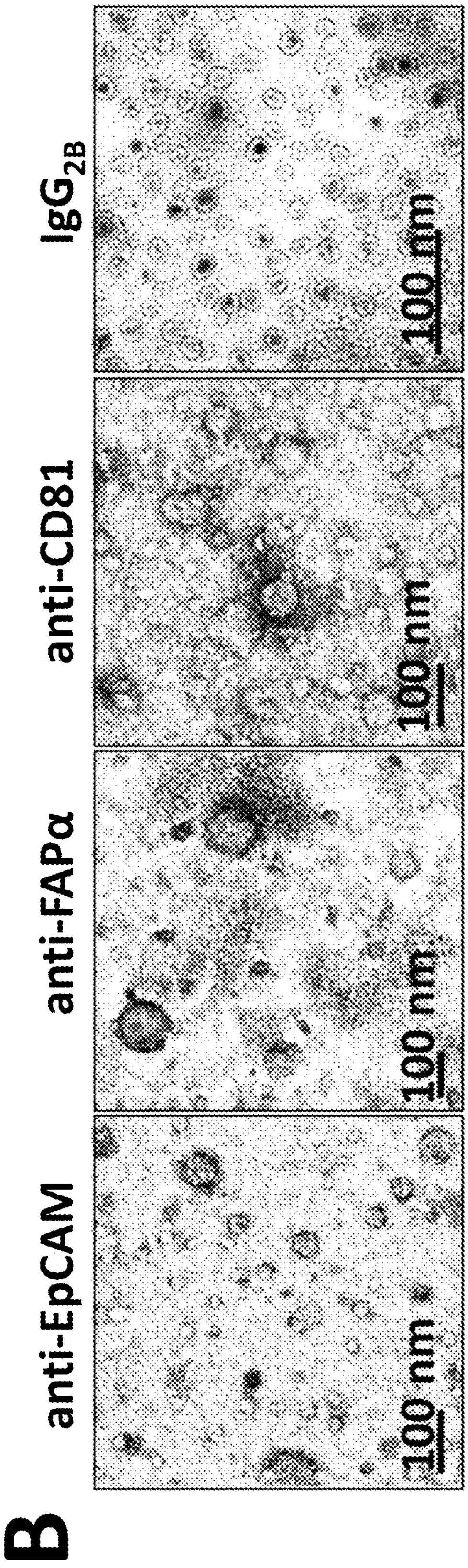
FIG. 14B are TEM images of EV fractions isolated from a pooled donor plasma sample, with the same sample also used to extract TRNA for RT-ddPCR analysis.
Figure 14C:
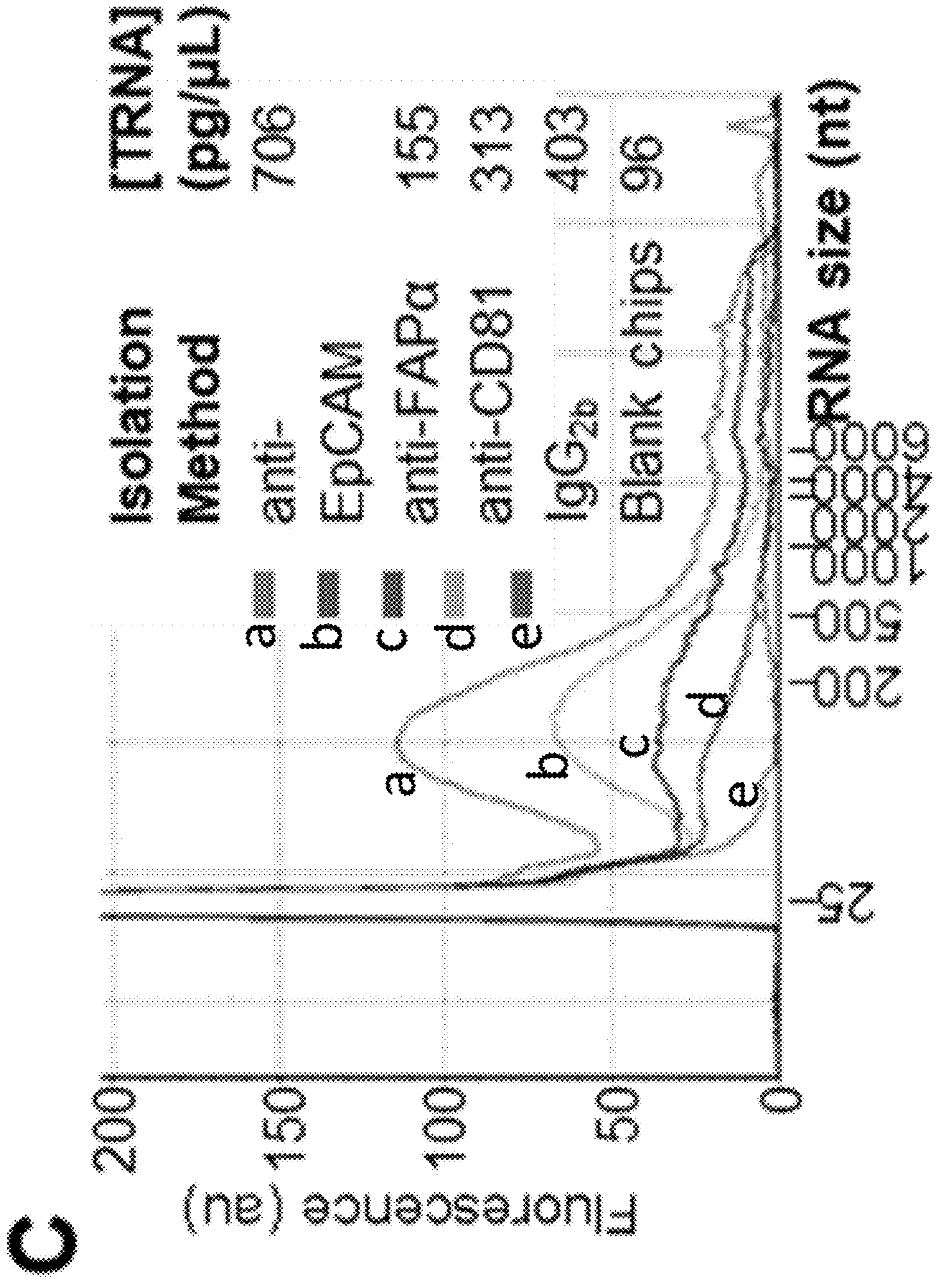
FIG. 14C is a line graph showing data for TRNA pooled from three devices for each EV fraction and analyzed using HS RNA Tape.

FIG. 14B are TEM images of EV fractions isolated from a pooled donor plasma sample, with the same sample also used to extract TRNA for RT-ddPCR analysis. TEM images of all enriched fractions showed the presence of EVs represented through observation of a cup-shaped morphology characteristic of EVs (FIG. 14B). Though EVs were present in the isotype fraction, the majority of those EVs were small, exhibiting diameters <30 nm. FIG. 14C is a line graph showing data for TRNA pooled from three devices for each EV fraction and analyzed using HS RNA Tape. The presence of EVs in the isotype fraction was verified by the extraction of total RNA (FIG. 14C), with total RNA traces indicating sizes ranging from 50 to 500 nt, which represents the typical RNA sizes found in EVs.

Demonstration of the Utility of EVs to Diagnose Breast Cancer Patients.

In breast cancer (BC) management, mRNA expression profiling is already used to stratify patients after diagnosis to help physicians choose the most beneficial treatment option. However, mRNA is currently extracted from tumor tissue after prior receptor status is analyzed. EV mRNA expression profiling could therefore serve as a liquid biopsy biomarker alternative for this application. To demonstrate the clinical utility of the EV-MAP assay, we have evaluated plasma samples from healthy donors and BC patients. All samples were secured from the KUMC Biospecimen Repository Core Facility with the healthy controls age matched to the patient samples. All patient samples originated from women with metastatic breast cancer who had previously received chemotherapy. Two markers were targeted for the purification of cancer-associated EVs: EpCAM ($EV_{EpCAM}$) and FAPα ($EV_{FAP\alpha}$).

Figure 15A:
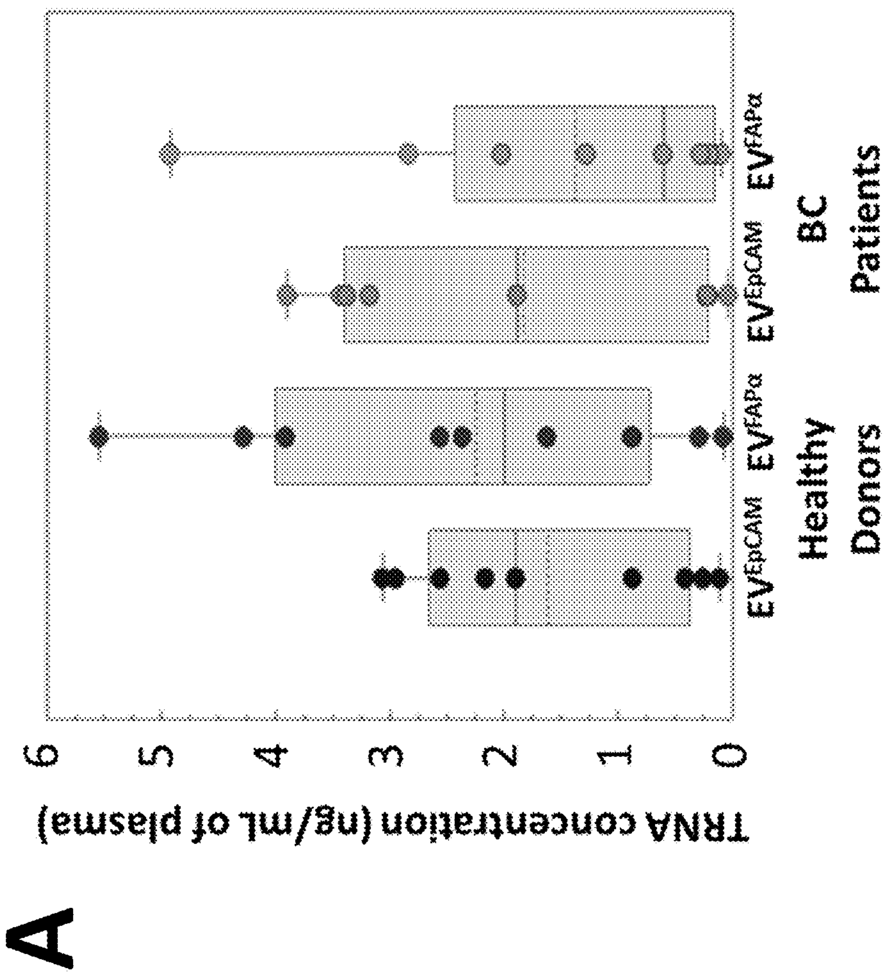
FIG. 15A is a bar graph showing box plots presenting the concentration of TRNA extracted from $EV^{EpCAM}$ and $EV^{FAP\alpha}$ isolated from healthy donors and breast cancer patients.
Figure 15B:
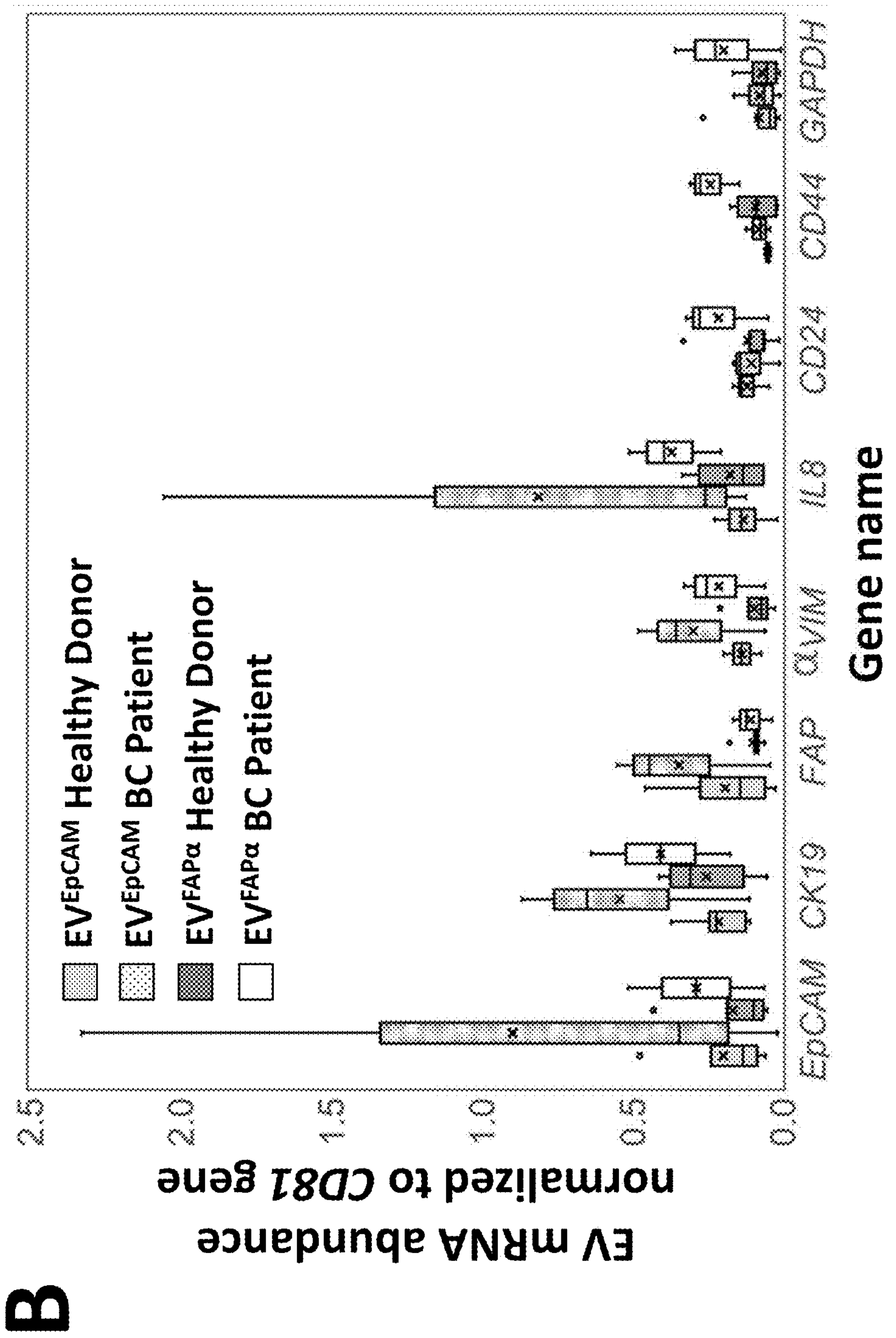
FIG. 15B and FIG. 15C are graphs showing results from RT-ddPCR of 7 genes.
Figure 15C:
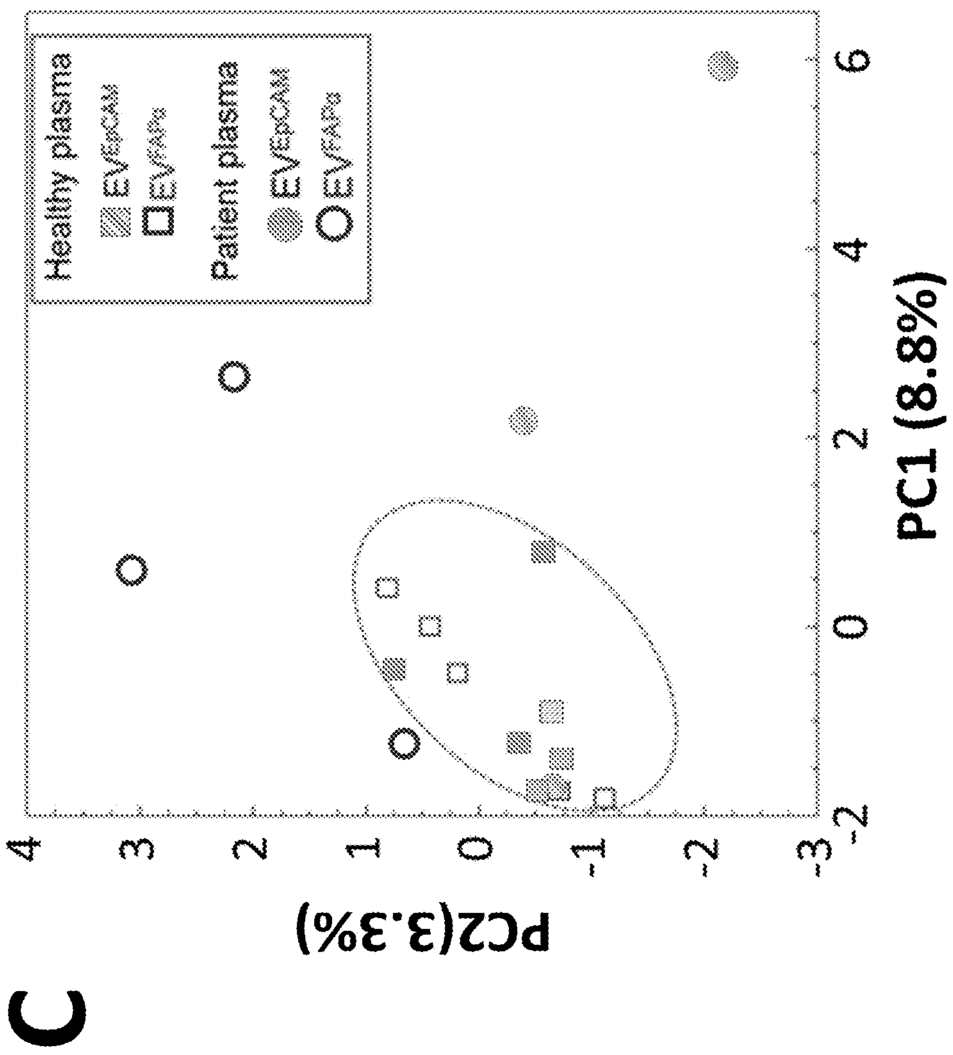

To compare healthy and patient gene expression profiles resulting from the functionalized Chip 1, 500 μL of plasma was processed through the anti-EpCAM and anti-FAPα selecting devices. EVs were lysed on-chip and isolated RNA was used for further analysis. FIG. 15A is a bar graph showing box plots presenting the concentration of TRNA extracted from $EV^{EpCAM}$ and $EV^{FAP\alpha}$ isolated from healthy donors and breast cancer patients. The concentrations of total RNA isolated from EVs from BC patients and healthy counterparts did not indicate differences between these two groups (FIG. 15A). FIG. 15B and FIG. 15C are graphs showing results from RT-ddPCR of 7 genes. FIG. 15B shows $EV^{EpCAM}$ and $EV^{FAP\alpha}$ mRNA abundance for healthy donors and breast cancer patients. The abundance of mRNA transcripts in both $EV_{EpCAM}$ and $EV_{FAP\alpha}$ for tested genes showed higher number of mRNAs in BC patients. FIG. 15C shows principal component analysis of results. Upon the principal component analysis of mRNA profiles a cluster of data points for healthy donors was observed, while almost all the data for BC EVs were outside of the cluster. One BC sample fell into the cluster of the healthy donor data point.

Researchers have rarely performed EVs mRNA transcripts analysis in cancer patient because of low mass of isolated material. Less than 2% of TRNA found in EVs is mRNA (Wei, Z., et al. Coding and noncoding landscape of extracellular RNA released by human glioma stem cells. Nat. Commun.; 8, 1145 (2017).) and this mRNA tends to be truncated. However, if probes or primers are carefully designed to span the sequence of mRNA close to 3' poly A region, then the analysis of mRNA/cDNA transcripts is possible, as shown in the FIG. 15A-C. Additionally, our initial results suggested that copy numbers for cDNA (i.e., mRNA) observed were low, however, above the levels for the negative controls and above the limit-of-detection of ddPCR (empirically determined as 4 copies). This finding encouraged us to proceed and test this sample preparation technology with a standard of care clinical assay, namely Prosigna, a breast cancer subtype classifier on the NanoString nCounter Dx Analysis platform.

Figure 16A:
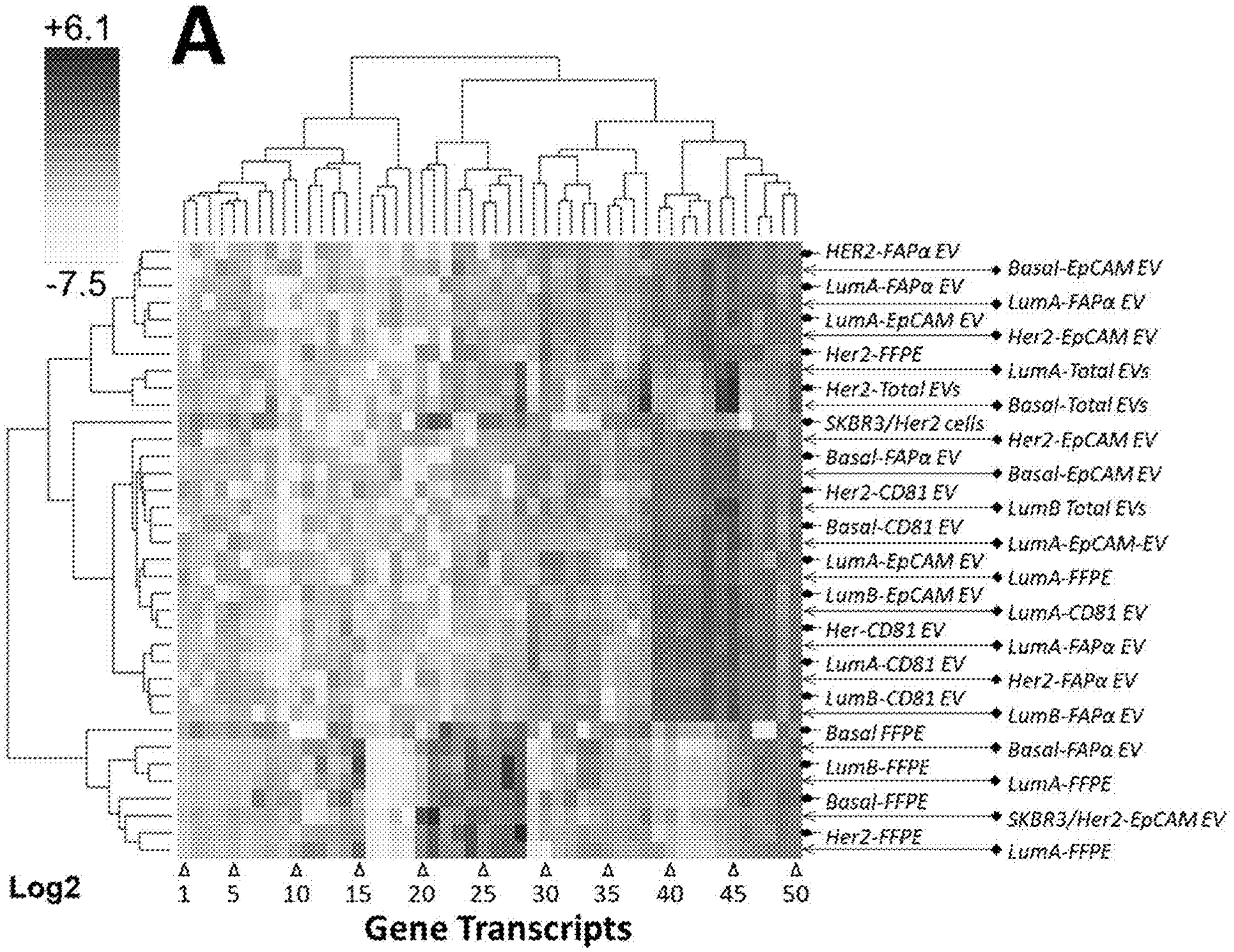
FIG. 16A shows heat maps for 50 panel gene and 9 BC samples. Total EVs, and affinity isolated CD81(+) EVs, and FAPα(+) or EpCAM(+) EVs were selected from BC plasma samples and tested with Prosigna.
Figure 16B:
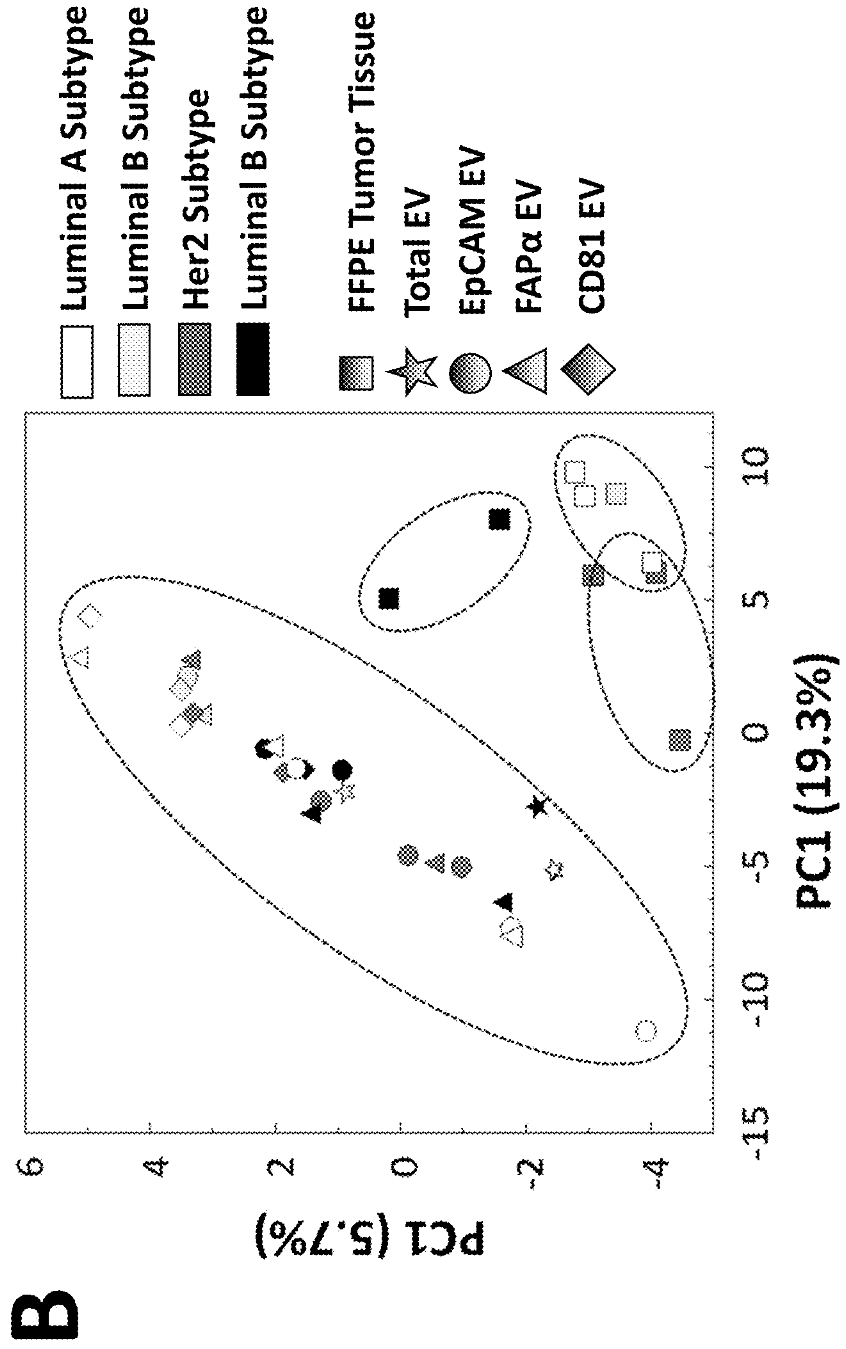
FIG. 16B is a graph showing results from PCA performed on analyzed samples, results which clearly distinguished EVs from BC mRNA.

Conventional BC classification based on receptor status alone can be reinforced by the molecular signatures of the tumor tissue. For example, Prosigna™, a PAM50-based breast cancer subtype classifier identifies intrinsic subtypes of breast cancer shown to be predictive of risk of recurrence. (Perou, C. M., Sørlie, T., Eisen M. B., et al. Molecular portraits of human breast tumours. Nature; 406:747-752 (2000); Sørlie, T., Perou C. M., Tibshirani R., et al. Gene expression patterns of breast carcinomas distinguish tumor subclasses with clinical implications. Proc Natl Acad Sci USA; 98:10869-10874 (2001).) Additionally, the test provides information on which type of drug (i.e., hormonal therapy and/or chemotherapy) will benefit patient most. The reason for this being the fact that Prosigna's five molecular intrinsic BC subtypes vary by their biological characteristics and also level of aggressiveness. Prosigna is performed using mRNA extracted from formalin-fixed paraffin-embedded (FFPE) tumor tissue and was never used for evaluation of mRNA gene profiles from EVs. Analysis of the EV mRNA using Prosigna was successful, and PCA clearly distinguished samples' origin (EV vs. tumor tissue). FIG. 16A shows heat maps for 50 panel gene and 9 BC samples. Total EVs, and affinity isolated CD81(+) EVs, and FAPα(+) or EpCAM(+) EVs were selected from BC plasma samples and tested with Prosigna. FIG. 16B is a graph showing results from PCA performed on analyzed samples, results which clearly distinguished EVs from BC mRNA. There were genes that clearly formed clusters and were highly abundant in mRNA extracted from EV fractions, (FIG. 16A and FIG. 16B) and also there were genes that were either absent or low abundant in the EV mRNA samples. FIG. 16C is a table showing results from analysis of the transcripts abundance, results which showed high correlation in mRNA transcripts between EV CD81(+) EVs, and FAPα(+) or EpCAM(+) EVs (75-102%) and low concordance with tumor tissue (0.5-14.4%). Even for the total EVs and tumor tissue the concordance was 8-32%. This may be related to the truncated mRNA in EVs not being detected by the assay but also may be affected by amount of tumor cells in the FFPE tissue.

What is claimed:

1. A dual-depth thermoplastic microfluidic device comprising:

a thermoplastic substrate comprising an inlet microchannel, an outlet microchannel, and one or more isolation beds comprising a plurality of microposts, wherein the one or more isolation beds are connected to the inlet microchannel and outlet microchannel;

wherein a cross-section of each of the inlet microchannel, the outlet microchannel, and the microposts each has a height and width, wherein the inlet microchannel height and the outlet microchannel height are each greater than the height of the microposts, and wherein the inlet microchannel, the outlet microchannel, and the one or more isolation beds are a single dual-depth fluidic layer.

2. The dual-depth thermoplastic microfluidic device of claim 1, wherein the thermoplastic substrate is cyclic olefin copolymer (COC), cyclic olefin polymer (COP), polycarbonate (PC), polymethylmethacrylate, (PMMA), polystyrene (PS), polyvinylchloride (PVC), or polyethyleneterephthalate glycol (PETG).

3. The dual-depth thermoplastic microfluidic device of claim 1, wherein the microposts comprise capture elements.

4. The dual-depth thermoplastic microfluidic device of claim 3, wherein the capture elements are antibodies, antigen binding fragments of antibodies, or aptamers.

5. The dual-depth thermoplastic microfluidic device of claim 3, wherein the capture elements are surface-bound oxygen-rich moieties such as carboxylic acid groups, salicylates, or esters.

6. The dual-depth thermoplastic microfluidic device of claim 1, wherein the microposts are UV-activated.

7. The dual-depth thermoplastic microfluidic device of claim 1, wherein the microposts are $UV/O_3$-activated.

8. A kit comprising the dual-depth thermoplastic microfluidic device of claim 1, and at least one reagent or buffer for use in processing a liquid sample using the dual-depth thermoplastic microfluidic device.

9. A microfluidic system comprising:

the dual-depth thermoplastic microfluidic device of claim 1, wherein the dual-depth thermoplastic microfluidic device further comprises an inlet port in fluid communication with an outlet port;

a first automated pipetting channel comprising a first pump, and a first pipette tip coupled to the inlet port;

a second automated pipetting channel comprising a second pump, and a second pipette tip coupled to the outlet port; and a non-transitory computer readable medium in communication with the first pump and the second pump, and programmed to command the first pump of the first automated pipetting channel and the second pump of the second automated pipetting channel to control flow of a liquid through the dual-depth thermoplastic microfluidic device.

10. A method of isolating nucleic acid analytes from a liquid sample comprising:

providing the dual-depth thermoplastic microfluidic device of claim 1, wherein the microposts comprise capture elements that selectively bind a nucleic acid analyte;

controlling flow of a liquid sample through the dual-depth thermoplastic microfluidic device; and binding the nucleic acid analyte to the capture elements thereby isolating the nucleic acid analytes from the liquid sample.

11. The method of claim 10, wherein the dual-depth thermoplastic microfluidic device further comprises an inlet port in fluid communication with an outlet port; and The method further comprises providing a system to control flow of the liquid sample through the dual-depth thermoplastic microfluidic device, wherein the system comprises:

a first automated pipetting channel comprising a first pump, and a first pipette tip coupled to the inlet port;

a second automated pipetting channel comprising a second pump, and a second pipette tip coupled to the outlet port; and a non-transitory computer readable medium in communication with the first pump and the second pump, and programmed to command the first pump of the first automated pipetting channel and the second pump of the second automated pipetting channel to control flow of a liquid through the dual-depth thermoplastic microfluidic device.

12. The method of claim 10, wherein the nucleic acid analytes are cell-free DNA (cfDNA), circulating tumor DNA (ctDNA), genomic DNA (gDNA), or RNA.

13. The method of claim 10, wherein the capture elements are surface-bound carboxylic acid groups, and the method comprises controlling flow of the liquid sample mixed with an immobilization buffer through the dual-depth thermoplastic microfluidic device.

14. The method of claim 10, wherein the liquid sample is blood or any fraction or component thereof, cerebrospinal fluids, urine, sputum, saliva, pleural effusion, stool and seminal fluid.

15. The method of claim 10, wherein the liquid sample is plasma.

16. The method of claim 10, wherein >80% or >90% of nucleic acid fragments 50-750 bp in size are isolated and recovered.

17. The method of claim 10, wherein >70% of nucleic acid fragments 50-750 bp in size are isolated and recovered.

18. A method of isolating extracellular vesicles from a liquid sample comprising:

providing the dual-depth thermoplastic microfluidic device of claim 1, wherein the microposts comprise capture elements that selectively bind extracellular vesicles;

controlling flow of a liquid sample through the dual-depth thermoplastic microfluidic device; and binding the extracellular vesicles to the capture elements thereby isolating the extracellular vesicles from the liquid sample.

19. The method of claim 18, wherein the dual-depth thermoplastic microfluidic device further comprises and inlet port in fluid communication with an outlet port; and the method further comprises providing a system to control flow of the liquid sample through the dual-depth thermoplastic microfluidic device, wherein the system comprises:

a first automated pipetting channel comprising a first pump, and a first pipette tip coupled to the inlet port;

a second automated pipetting channel comprising a second pump, and a second pipette top coupled to the outlet port; and a non-transitory computer readable medium in communication with the first pump and the second pump, and programmed to command the first pump of the first automated pipetting channel and the second pump of the second automated pipetting channel to control flow of a liquid through the dual-depth thermoplastic microfluidic device.

20. The method of claim 18, wherein the extracellular vesicles are exosomes.

21. The method of claim 18, wherein the capture elements are antibodies, antigen binding fragments of antibodies, or aptamers.

22. The method of claim 18, wherein the capture elements are monoclonal antibodies.

23. The method of claim 18, wherein the capture elements are immobilized to the microposts by a single-stranded oligonucleotide bifunctional cleavable linker, or a photocleavable linker.

24. The method of claim 18, wherein the capture elements are immobilized to the microposts via surface-bound carboxylic acid groups.

25. The method of claim 18, wherein the liquid sample is blood or any fraction or component thereof, bone marrow, pleural fluid, peritoneal fluid, cerebrospinal fluid, urine, saliva, amniotic fluid, ascites, broncho-alveolar lavage fluid, synovial fluid, breast milk, sweat, tears, joint fluid, and bronchial washes.

26. The method of claim 18, wherein the liquid sample is plasma.

27. The method of claim 18, wherein the method further comprises lysis of the extracellular vesicles, RNA purification, RNA extraction, reverse transcription, and mRNA expression profiling.

28. The method of claim 18, wherein the method further comprises obtaining distinct mRNA profiles indicative of the phenotype of the cells from which the extracellular vesicles originated.

29. The method of claim 18, wherein the method further comprises release of the extracellular vesicles and nanoparticle tracking analysis.

30. The method of claim 18, wherein the method further comprises release of the extracellular vesicles and transmission electron microscopy analysis.

31. The dual-depth thermoplastic microfluidic device of claim 1 further comprising one or more microchannels, and wherein the one or more isolation beds are connected to the inlet microchannel and outlet microchannel by the one or more microchannels, and wherein the inlet microchannel, the outlet microchannel, the one or more microchannels, and the one or more isolation beds are a single dual-depth fluidic layer.

32. The dual-depth thermoplastic microfluidic device of claim 31, wherein a cross-section of each of the one or more microchannels each has a height and width, and wherein the inlet microchannel height and the outlet microchannel height are each greater than the height of the one or more microchannels.

* * * * *

SEQUENCE LISTING

```
Sequence total quantity: 9
SEQ ID NO: 1           moltype = DNA  length = 17
FEATURE                Location/Qualifiers
misc_feature           1..17
                       note = primer
source                 1..17
                       mol_type = other DNA
                       organism = synthetic construct
SEQUENCE: 1
gcctgctgaa aatgact                                                17

SEQ ID NO: 2           moltype = DNA  length = 22
FEATURE                Location/Qualifiers
misc_feature           1..22
                       note = primer
source                 1..22
```

-continued

```
                         mol_type = other DNA
                         organism = synthetic construct
SEQUENCE: 2
ctctattgtt ggatcatatt cg                                                   22

SEQ ID NO: 3             moltype = DNA  length = 26
FEATURE                  Location/Qualifiers
misc_feature             1..26
                         note = primer
source                   1..26
                         mol_type = other DNA
                         organism = synthetic construct
SEQUENCE: 3
ttaaaaggta ctggtggagt atttga                                               26

SEQ ID NO: 4             moltype = DNA  length = 26
FEATURE                  Location/Qualifiers
misc_feature             1..26
                         note = primer
source                   1..26
                         mol_type = other DNA
                         organism = synthetic construct
SEQUENCE: 4
aaaatggtca gagaaacctt tatctg                                               26

SEQ ID NO: 5             moltype = DNA  length = 24
FEATURE                  Location/Qualifiers
misc_feature             1..24
                         note = primer
source                   1..24
                         mol_type = other DNA
                         organism = synthetic construct
SEQUENCE: 5
ggtgtgaacc atgagaaagt atga                                                 24

SEQ ID NO: 6             moltype = DNA  length = 22
FEATURE                  Location/Qualifiers
misc_feature             1..22
                         note = primer
source                   1..22
                         mol_type = other DNA
                         organism = synthetic construct
SEQUENCE: 6
gagtccttcc acgataccaa ag                                                   22

SEQ ID NO: 7             moltype = DNA  length = 20
FEATURE                  Location/Qualifiers
misc_feature             1..20
                         note = primer
source                   1..20
                         mol_type = other DNA
                         organism = synthetic construct
SEQUENCE: 7
gtaacccgtt gaaccccatt                                                      20

SEQ ID NO: 8             moltype = DNA  length = 20
FEATURE                  Location/Qualifiers
misc_feature             1..20
                         note = primer
source                   1..20
                         mol_type = other DNA
                         organism = synthetic construct
SEQUENCE: 8
ccatccaatc ggtagtagcg                                                      20

SEQ ID NO: 9             moltype = DNA  length = 24
FEATURE                  Location/Qualifiers
source                   1..24
                         mol_type = other DNA
                         organism = synthetic construct
modified_base            23
                         mod_base = OTHER
                         note = uracil
SEQUENCE: 9
cccttcctcc tcacttccct tttt                                                 24
```